US012236452B2

(12) United States Patent
     Mo

(10) Patent No.: US 12,236,452 B2
(45) Date of Patent: *Feb. 25, 2025

(54) ADVERTISEMENT MULTI-SCREEN COLLABORATION METHOD AND DEVICE

(71) Applicant: Huawei Technologies Co., Ltd., Shenzhen (CN)

(72) Inventor: Lan Mo, Nanjing (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 0 days.

This patent is subject to a terminal disclaimer.

(21) Appl. No.: 17/794,207

(22) PCT Filed: Jan. 5, 2021

(86) PCT No.: PCT/CN2021/070305
     § 371 (c)(1),
     (2) Date: Jan. 18, 2023

(87) PCT Pub. No.: WO2021/147661
     PCT Pub. Date: Jul. 29, 2021

(65) Prior Publication Data
     US 2024/0086966 A1    Mar. 14, 2024

(30) Foreign Application Priority Data
     Jan. 21, 2020  (CN) .......................... 202010072820.0

(51) Int. Cl.
     *G06Q 30/02*      (2023.01)
     *G06Q 30/0241*    (2023.01)
     (Continued)

(52) U.S. Cl.
     CPC ..... *G06Q 30/0255* (2013.01); *G06Q 30/0242* (2013.01); *G06Q 30/0267* (2013.01);
     (Continued)

(58) Field of Classification Search
     CPC ........... G06Q 30/0255; G06Q 30/0242; G06Q 30/0267; G06Q 30/0251;
     (Continued)

(56) References Cited

U.S. PATENT DOCUMENTS 7,636,456 B2 * 12/2009 Collins .................. G09F 27/00
                                                      725/12
11,257,111 B2   2/2022 Komori
     (Continued)

FOREIGN PATENT DOCUMENTS

CN       103607646 A       2/2014
CN       104008494 A       8/2014
     (Continued)

OTHER PUBLICATIONS

"Gathering Platform Achieve your Marketing Goal," Contract delivery process, retrieved from https://juping.baidu.com/homepage/process, 2017, 2 pages.

*Primary Examiner* — Thuy N Nguyen
(74) *Attorney, Agent, or Firm* — Slater Matsil, LLP

(57) ABSTRACT

An advertisement multi-screen collaboration method and a device are provided, and relate to the field of electronic devices, to resolve a problem that a public-oriented device and a terminal of a user cannot implement cross-device multi-screen collaboration. When playing a first advertisement, an advertising device broadcasts a wireless signal that includes an identifier of the first advertisement and bearing information used to indicate a position and an orientation of the advertising device. A first terminal receives the wireless signal, and when determining that the first advertisement played by the advertising device is effectively exposed to a user of the first terminal, sends an effective exposure event to a server. The effective exposure event includes a unified identity corresponding to the user of the first terminal and the identifier of the first advertisement, so that the server (Continued)

updates a historical preference of the user corresponding to the unified identity. The first terminal adds the unified identity when requesting an advertisement resource from the server, so that the server returns an advertisement resource of a second advertisement having a same advertising campaign as the first advertisement to the first terminal based on the unified identity.

14 Claims, 19 Drawing Sheets

(51) Int. Cl.
    *G06Q 30/0242*    (2023.01)
    *G06Q 30/0251*    (2023.01)
    *H04L 67/306*     (2022.01)
    *H04W 4/02*      (2018.01)
    *H04W 4/06*      (2009.01)
    *H04W 4/23*      (2018.01)

(52) U.S. Cl.
    CPC ....... *G06Q 30/0277* (2013.01); *H04L 67/306* (2013.01); *H04W 4/026* (2013.01); *H04W 4/06* (2013.01); *H04W 4/23* (2018.02)

(58) Field of Classification Search
    CPC .......... G06Q 30/0207–30/0277; H04L 67/306; H04W 4/026; H04W 4/06; H04W 4/23; H04W 4/025
    See application file for complete search history.

(56) References Cited

U.S. PATENT DOCUMENTS

| | | |
|---|---|---|
| 2007/0136309 A1 | 6/2007 | Akinaga et al. |
| 2008/0147488 A1* | 6/2008 | Tunick ................... G06Q 30/04 382/209 |
| 2009/0265215 A1* | 10/2009 | Lindstrom ......... G06Q 30/0203 705/7.32 |
| 2013/0091019 A1* | 4/2013 | Mallon .............. G06Q 30/0251 705/14.69 |
| 2013/0325583 A1 | 12/2013 | Arini et al. |
| 2014/0304072 A1* | 10/2014 | Rider .................... H04W 4/029 705/14.53 |
| 2014/0379477 A1* | 12/2014 | Sheinfeld ........... G06Q 30/0251 705/14.58 |
| 2015/0006278 A1* | 1/2015 | Di Censo ............. G06V 20/597 705/14.43 |
| 2016/0027041 A1* | 1/2016 | Zhong ................... H04L 67/535 705/14.45 |
| 2016/0034948 A1* | 2/2016 | Zhong ................ G06Q 30/0246 705/14.45 |
| 2016/0180392 A1* | 6/2016 | Liu .................... G06Q 30/0269 705/14.53 |
| 2016/0210656 A1* | 7/2016 | Chittilappilly ..... G06Q 30/0246 |
| 2017/0091811 A1* | 3/2017 | Saxena .............. G06Q 30/0277 |
| 2017/0289596 A1 | 10/2017 | Krasadakis et al. |
| 2018/0308123 A1* | 10/2018 | Zhong ................ G06Q 30/0246 |
| 2018/0336596 A1* | 11/2018 | Wang ...................... H04L 12/12 |
| 2019/0205935 A1* | 7/2019 | Albrecht ............. H04L 43/0876 |
| 2020/0252480 A1* | 8/2020 | Surygina ............... H04L 67/306 |
| 2020/0402099 A1* | 12/2020 | Pittman ............... H04L 67/1097 |
| 2021/0133797 A1* | 5/2021 | Adibi ................ H04M 3/42102 |
| 2021/0133798 A1* | 5/2021 | Adibi .................. G10L 15/1815 |
| 2021/0133799 A1* | 5/2021 | Adibi .................. G10L 15/1815 |
| 2022/0067777 A1* | 3/2022 | Shkedi ............... G06Q 30/0277 |
| 2023/0071453 A1 | 3/2023 | Mo |

FOREIGN PATENT DOCUMENTS

| | | |
|---|---|---|
| CN | 104683122 A | 6/2015 |
| CN | 105677844 A | 6/2016 |
| CN | 107516239 A | 12/2017 |
| CN | 107918884 A | 4/2018 |
| CN | 108492130 A | 9/2018 |
| CN | 109165969 A | 1/2019 |
| CN | 109478293 A | 3/2019 |
| CN | 110033296 A | 7/2019 |
| CN | 110071926 A | 7/2019 |
| CN | 111311314 A | 6/2020 |
| JP | WO2018/020764 A1 * | 4/2017 |
| KR | 20180010090 A | 1/2018 |
| WO | WO 2009/074791 A1 * | 12/2008 |

* cited by examiner

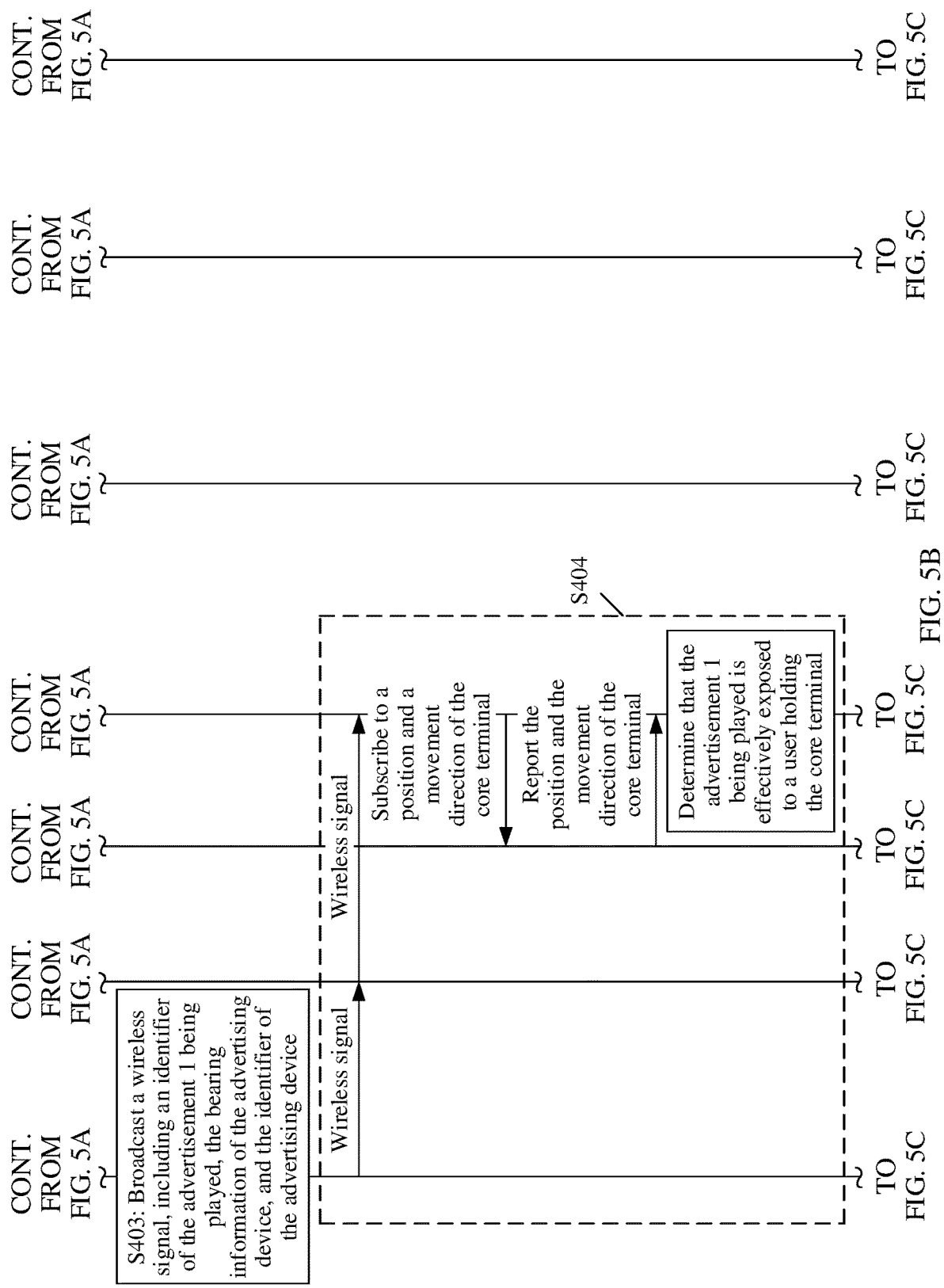

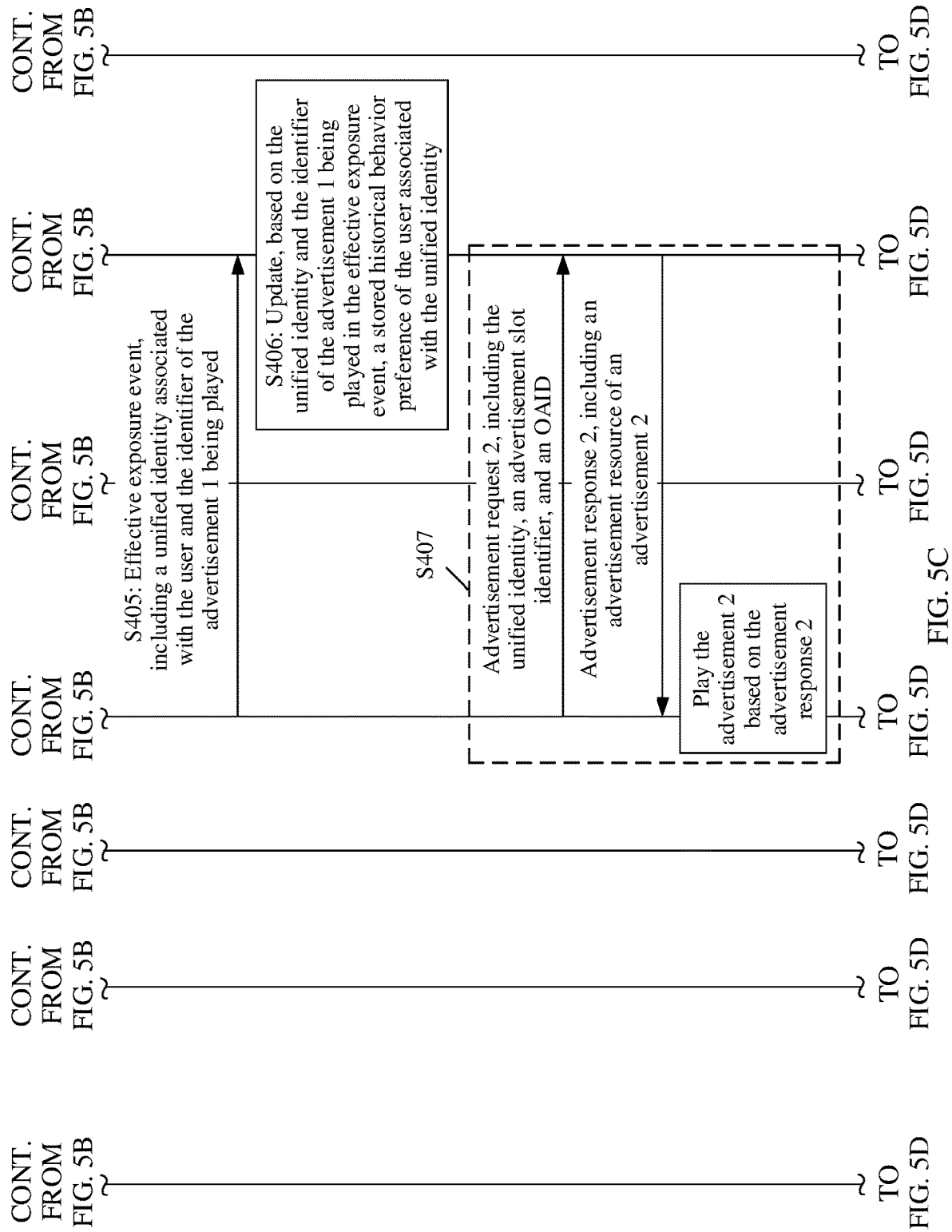

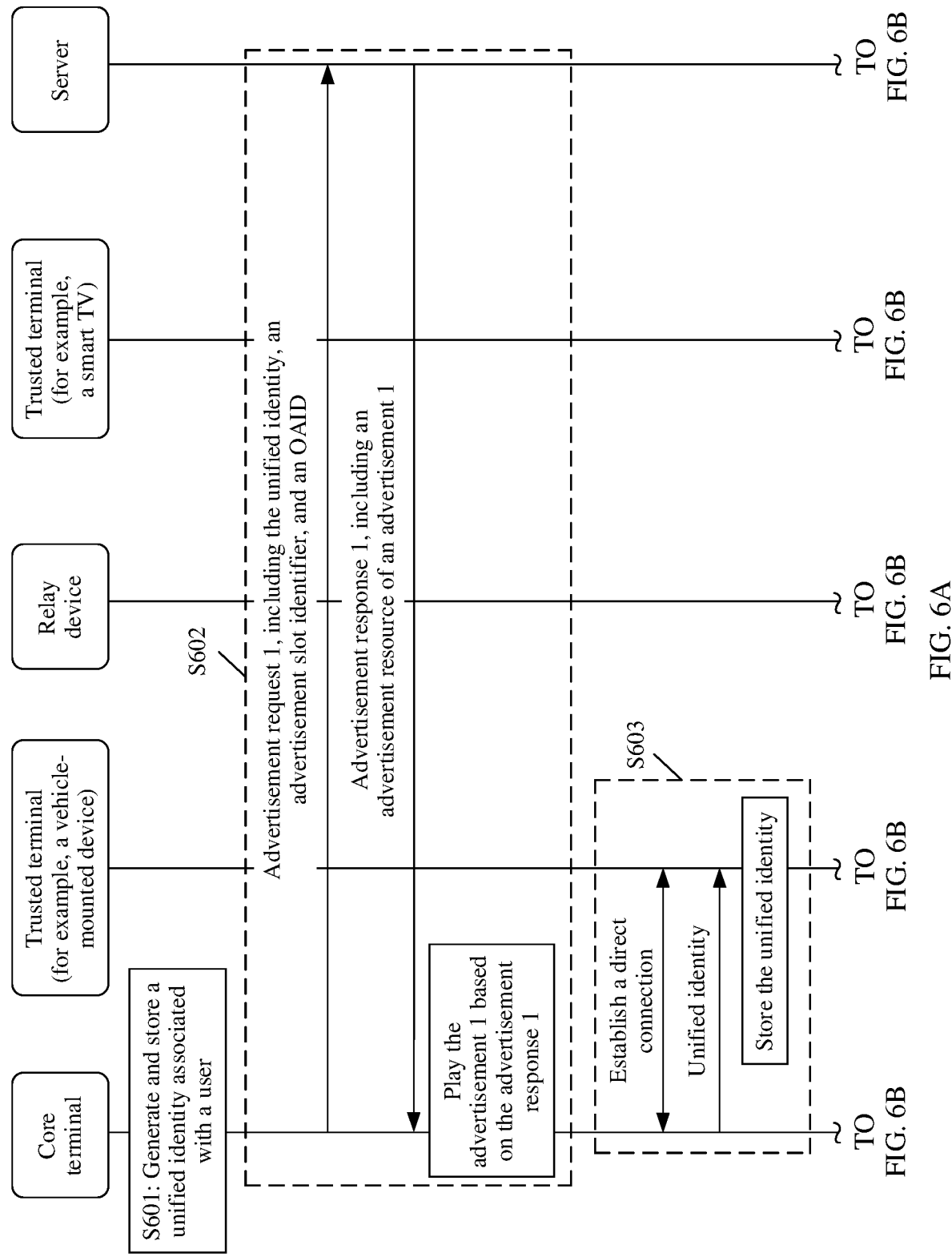

ADVERTISEMENT MULTI-SCREEN COLLABORATION METHOD AND DEVICE

This application claims priority to Chinese Patent Application No. 202010072820.7, filed with the China National Intellectual Property Administration on Jan. 21, 2020 and entitled "ADVERTISEMENT MULTI-SCREEN COLLABORATION METHOD AND DEVICE", which is incorporated herein by reference in its entirety.

TECHNICAL FIELD

This application relates to the field of electronic devices, and in particular, to an advertisement multi-screen collaboration method and a device.

BACKGROUND

With the development of electronic technologies and the mobile internet, one user may have more terminals, such as a mobile phone, a smartwatch, a vehicle-mounted device, and a smart home device. All these terminals can be connected to the internet, so that the user can obtain a service anytime and anywhere. In addition, with the development of internet of things (internet of things, IOT) technologies, an increasing quantity of public-oriented devices such as industry devices and public facility devices are upgraded to devices that can be connected to the internet, and support remote monitoring and management. Electronic billboards disposed outdoors or in public space in buildings are one of them.

In the conventional technology, a plurality of terminals of a user may cooperate with each other to implement cross-device multi-screen collaboration, so as to provide service continuity user experience. Currently, the prerequisite for implementing cross-device multi-screen collaboration is logging in to a plurality of devices such as the plurality of terminals of the user by using a same account. For example, when the plurality of terminals of the user are logged in to by using the same account, the plurality of terminals may cooperate with each other to play an advertisement, so as to implement cross-device advertisement multi-screen collaboration, in other words, implement cross-device advertisement multi-screen linkage.

However, many public-oriented devices cannot be logged in to by using a same account as the terminal of the user. Consequently, cross-device multi-screen collaboration cannot be implemented. For example, because an electronic billboard cannot be logged in to by using a same account as the terminal of the user, cross-device advertisement multi-screen linkage cannot be implemented.

SUMMARY

Embodiments of this application provide an advertisement multi-screen collaboration method and a device, to resolve a problem that a public-oriented device and a user terminal cannot implement cross-device multi-screen collaboration, for example, advertisement multi-screen linkage.

To resolve the foregoing problem, the following technical solutions are used in this application:

According to a first aspect, an embodiment of this application provides an advertisement multi-screen collaboration method. The method may include: An advertising device plays a first advertisement, and broadcasts a wireless signal. The wireless signal may include an identifier of the first advertisement that is being played by the advertising device and bearing information of the advertising device, and the bearing information is used to indicate a position and an orientation of the advertising device. When a first terminal approaches the advertising device, the first terminal may receive the wireless signal that is broadcast by the advertising device. The first terminal may determine, based on the bearing information in the received wireless signal, a position and a movement direction of the first terminal, and preset exposure duration, whether the first advertisement played by the advertising device is effectively exposed to a user of the first terminal. When determining whether the first advertisement played by the advertising device is effectively exposed to the user of the first terminal, the first terminal sends an effective exposure event to a server. The effective exposure event includes a unified identity and the identifier of the first advertisement, and the unified identity corresponds to the user of the first terminal. The server receives the effective exposure event, and may update, based on the effective exposure event, a historical preference of the user corresponding to the unified identity. An updated historical preference indicates that the user is interested in the first advertisement. The first terminal sends a first advertisement request to the server. The first advertisement request includes the unified identity and a first advertisement slot identifier, and is used to request an advertisement resource. The server receives the first advertisement request, obtains the updated historical preference corresponding to the unified identity, and sends a first advertisement response to the first terminal based on the updated historical preference. The first terminal receives the first advertisement response. The first advertisement response includes an advertisement resource of a second advertisement, and the second advertisement and the first advertisement have a same advertising campaign (campaign). Advertisements having a same advertising campaign are the same or associated.

According to the foregoing technical solution, when playing an advertisement, the advertising device broadcasts a wireless signal, so that a surrounding personal device of the user, for example, the first terminal, can detect the wireless signal. In addition, after determining that the user pays attention to the advertisement played by the advertising device, the first terminal reports the effective exposure event that carries the unified identity associated with the user to the server, so that the server can be associated with the user based on the unified identity. In this way, when sending an advertisement request to the server, the first terminal adds the unified identity to the advertisement request, so that the server can return, to the first terminal based on the unified identity, an advertisement having a same advertising campaign as the advertisement played by the advertising device. In other words, the personal device of the user performs effective exposure detection on the advertisement played by the advertising device, and reports the effective exposure event that carries the unified identity to the server, so that the advertising device and the personal device of the user can be associated by using a same identifier, for example, the unified identity. Therefore, a public-oriented device such as the foregoing advertising device and the personal device of the user can implement cross-device advertisement multi-screen linkage, in other words, implement multi-screen collaboration between an advertisement played by the advertising device and an advertisement played by the personal device of the user. This enhances exposure impact of a brand advertisement on the user.

In a possible implementation, the unified identity is preconfigured in the first terminal.

In another possible implementation, before the first terminal sends the effective exposure event to the server, the method further includes: The first terminal generates the unified identity.

In another possible implementation, that the first terminal determines, based on the bearing information in the wireless signal, a position and a movement direction of the first terminal, and preset exposure duration, that the first advertisement played by the advertising device is effectively exposed to a user of the first terminal may include: The first terminal determines, based on the bearing information, and the position and the movement direction of the first terminal, that a bearing of the first terminal relative to the advertising device meets a preset condition. The first terminal determines duration in which the first advertisement played by the advertising device is exposed to the user of the first terminal. When determining that the exposure duration is greater than the preset exposure duration, the first terminal determines that the first advertisement played by the advertising device is effectively exposed to the user of the first terminal. That a bearing of the first terminal relative to the advertising device meets a preset condition includes: a distance between the first terminal and the advertising device is within a preset distance range, the first terminal is located on a side of the orientation of the advertising device, and an included angle between the movement direction of the first terminal and the orientation of the advertising device is within a preset included angle range.

In another possible implementation, the method further includes: The first terminal sends the unified identity to a second terminal. The second terminal receives the unified identity and stores the unified identity. The second terminal sends a second advertisement request to the server. The second advertisement request includes the unified identity and a second advertisement slot identifier, and is used to request an advertisement resource. The server receives the second advertisement request, obtains the updated historical preference corresponding to the unified identity, and sends a second advertisement response to the second terminal based on the updated historical preference. The second terminal receives the second advertisement response. The second advertisement response includes an advertisement resource of a third advertisement, and the third advertisement and the first advertisement have a same advertising campaign. The first terminal sends the unified identity corresponding to the user to the second terminal, so that the second terminal can request, from the server based on the unified identity, an advertisement having a same advertising campaign as the first advertisement. This implements advertisement multi-screen linkage between another terminal of the user and the advertising device.

In another possible implementation, that the first terminal sends the unified identity to a second terminal may include: The first terminal sends the unified identity to the second terminal through a relay device.

In another possible implementation, that the first terminal generates the unified identity may include: The first terminal generates the unified identity when determining to establish a trusted connection to the second terminal.

In another possible implementation, that the first terminal generates the unified identity may include: The first terminal generates the unified identity when determining to establish a trusted connection to the relay device.

According to a second aspect, an embodiment of this application provides an advertisement multi-screen collaboration method. The method may include: A first terminal receives a wireless signal that is broadcast by an advertising device. The wireless signal includes an identifier of a first advertisement that is being played by the advertising device and bearing information of the advertising device, and the bearing information is used to indicate a position and an orientation of the advertising device. The first terminal determines, based on the bearing information in the wireless signal, a position and a movement direction of the first terminal, and preset exposure duration, that the first advertisement played by the advertising device is effectively exposed to a user of the first terminal. The first terminal sends an effective exposure event to a server. The effective exposure event includes a unified identity and the identifier of the first advertisement, and the unified identity corresponds to the user of the first terminal. The first terminal sends a first advertisement request to the server. The first advertisement request includes the unified identity and a first advertisement slot identifier, and is used to request an advertisement resource. The first terminal receives a first advertisement response from the server. The first advertisement response includes an advertisement resource of a second advertisement, and the second advertisement and the first advertisement have a same advertising campaign.

According to the foregoing technical solution, the first terminal receives the wireless signal that is broadcast by the advertising device, and after determining that the user pays attention to an advertisement played by the advertising device, the first terminal reports the effective exposure event that carries the unified identity associated with the user to the server, so that the server can be associated with the user based on the unified identity. When sending an advertisement request to the server, the first terminal also adds the unified identity to the advertisement request, so that the server can return, to the first terminal based on the unified identity, an advertisement having a same advertising campaign as the advertisement played by the advertising device. In other words, the personal device of the user performs effective exposure detection on the advertisement played by the advertising device, and reports the effective exposure event that carries the unified identity to the server, so that the advertising device and the personal device of the user can be associated by using a same identifier, for example, the unified identity. Therefore, a public-oriented device such as the foregoing advertising device and the personal device of the user can implement cross-device advertisement multi-screen linkage, in other words, implement multi-screen collaboration between an advertisement played by the advertising device and an advertisement played by the personal device of the user. This enhances exposure impact of a brand advertisement on the user.

In a possible implementation, the unified identity is pre-configured in the first terminal.

In another possible implementation, before the first terminal sends the effective exposure event to the server, the method may further include: The first terminal generates the unified identity.

In another possible implementation, the method may further include: The first terminal sends the unified identity to a second terminal, so that the second terminal obtains, from the server by using the unified identity, a third advertisement having a same advertising campaign as the first advertisement. The first terminal sends the unified identity corresponding to the user to the second terminal, so that the second terminal can request, from the server based on the unified identity, an advertisement having a same advertising campaign as the first advertisement. This implements advertisement multi-screen linkage between another terminal of the user and the advertising device.

In another possible implementation, that the first terminal sends the unified identity to a second terminal may include: The first terminal sends the unified identity to the second terminal through a relay device.

In another possible implementation, that the first terminal determines, based on the bearing information in the wireless signal, a position and a movement direction of the first terminal, and preset exposure duration, that the first advertisement played by the advertising device is effectively exposed to a user of the first terminal may include: The first terminal determines, based on the bearing information, and the position and the movement direction of the first terminal, that a bearing of the first terminal relative to the advertising device meets a preset condition. The first terminal determines duration in which the first advertisement played by the advertising device is exposed to the user of the first terminal. When determining that the exposure duration is greater than the preset exposure duration, the first terminal determines that the first advertisement played by the advertising device is effectively exposed to the user of the first terminal. That a bearing of the first terminal relative to the advertising device meets a preset condition includes: a distance between the first terminal and the advertising device is within a preset distance range, the first terminal is located on a side of the orientation of the advertising device, and an included angle between the movement direction of the first terminal and the orientation of the advertising device is within a preset included angle range.

According to a third aspect, an embodiment of this application provides an advertisement multi-screen collaboration method. The method may include: A second terminal receives a unified identity from a first terminal. The unified identity corresponds to a user of the first terminal. The second terminal sends a second advertisement request to a server. The second advertisement request includes the unified identity and a second advertisement slot identifier, and is used to request an advertisement resource. The second terminal receives a second advertisement response from the server. The second advertisement response includes an advertisement resource of a third advertisement, the third advertisement and a first advertisement have a same advertising campaign, and the first advertisement is an advertisement played by an advertising device.

According to the foregoing technical solution, the second terminal receives, from the first terminal, the unified identity corresponding to the user of the first terminal, so that the second terminal can request, from the server based on the unified identity, an advertisement having a same advertising campaign as the first advertisement. This implements advertisement multi-screen linkage between another terminal of the user and the advertising device.

In another possible implementation, that a second terminal receives a unified identity from a first terminal may include: The second terminal receives the unified identity sent by the first terminal through a relay device.

According to a fourth aspect, an embodiment of this application provides an advertisement multi-screen collaboration method. The method may include: A server receives an effective exposure event from a first terminal. The effective exposure event includes a unified identity and an identifier of a first advertisement played by an advertising device, and the unified identity corresponds to a user of the first terminal. The server updates, based on the effective exposure event, a historical preference of the user corresponding to the unified identity. An updated historical preference indicates that the user is interested in the first advertisement. The server receives a first advertisement request from the first terminal. The first advertisement request includes the unified identity and a first advertisement slot identifier, and is used to request an advertisement resource. The server obtains, based on the first advertisement request, the updated historical preference corresponding to the unified identity. The server sends a first advertisement response to the first terminal based on the updated historical preference. The first advertisement response includes an advertisement resource of a second advertisement, and the second advertisement and the first advertisement have a same advertising campaign.

According to the foregoing technical solution, the server receives the effective exposure event that is reported by the first terminal and that carries the unified identity associated with the user, to indicate that an advertisement played by the advertising device is effectively exposed to the user, so that the server can be associated with the user based on the unified identity, and update the historical preference of the user. In this way, when receiving, from the first terminal, an advertisement request that carries the unified identity, the server may return, to the first terminal based on the unified identity, an advertisement having a same advertising campaign as the advertisement played by the advertising device. In other words, a personal device of the user performs effective exposure detection on the advertisement played by the advertising device, and reports the effective exposure event that carries the unified identity to the server, so that the advertising device and the personal device of the user can be associated by using a same identifier, for example, the unified identity. Therefore, a public-oriented device such as the foregoing advertising device and the personal device of the user can implement cross-device advertisement multi-screen linkage, in other words, implement multi-screen collaboration between an advertisement played by the advertising device and an advertisement played by the personal device of the user. This enhances exposure impact of a brand advertisement on the user.

In a possible implementation, the method may further include: The server receives a second advertisement request from a second terminal. The second advertisement request includes the unified identity and a second advertisement slot identifier, and is used to request an advertisement resource. The server obtains, based on the second advertisement request, the updated historical preference corresponding to the unified identity. The server sends a second advertisement response to the second terminal based on the updated historical preference. The second advertisement response includes an advertisement resource of a third advertisement, and the third advertisement and the first advertisement have a same advertising campaign. In this way, when receiving, from the second terminal, an advertisement request that carries the unified identity, the server may return, to the second terminal based on the unified identity, an advertisement having a same advertising campaign as the advertisement played by the advertising device. This implements advertisement multi-screen linkage between another terminal of the user and the advertising device.

According to a fifth aspect, an embodiment of this application provides an advertisement multi-screen collaboration method. The method may include: An advertising device plays a first advertisement. The advertising device broadcasts a wireless signal. The wireless signal includes an identifier of the first advertisement that is being played by the advertising device and bearing information of the advertising device, the bearing information is used to indicate a position and an orientation of the advertising device, the wireless signal is used by a first terminal to determine whether the first advertisement played by the advertising device is effectively exposed to a user and send an effective exposure event including a unified identity to a server when the first terminal determines that the first advertisement is effectively exposed, and the unified identity is used by the server to update a historical preference of the user corresponding to the unified identity. Alternatively, when the server does not store the historical preference of the user corresponding to the unified identity, the effective exposure event sent to the server may be used by the server to generate the historical preference of the user corresponding to the unified identity.

According to the foregoing technical solution, when playing an advertisement, the advertising device broadcasts a wireless signal, so that a surrounding personal device of the user, for example, the first terminal, can detect the wireless signal. Therefore, after determining that the user pays attention to the advertisement played by the advertising device, the first terminal may report the effective exposure event that carries the unified identity associated with the user to the server, so that the server can be associated with the user based on the unified identity. The personal device of the user performs effective exposure detection on the advertisement played by the advertising device, and reports the effective exposure event that carries the unified identity to the server, so that the advertising device and the personal device of the user can be associated by using a same identifier, for example, the unified identity. Therefore, a public-oriented device such as the foregoing advertising device and the personal device of the user can implement cross-device advertisement multi-screen linkage, in other words, implement multi-screen collaboration between an advertisement played by the advertising device and an advertisement played by the personal device of the user. This enhances exposure impact of a brand advertisement on the user.

According to a sixth aspect, an embodiment of this application provides a service multi-screen collaboration method. The method may include: A first terminal sends a first service request to a server. The first service request includes a unified identity and is used to request a service resource, and the unified identity corresponds to a user of the first terminal. The server receives the first service request, obtains a historical preference of the user corresponding to the unified identity, and sends a first service response to the first terminal based on the historical preference. The first terminal receives the first service response. The first service response includes a resource of a first service. The first terminal sends the unified identity to a second terminal. The second terminal sends a second service request to the server. The second service request includes the unified identity and is used to request a service resource. The server receives the second service request, obtains the historical preference of the user corresponding to the unified identity, and sends a second service response to the second terminal based on the historical preference. The second terminal receives the second service response. The second service response includes a resource of a second service, and the second service is the same as or associated with the first service.

In this embodiment, a service may be an advertisement service, a video service, an audio service, an e-book service, a news service, or the like. This is not specifically limited in this embodiment of this application.

According to the foregoing technical solution, a plurality of terminals of the user are associated with each other by using the unified identity associated with the user. In other words, when requesting service resources from the server, the plurality of terminals add the same unified identity associated with the user, so that the server can be associated with the user based on the unified identity, and return same or related service resources to these devices. In this way, cross-device service multi-screen collaboration centered on the user (the user associated with the unified identity) can be implemented without a need of using a same account to log in to personal devices of the user.

In a possible implementation, the unified identity is preconfigured in the first terminal.

In another possible implementation, before the first terminal sends the first service request to the server, the method further includes: The first terminal generates the unified identity.

In another possible implementation, that the first terminal sends the unified identity to a second terminal may include: The first terminal sends the unified identity to the second terminal through a relay device.

In another possible implementation, that the first terminal generates the unified identity may include: The first terminal generates the unified identity when determining to establish a trusted connection to the second terminal.

In another possible implementation, that the first terminal generates the unified identity may include: The first terminal generates the unified identity when determining to establish a trusted connection to the relay device.

According to a seventh aspect, an embodiment of this application provides a service multi-screen collaboration method. The method may include: A first terminal sends a first service request to a server. The first service request includes a unified identity and is used to request a service resource, and the unified identity corresponds to a user of the first terminal. The first terminal receives a first service response from the server. The first service response includes a resource of a first service. The first terminal sends the unified identity to a second terminal, so that the second terminal obtains, from the server by using the unified identity, a second service that is the same as or associated with the first service.

In this embodiment, a service may be an advertisement service, a video service, an audio service, an e-book service, a news service, or the like. This is not specifically limited in this embodiment of this application.

According to the foregoing technical solution, the first terminal sends the unified identity corresponding to the user to the second terminal, so that a plurality of terminals of the user are associated with each other by using the unified identity associated with the user. In other words, when requesting service resources from the server, the plurality of terminals add the same unified identity associated with the user, so that the server can be associated with the user based on the unified identity, and return same or associated service resources to these devices. In this way, cross-device service multi-screen collaboration centered on the user (the user associated with the unified identity) can be implemented without a need of using a same account to log in to personal devices of the user.

In a possible implementation, the unified identity is preconfigured in the first terminal.

In another possible implementation, before the first terminal sends the first service request to the server, the method may further include: The first terminal generates the unified identity.

In another possible implementation, that the first terminal sends the unified identity to a second terminal includes: The first terminal sends the unified identity to the second terminal through a relay device.

In another possible implementation, that the first terminal generates the unified identity may include: The first terminal generates the unified identity when determining to establish a trusted connection to the second terminal.

In another possible implementation, that the first terminal generates the unified identity may include: The first terminal generates the unified identity when determining to establish a trusted connection to the relay device.

According to an eighth aspect, an embodiment of this application provides a service multi-screen collaboration method. The method may include: A second terminal receives a unified identity from a first terminal. The unified identity corresponds to a user of the first terminal. The second terminal sends a second service request to a server. The second service request includes the unified identity and is used to request a service resource. The second terminal receives a second service response from the server. The second service response includes a resource of a second service, the second service is the same as or associated with a first service, and the first service is a service returned by the server to the first terminal based on the unified identity.

In this embodiment, a service may be an advertisement service, a video service, an audio service, an e-book service, a news service, or the like. This is not specifically limited in this embodiment of this application.

According to the foregoing technical solution, the second terminal receives, from the first terminal, the unified identity corresponding to the user of the first terminal, and the second terminal may request, from the server based on the unified identity, a resource of a service that is the same as or associated with the first service returned to the first terminal. In this way, cross-device service multi-screen collaboration centered on the user (the user associated with the unified identity) can be implemented without a need of using a same account to log in to personal devices of the user.

In another possible implementation, that a second terminal receives a unified identity from a first terminal may include: The second terminal receives the unified identity sent by the first terminal through a relay device.

According to a ninth aspect, an embodiment of this application provides a service multi-screen collaboration method. The method may include: A server receives a first service request from a first terminal. The first service request includes a unified identity and is used to request a service resource. The server obtains, based on the first service request, a historical preference of a user corresponding to the unified identity. The server sends a first service response to the first terminal based on the historical preference. The first service response includes a resource of a first service. The server receives a second service request from a second terminal. The second service request includes the unified identity and is used to request a service resource. The server obtains, based on the second service request, the historical preference of the user corresponding to the unified identity. The server sends a second service response to the second terminal based on the historical preference. The second service response includes a resource of a second service, and the second service is the same as or associated with the first service.

In this embodiment, a service may be an advertisement service, a video service, an audio service, an e-book service, a news service, or the like. This is not specifically limited in this embodiment of this application.

According to the foregoing technical solution, when receiving, from different terminals, service requests that carry the unified identity, the server may return same or associated service resources to the different terminals based on the unified identity. Therefore, a plurality of terminals of the user are associated with each other by using the unified identity associated with the user. In other words, the server can be associated with the user based on the unified identity carried in service requests of the plurality of terminals, so as to return same or associated services to these devices. In this way, cross-device service multi-screen collaboration centered on the user (the user associated with the unified identity) can be implemented without a need of using a same account to log in to personal devices of the user.

According to a tenth aspect, an embodiment of this application provides a terminal. The terminal may be a first terminal. The first terminal includes one or more processors, a memory, a display, and a communications module. The memory is configured to store one or more programs, and the one or more processors are configured to run the one or more programs, so that the first terminal performs the method according to any one of the second aspect and the possible implementations of the second aspect, or the first terminal performs the method according to any one of the seventh aspect and the possible implementations of the seventh aspect.

According to an eleventh aspect, an embodiment of this application provides a terminal. The terminal may be a second terminal. The second terminal includes one or more processors, a memory, a display, and a communications module. The memory is configured to store one or more programs, and the one or more processors are configured to run the one or more programs, so that the second terminal performs the method according to any one of the third aspect and the possible implementations of the third aspect, or the second terminal performs the method according to any one of the eighth aspect and the possible implementations of the eighth aspect.

According to a twelfth aspect, an embodiment of this application provides a computer-readable storage medium, including computer instructions. When the computer instructions are run on a terminal such as the foregoing first terminal, the first terminal is enabled to perform the method according to any one of the second aspect and the possible implementations of the second aspect, or the first terminal is enabled to perform the method according to any one of the seventh aspect and the possible implementations of the seventh aspect.

According to a thirteenth aspect, an embodiment of this application provides a computer-readable storage medium, including computer instructions. When the computer instructions are run on a terminal such as the foregoing second terminal, the second terminal is enabled to perform the method according to any one of the third aspect and the possible implementations of the third aspect, or the second terminal is enabled to perform the method according to any one of the eighth aspect and the possible implementations of the eighth aspect.

According to a fourteenth aspect, an embodiment of this application provides a computer program product. When the computer program product runs on a computer, the computer is enabled to perform the method according to any one of the second aspect, the third aspect, the seventh aspect, and the eighth aspect.

According to a fifteenth aspect, an embodiment of this application provides a server. The server may include one or more processors, a memory, and a communications module. The memory is configured to store one or more programs, and the one or more processors are configured to run the one or more programs, so that the server performs the method according to any one of the fourth aspect and the possible implementations of the fourth aspect, or the method according to the ninth aspect.

According to a sixteenth aspect, an embodiment of this application provides a computer-readable storage medium, including computer instructions. When the computer instructions are run on a server, the server is enabled to perform the method according to any one of the fourth aspect and the possible implementations of the fourth aspect, or the method according to the ninth aspect.

According to a seventeenth aspect, an embodiment of this application provides a computer program product. When the computer program product runs on a computer, the computer is enabled to perform the method according to the fourth aspect or the ninth aspect.

According to an eighteenth aspect, an embodiment of this application provides an advertising device. The advertising device may include one or more processors, a memory, a display, a wireless communications module, and a mobile communications module. The memory is configured to store one or more programs, and the one or more processors are configured to run the one or more programs, so that the advertising device performs the method according to the fifth aspect.

According to a nineteenth aspect, an embodiment of this application provides a computer-readable storage medium, including computer instructions. When the computer instructions are run on an advertising device, the advertising device is enabled to perform the method according to the fifth aspect.

According to a twentieth aspect, an embodiment of this application provides a computer program product. When the computer program product runs on a computer, the computer is enabled to perform the method according to the fifth aspect.

According to a twenty-first aspect, an embodiment of this application provides an advertising system. The advertising system may include an advertising device, a first terminal, and a server. The advertising device is configured to: play a first advertisement, and broadcast a wireless signal. The wireless signal includes an identifier of the first advertisement that is being played by the advertising device and bearing information of the advertising device, and the bearing information is used to indicate a position and an orientation of the advertising device. The first terminal is configured to: receive the wireless signal, determine, based on the bearing information in the wireless signal, a position and a movement direction of the first terminal, and preset exposure duration, that the first advertisement played by the advertising device is effectively exposed to a user of the first terminal, and send an effective exposure event to the server. The effective exposure event includes a unified identity and the identifier of the first advertisement, and the unified identity corresponds to the user of the first terminal. The server is configured to: receive the effective exposure event, and update, based on the effective exposure event, a historical preference of the user corresponding to the unified identity. An updated historical preference indicates that the user is interested in the first advertisement. The first terminal is further configured to send a first advertisement request to the server. The first advertisement request includes the unified identity and a first advertisement slot identifier, and is used to request an advertisement resource. The server is further configured to: receive the first advertisement request, obtain the updated historical preference corresponding to the unified identity, and send a first advertisement response to the first terminal based on the updated historical preference. The first terminal is further configured to receive the first advertisement response. The first advertisement response includes an advertisement resource of a second advertisement, and the second advertisement and the first advertisement have a same advertising campaign.

In a possible implementation, the unified identity is preconfigured in the first terminal.

In another possible implementation, the first terminal is further configured to generate the unified identity.

In another possible implementation, the first terminal is specifically configured to: determine, based on the bearing information, and the position and the movement direction of the first terminal, that a bearing of the first terminal relative to the advertising device meets a preset condition; determine duration in which the first advertisement played by the advertising device is exposed to the user of the first terminal; and when determining that the exposure duration is greater than the preset exposure duration, determine that the first advertisement played by the advertising device is effectively exposed to the user of the first terminal. That a bearing of the first terminal relative to the advertising device meets a preset condition includes: a distance between the first terminal and the advertising device is within a preset distance range, the first terminal is located on a side of the orientation of the advertising device, and an included angle between the movement direction of the first terminal and the orientation of the advertising device is within a preset included angle range.

In another possible implementation, the advertising system may further include a second terminal. The first terminal is further configured to send the unified identity to the second terminal. The second terminal is configured to: receive the unified identity, and send a second advertisement request to the server. The second advertisement request includes the unified identity and a second advertisement slot identifier, and is used to request an advertisement resource. The server is further configured to: receive the second advertisement request, obtain the updated historical preference corresponding to the unified identity, and send a second advertisement response to the second terminal based on the updated historical preference. The second terminal is further configured to receive the second advertisement response. The second advertisement response includes an advertisement resource of a third advertisement, and the third advertisement and the first advertisement have a same advertising campaign.

In another possible implementation, the advertising system further includes a relay device. The first terminal is specifically configured to send the unified identity to the second terminal through the relay device.

In another possible implementation, the first terminal is specifically configured to generate the unified identity when determining to establish a trusted connection to the second terminal.

In another possible implementation, the first terminal is specifically configured to generate the unified identity when determining to establish a trusted connection to the relay device.

It should be noted that the first terminal in this application may be a core terminal in embodiments, and the second terminal in this application may be a trusted terminal in embodiments.

It should be understood that descriptions of technical features, technical solutions, beneficial effects, or similar words in this application do not imply that all features and advantages can be implemented in any individual embodiment. On the contrary, it may be understood that descriptions of the features or the beneficial effects mean that at least one embodiment includes a specific technical feature, technical solution, or beneficial effect. Therefore, the descriptions of the technical features, the technical solutions, or the beneficial effects in this specification may not necessarily belong to one embodiment. Further, the technical features, the technical solutions, and the beneficial effects described in embodiments may be combined in any proper manner. Persons skilled in the art understand that an embodiment may be implemented without one or more specific technical features, technical solutions, or beneficial effects in a specific embodiment. In other embodiments, additional technical features and beneficial effects may be further identified in a specific embodiment that does not reflect all embodiments.

DESCRIPTION OF EMBODIMENTS

Currently, when a plurality of terminals of a user are logged in to by using a same account, the plurality of terminals may cooperate with each other to implement cross-device multi-screen collaboration. In addition, a large proportion of commercial monetization modes of many applications installed on a terminal come from advertisements in addition to in-app payment and pay-to-read. Therefore, cross-device advertisement multi-screen collaboration or cross-device advertisement multi-screen linkage is also a requirement of multi-screen collaboration.

In embodiments, multi-screen collaboration may mean that a plurality of devices cooperate with each other to implement a same service. For example, a plurality of terminals cooperate with each other to play a plurality of advertisements having a same advertising campaign (advertising campaign). In embodiments, that a plurality of terminals cooperate with each other to play a plurality of advertisements having a same advertising campaign may also be referred to as advertisement multi-screen linkage. It should be noted that themes of content communicated by advertisements having a same advertising campaign are the same in embodiments. For example, if an advertisement 1, an advertisement 2, and an advertisement 3 have a same advertising campaign, themes of content communicated by the advertisement 1, the advertisement 2, and the advertisement 3 are the same, for example, all are advertisements about a mobile phone brand. A plurality of advertisements (or a series of advertisements) having a same advertising campaign may mean that the plurality of advertisements are associated with each other, or the plurality of advertisements are a same advertisement.

Figure 1:
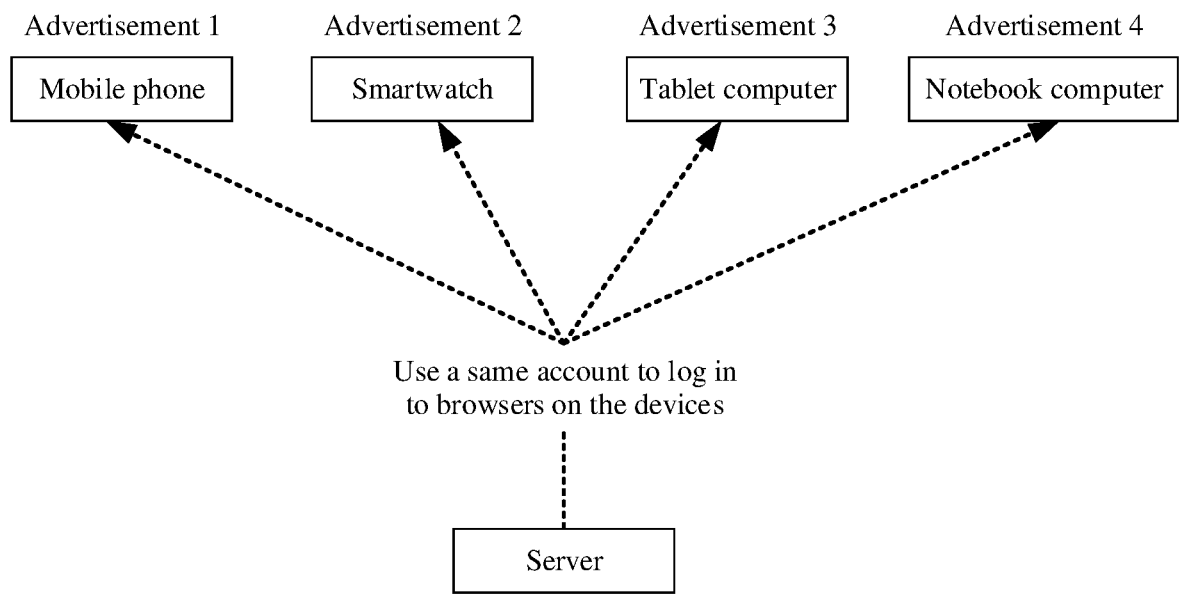
FIG. 1 is a schematic diagram of a cross-device multi-screen collaboration scenario in the conventional technology.

For example, as shown in FIG. 1, a user has four terminals: a mobile phone, a smartwatch, a tablet computer, and a notebook computer, and browsers of the four terminals are logged in to by using a same account. When the user uses the browser of the mobile phone, a server that is deployed on a network side and that is configured to provide an advertisement resource may send an advertisement 1 to the mobile phone, and the mobile phone plays the advertisement 1 for the user to view. Then, when the user uses another terminal such as the browser of the smartwatch, because the browser of the smartwatch and the browser of the mobile phone are logged in to by using the same account, the server may send an advertisement 2 having a same advertising campaign as the advertisement 1 to the smartwatch based on the account, so that the watch plays the advertisement 2 for the user to view. Similarly, when the user uses the browser of the tablet computer, the server may send an advertisement 3 to the tablet computer based on the account, so that the tablet computer plays the advertisement 3 for the user to view. When the user uses the browser of the notebook computer, the server may send an advertisement 4 to the notebook computer based on the account, so that the notebook computer plays the advertisement 4 for the user to view. The advertisement 1, the advertisement 2, the advertisement 3, and the advertisement 4 are a series of advertisements having a same advertising campaign. In this way, the mobile phone, the smartwatch, the tablet computer, and the notebook computer of the user are associated by using the account, so that the four terminals can implement cross-device advertisement multi-screen linkage, thereby bringing service continuity user experience.

It may be understood that the foregoing four terminals all belong to personal devices of the user. With the development of IOT technologies, many public-oriented devices, for example, electronic billboards, can also be connected to the internet. However, because the electronic billboard cannot be logged in to by using a same account as the personal device of the user, cross-device advertisement multi-screen linkage cannot be implemented.

In addition, the foregoing four terminals are associated by using an application login account, and there is no direct association relationship between the terminals. Only when applications of the plurality of terminals are logged in to by using a same account, the server sends related content to the terminals, so that the terminals display the related content to the user. In other words, even if a terminal is a personal device of the user, when an application of the terminal of the user is not logged in to by using a same account as an application of another terminal of the user, the server cannot identify that users using different terminals are a same user, and consequently cannot provide cross-device advertisement multi-screen linkage.

To resolve the foregoing problem, an embodiment of this application provides an advertisement multi-screen collaboration method. In some embodiments, a public-oriented device such as an advertising device (for example, an electronic billboard) and one or more terminals of a user may be associated by using a same identifier, which is referred to as a unified identity in embodiments, so that the public-oriented device can implement cross-device advertisement multi-screen linkage with the personal device of the user. In some other embodiments, a plurality of terminals of a user are associated by using a same identifier, for example, a unified identity, so that cross-device advertisement multi-screen linkage can be implemented without a need of using a same account to log in to applications on the personal devices of the user.

The following describes the implementations of embodiments of this application in detail with reference to the accompanying drawings.

Figure 2:
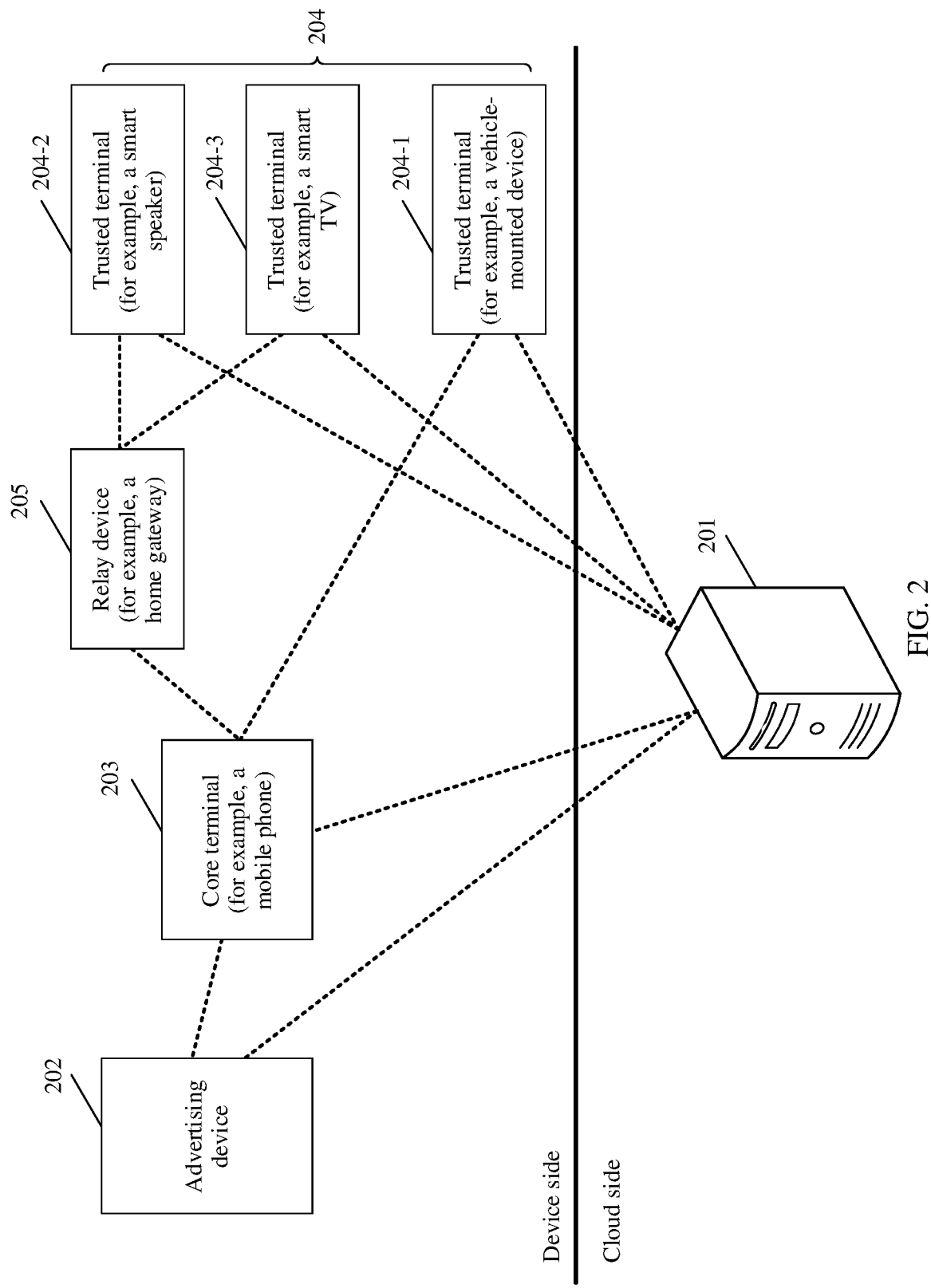
FIG. 2 is a simplified schematic diagram of an advertising system according to an embodiment of this application.

FIG. 2 is a simplified schematic diagram of an advertising system according to an embodiment of this application. As shown in FIG. 2, the advertising system may include at least a server 201, an advertising device 202, and a core terminal 203.

The server 201 is a device that is deployed on a network side (or a cloud side) and that is configured to provide an advertisement resource for an advertisement requester. The server 201 may be an advertisement server or an application server, or may be another type of server. This is not limited in this embodiment of this application. The server 201 may further provide an advertising platform for a brand advertiser (or a customer), so that the brand advertiser places an advertisement. For example, the brand advertiser triggers an advertisement placement task by using the advertising platform. After receiving an advertisement request from the advertisement requester such as the advertising device 202 or the core terminal 203, the server 201 may return a corresponding advertisement resource to the advertisement requester based on the advertisement placement task. The advertisement resource may be advertisement content of the advertisement, or may be a link for downloading advertisement content. It should be noted that the server 201 in this embodiment of this application may be one server, or may be a server cluster including a plurality of servers. This is not specifically limited in this embodiment.

The advertising device 202 is an electronic device that is disposed in public space and that plays an advertisement to the public, for example, an electronic billboard. The advertising device 202 can periodically download and update an advertisement resource in the server 201, and play a corresponding advertisement. In some embodiments, the advertising device 202 may include components such as a display and an audio player (for example, a speaker). These components can work together to play an advertisement. In addition, in an example, the public space may include various public places such as a highway roadside, a community square, an airport, an elevator, and a staircase.

The core terminal 203 may also be referred to as a core device, and is a mobile device that is heavily dependent on by a user and that is a personal device of the user. In some scenarios, the user may have a plurality of terminals. In these scenarios, "heavily dependent on by a user" may indicate a highest use frequency of the user or a highest frequency of performing service interaction with the server 201. In other words, when the user has a plurality of terminals, the core terminal 203 may be a terminal that is used most frequently in the plurality of terminals of the user, or a terminal that performs service interaction with the server 201 most frequently. For example, the core terminal 203 may be a device such as a mobile phone, a tablet computer, a handheld computer, a notebook computer, a cellular phone, a personal digital assistant (personal digital assistant, PDA), a wearable device (such as a band, a smartwatch, or smart glasses), a vehicle-mounted device, a game console, or an augmented reality (augmented reality, AR)/virtual reality (virtual reality, VR) device. A specific form of the core terminal 203 is not specially limited in this embodiment. It should be noted that a first terminal in this application may be the core terminal 203 in this embodiment, or may be another device. This is not specifically limited in this embodiment.

In this embodiment of this application, the core terminal 203 may be configured to automatically generate an identifier, for example, a unified identity. The unified identity corresponds to the core terminal 203, and may be associated with a user using the core terminal 203, in other words, corresponds to a user of the core terminal 203. Unified identities associated with different users are different.

In this embodiment, the unified identity is a newly defined identifier, and is an identifier newly added to the conventional technology. The unified identity and an identifier in the conventional technology may exist simultaneously and independently.

It may be understood that the unified identity may be an identifier different from the identifier in the conventional technology. For example, the unified identity may be represented by using a brand new character string. For example, the unified identity may include a random number, or include two parts: a prefix and a random number. The random number may be a character string of 256 bits or another length. The prefix may be a character string used to distinguish between different equipment vendors (for example, Huawei or other equipment vendors). Alternatively, the unified identity is a newly defined identifier, but the unified identity may use an identifier in the conventional technology, that is, the unified identity may be an identifier in the conventional technology. The core terminal 203 may use the identifier in the conventional technology as the newly defined unified identity. For example, the core terminal 203 is a mobile phone. The unified identity may be an existing device serial number of the mobile phone, for example, an international mobile equipment identity (international mobile equipment identity, IMEI). The unified identity and the device serial number of the mobile phone are two types of identifiers that exist simultaneously and independently. For another example, the core terminal 203 is a mobile phone. The unified identity may be a media access control (media access control, MAC) address of the mobile phone, an integrate circuit card identity (integrate circuit card identity, ICCID), or another existing identifier. For still another example, the core terminal 203 is a mobile phone. The unified identity may be an open advertising identifier (open advertising ID, OAID) of the mobile phone. Alternatively, the unified identity may be an identifier related to an identifier in the conventional technology. For example, the core terminal 203 may generate the unified identity based on the identifier in the conventional technology. For example, the core terminal 203 is a mobile phone. The mobile phone may extract some content of an existing identifier such as a device serial number (for example, an IMEI), a MAC address, an ICCID, or an OAID of the mobile phone, and use the extracted content as the unified identity. For still another example, the core terminal 203 is a mobile phone. The mobile phone may combine existing identifiers of the mobile phone to generate the unified identity.

In addition, in some embodiments of this application, the unified identity may be an identifier preset when the core terminal 203 is delivered from a factory, and the core terminal 203 may obtain the unified identity when being powered on for the first time. It may also be understood that the core terminal 203 generates the unified identity when being powered on for the first time.

In some other embodiments of this application, the unified identity may be an identifier generated after the core terminal 203 is powered on for the first time. For example, the core terminal 203 generates the unified identity after determining that a preset condition is met. For example, the core terminal 203 is a mobile phone 1. When determining that the mobile phone 1 establishes a trusted connection to another device for the first time, the mobile phone 1 generates a unified identity, for example, a unified identity 1. Specifically, the mobile phone 1 may generate the unified identity 1 in a process of establishing the trusted connection to the another device, or may generate the unified identity 1 after establishing the trusted connection to the another device.

For example, the mobile phone 1 requests to access a relay device 205, for example, a Wi-Fi network provided by a wireless fidelity (wireless fidelity, Wi-Fi) router (or referred to as a wireless router). After detecting a Wi-Fi password entered by the user, the mobile phone 1 sends the Wi-Fi password to the Wi-Fi router. After verifying that the Wi-Fi password is valid, the Wi-Fi router establishes a Wi-Fi connection to the mobile phone 1. Because the Wi-Fi connection is a connection established based on a user operation such as an operation of entering a Wi-Fi password by the user, the Wi-Fi connection is a trusted connection authenticated by the user. The mobile phone 1 may generate the unified identity 1 after establishing the trusted connection to the Wi-Fi router. The unified identity 1 corresponds to the mobile phone 1, in other words, corresponds to the user of the mobile phone 1, for example, a user 1.

For another example, the mobile phone 1 requests to establish a Bluetooth connection to a vehicle-mounted device. The user separately performs a Bluetooth pairing operation on the mobile phone 1 and the vehicle-mounted device, and the mobile phone 1 establishes the Bluetooth connection to the vehicle-mounted device. Because the Bluetooth connection is a connection established based on a user operation such as an operation of performing pairing by the user, the Bluetooth connection is a trusted connection authenticated by the user. The mobile phone 1 may generate the unified identity 1 after establishing the trusted connection to the vehicle-mounted device. The unified identity 1 corresponds to the mobile phone 1, in other words, corresponds to the user 1 of the mobile phone 1.

In some other embodiments of this application, the core terminal 203 generates a unified identity after determining that a same user has used the core terminal for a period of time. For example, the core terminal 203 is a mobile phone. After a user purchases a mobile phone, the user may not use the mobile phone but give the mobile phone to another user. Therefore, the newly purchased mobile phone may not generate a unified identity temporarily. The mobile phone may determine, based on a preset algorithm model and a use characteristic such as a use habit, a use manner, or a use frequency of the user, that the same user has used the mobile phone for a period of time, and then generate a unified identity corresponding to the user. In some other embodiments of this application, the core terminal 203 may generate a unified identity according to an instruction of a user. For example, the core terminal 203 is a mobile phone. The user may trigger a corresponding option on a setting menu of the mobile phone, to indicate the mobile phone to generate a unified identity.

In this embodiment of this application, the advertising device 202 may further include a wireless communications module, for example, a Bluetooth module or a Wi-Fi module. The advertising device 202 may send a wireless signal in a broadcast manner by using the wireless communications module. The wireless signal may include bearing information of the advertising device 202 and an identifier of an advertisement that is being played by the advertising device 202. The wireless signal may further include an identifier of the advertising device 202, and the like. The bearing information is used to indicate a position (for example, longitude and latitude) and an orientation of the advertising device 202. When the user, for example, the user 1, approaches the advertising device 202 with the core terminal 203 (for example, the mobile phone 1 of the user 1), the core terminal 203 may automatically receive the wireless signal. When determining, based on the wireless signal and the position (for example, the longitude and the latitude) and a movement direction of the core terminal 203, that a bearing of the core terminal 203 relative to the advertising device 202 meets a preset condition, and duration in which the bearing meets the preset condition is greater than preset exposure duration, the core terminal 203 determines that an advertisement played by the advertising device 202 is effectively exposed to the user 1, in other words, determines that the user 1 pays attention to (or watches) the advertisement played by the advertising device 202. After determining that the user 1 pays attention to the advertisement played by the advertising device 202, the core terminal 203 reports an effective exposure event to the server 201, to indicate that the advertisement played by the advertising device 202 is effectively exposed to the user 1.

The effective exposure event carries the unified identity associated with the user 1, for example, the unified identity 1, so that the server 201 is associated with the user 1. Then, in a process in which the user 1 uses the core terminal 203 (for example, the user 1 uses the mobile phone 1), when the core terminal 203 requests an advertisement from the server 201, the unified identity 1 is also added. Based on the unified identity 1 added when the core terminal 203 requests the advertisement, the server 201 finds that the user 1 is associated, and then the server 201 returns an advertisement that the user 1 is interested in to the core terminal 203, for example, returns, to the core terminal 203, an advertisement having a same advertising campaign as the advertisement played by the advertising device 202 (if the user 1 pays attention to the advertisement, it indicates that the user 1 is interested in the advertisement).

Similarly, a core terminal of another user such as a user 2 (a core terminal or a core device of the user 2, for example, a mobile phone 2) also generates a unified identity associated with the user 2, that is, a unified identity used to identify the user 2 using the core terminal, for example, a unified identity 2. When the user 2 approaches the advertising device 202 with the core terminal, the core terminal may also receive the wireless signal that is broadcast by the advertising device 202. When determining that the advertisement played by the advertising device 202 is effectively exposed to the user 2, in other words, determining that the user 2 pays attention to (or watches) the advertisement played by the advertising device 202, the core terminal of the user 2 also reports an effective exposure event that carries the unified identity associated with the user 2 such as the unified identity 2 to the server 201, so that the server 201 is associated with the user 2. Then, when the user 2 uses the core terminal of the user 2, the unified identity 2 is added when an advertisement needs to be requested. Based on the unified identity 2, the server 201 finds that the user 2 is associated, and then returns an advertisement that the user 2 is interested in to the core terminal of the user 2.

It can be learned that the advertising device 202 (such as an electronic billboard) and a personal device of the user such as the core terminal 203 are associated by using the unified identity corresponding to the user, so that the server 201 can provide advertisements having a same advertising campaign to these devices based on the unified identity. This implements cross-device advertisement multi-screen linkage between the public-oriented device such as the advertising device 202 and the personal device of the user such as the core terminal 203.

The advertising system may further include another terminal, for example, a trusted terminal 204.

The trusted terminal 204 may also be referred to as a trusted device, and is a user-trusted device that can perform service interaction with the core terminal 203. The trusted terminal 204 may be a personal device of the user. It should be noted that, in this embodiment, a home public device may also be considered as a personal device of the user. For example, the trusted terminal 204 may be a smart home device such as a smart TV or a smart speaker, a vehicle-mounted device, or a wearable device such as a band, a smartwatch, or smart glasses. Alternatively, the trusted terminal 204 may be a mobile phone, a tablet computer, a desktop computer, a laptop computer, a handheld computer, a notebook computer, a cellular phone, a PDA (such as a barcode scanner, a radio frequency identification (radio frequency identification devices, RFID) reader/writer, or a point-of-sale (point-of-sale, POS) terminal), a game console, an AR/VR device, or the like. A specific form of the trusted terminal 204 is not specially limited in this embodiment. It should be noted that a second terminal in this application may be the trusted terminal 204 in this embodiment, or may be another device. This is not specifically limited in this embodiment.

In some embodiments, the trusted terminal 204 and the core terminal 203 may directly establish a connection by using a wireless communications protocol, to perform service interaction. For example, the trusted terminal 204 and the core terminal 203 may directly establish a Bluetooth connection by using a Bluetooth protocol. For another example, the trusted terminal 204 and the core terminal 203 may establish Wi-Fi direct by using a Wi-Fi protocol. For example, as shown in FIG. 2, the trusted terminal 204 is a trusted terminal 204-1, for example, a vehicle-mounted device. The vehicle-mounted device and the core terminal 203 may directly establish a Bluetooth connection by using a Bluetooth protocol, to perform service interaction.

In some other embodiments, the trusted terminal 204 and the core terminal 203 may indirectly establish a connection by using a wireless communications protocol, to perform service interaction. For example, the advertising system may further include the relay device 205. The relay device 205 is a user-trusted device that can perform secure access for route distribution. The relay device 205 may be a gateway routing device (or referred to as a home gateway or a Wi-Fi router) deployed at user's home, and may enable another device such as the core terminal 203 or the trusted terminal 204 to access the internet by providing a wireless network. In this embodiment, the trusted terminal 204 and the core terminal 203 may establish a connection through the relay device 205 by using the wireless communications protocol. For example, the trusted terminal 204 and the core terminal 203 both may access a Wi-Fi network provided by the relay device 205. In this way, the trusted terminal 204 and the core terminal 203 may perform service interaction through the relay device 205. For example, the trusted terminal 204 is a trusted terminal 204-2 (for example, a smart speaker) or a trusted terminal 204-3 (for example, a smart TV). The smart speaker, the smart TV, and the core terminal 203 all may access the Wi-Fi network provided by the relay device 205. Then, the smart speaker and the core terminal 203 may perform service interaction through the relay device 204, and the smart TV and the core terminal 203 may also perform service interaction through the relay device 204.

In this embodiment of this application, when establishing a connection to the trusted terminal 204, the core terminal 203 may transfer the unified identity generated by the core terminal 203 to the trusted terminal 204, so that the trusted terminal 204 stores the unified identity. For example, when establishing a connection to the trusted terminal 204-1, the core terminal 203 transfers the unified identity to the trusted terminal 204-1 for storage. For another example, when accessing the wireless network provided by the relay device 205, the core terminal 203 transfers the unified identity to the relay device 205 for storage. When the trusted terminal 204-2 (or the trusted terminal 204-3) accesses the wireless network provided by the relay device 205, the relay device 205 transfers the unified identity to the trusted terminal 204-2 (or the trusted terminal 204-3) for storage. Alternatively, if the trusted terminal 204-2 and the trusted terminal 204-3 have accessed the wireless network provided by the relay device 205, when the core terminal 203 accesses the wireless network provided by the relay device 205, the core terminal 203 may transfer the unified identity to the relay device 205, so that the relay device 204 broadcasts the unified identity to the trusted terminal 204-2 and the trusted terminal 204-3 that have accessed the wireless network provided by the relay device for storage. In this way, in a process in which the user uses the trusted terminal 204, the foregoing unified identity is also added when an advertisement needs to be requested, so that the server 201 returns, based on the added unified identity, an advertisement that the user is interested in to the trusted terminal 204, for example, returns, to the trusted terminal 204, an advertisement having a same advertising campaign as advertisements played by the advertising device 202 and the core terminal 203.

It should be noted that FIG. 2 is shown and described by using an example in which the advertising system includes the advertising device 202. In some other embodiments, the advertising system may not include the advertising device 202, but the advertising system includes the core terminal 203 and at least one trusted terminal 204. In other words, the advertising system includes the server 201, the core terminal 203, and the at least one trusted terminal 204. The core terminal 203 and the at least one trusted terminal 204 all belong to personal devices of the user. In this embodiment, the core terminal 203 and the at least one trusted terminal 204 may also be associated by using the unified identity, so that the server 201 can return an advertisement that the user is interested in to these devices, in other words, return advertisements having a same advertising campaign to these devices. In this way, cross-device advertisement multi-screen linkage can be implemented without a need of using a same account to log in to applications on personal devices of the user.

Figure 3A:
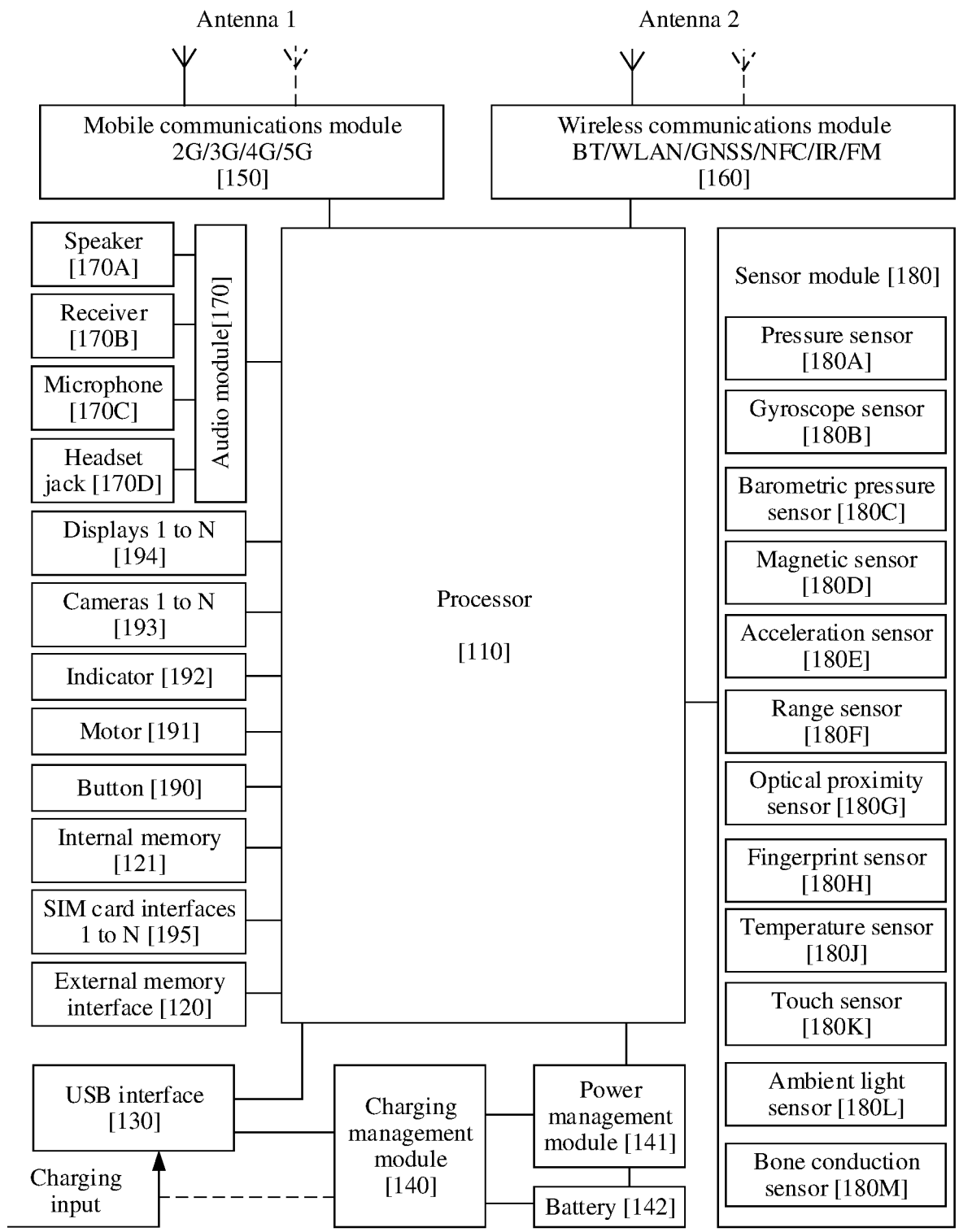
FIG. 3A is a schematic diagram of a structure of a mobile phone according to an embodiment of this application.

In this embodiment, an example in which the core terminal 203 is a mobile phone is used. FIG. 3A is a schematic diagram of a structure of a mobile phone according to an embodiment of this application.

As shown in FIG. 3A, the mobile phone may include a processor 110, an internal memory 121, an antenna 1, an antenna 2, a mobile communications module 150, a wireless communications module 160, an audio module 170, a speaker 170A, a display 194, and the like.

The processor 110 may include one or more processing units. For example, the processor 110 may include an application processor (application processor, AP), a modem processor, a graphics processing unit (graphics processing unit, GPU), an image signal processor (image signal processor, ISP), a controller, a memory, a video codec, a digital signal processor (digital signal processor, DSP), a baseband processor, a neural-network processing unit (neural-network processing unit, NPU), and/or the like. Different processing units may be independent components, or may be integrated into one or more processors. The controller may be a nerve center and a command center of the mobile phone. The controller may generate an operation control signal based on instruction operation code and a time sequence signal, to complete control of instruction fetching and instruction execution.

A memory may be further disposed in the processor 110, and is configured to store instructions and data. In some embodiments, the memory in the processor 110 is a cache. The memory may store an instruction or data that has been used or cyclically used by the processor 110. If the processor 110 needs to use the instructions or the data again, the processor may directly invoke the instructions or the data from the memory. This avoids repeated access and reduces a waiting time of the processor 110, thereby improving system efficiency.

A wireless communication function of the mobile phone may be implemented by using the antenna 1, the antenna 2, the mobile communications module 150, the wireless communications module 160, the modem processor, the baseband processor, and the like.

The antenna 1 and the antenna 2 are configured to transmit and receive electromagnetic wave signals. Each antenna in the mobile phone may be configured to cover one or more communication bands. Different antennas may be further multiplexed, to improve antenna utilization. For example, the antenna 1 may be multiplexed as a diversity antenna of a wireless local area network. In some other embodiments, the antenna may be used in combination with a tuning switch.

The mobile communications module 150 may provide a wireless communication solution that is applied to the mobile phone and that includes 2G/3G/4G/5G or the like. The mobile communications module 150 may include at least one filter, a switch, a power amplifier, a low noise amplifier (low noise amplifier, LNA), and the like. The mobile communications module 150 may receive an electromagnetic wave through the antenna 1, perform processing such as filtering or amplification on the received electromagnetic wave, and transmit a processed electromagnetic wave to the modem processor for demodulation. The mobile communications module 150 may further amplify a signal modulated by the modem processor, and convert an amplified signal into an electromagnetic wave for radiation through the antenna 1. For example, in this embodiment of this application, the mobile phone may send an advertisement request that carries a unified identity to a server by using the mobile communications module 150, and receive an advertisement resource returned by the server. The mobile phone may further send an advertisement event that carries the unified identity to the server by using the mobile communications module 150, and the like. In some embodiments, at least some function modules in the mobile communications module 150 may be disposed in the processor 110. In some embodiments, at least some function modules in the mobile communications module 150 may be disposed in a same device as at least some modules in the processor 110.

The modem processor may include a modulator and a demodulator. The modulator is configured to modulate a to-be-sent low-frequency baseband signal into a medium-high frequency signal. The demodulator is configured to demodulate a received electromagnetic wave signal into a low-frequency baseband signal. Then, the demodulator transmits the low-frequency baseband signal obtained through demodulation to the baseband processor for processing. The low-frequency baseband signal is processed by the baseband processor, and then transmitted to the application processor. The application processor outputs a sound signal through an audio device (which is not limited to the speaker 170A, the receiver 170B, and the like), or displays an image or a video through the display 194, for example, displays an advertisement. In some embodiments, the modem processor may be an independent device. In some other embodiments, the modem processor may be independent of the processor 110, and is disposed in a same device as the mobile communications module 150 or another function module.

The wireless communications module 160 may provide a wireless communication solution that is applied to the mobile phone and that includes a wireless local area network (wireless local area networks, WLAN) (for example, a wireless fidelity (wireless fidelity, Wi-Fi) network), Bluetooth (bluetooth, BT), a global navigation satellite system (global navigation satellite system, GNSS), frequency modulation (frequency modulation, FM), near field communication (near field communication, NFC), an infrared (infrared, IR) technology, or the like. The wireless communications module 160 may be one or more components integrating at least one communications processing module. The wireless communications module 160 receives an electromagnetic wave through the antenna 2, performs frequency modulation and filtering processing on the electromagnetic wave signal, and sends a processed signal to the processor 110. The wireless communications module 160 may further receive a to-be-sent signal from the processor 110, perform frequency modulation and amplification on the signal, and convert a processed signal into an electromagnetic wave for radiation through the antenna 2. For example, in this embodiment of this application, the mobile phone may communicate with another terminal (for example, the foregoing trusted terminal) by using the wireless communications module 160, for example, transfer the unified identity to the trusted terminal.

In some embodiments, in the mobile phone, the antenna 1 and the mobile communications module 150 are coupled, and the antenna 2 and the wireless communications module 160 are coupled, so that the mobile phone can communicate with a network and another device by using a wireless communications technology. The wireless communications technology may include a global system for mobile communications (global system for mobile communications, GSM), a general packet radio service (general packet radio service, GPRS), code division multiple access (code division multiple access, CDMA), wideband code division multiple access (wideband code division multiple access, WCDMA), time-division code division multiple access (time-division code division multiple access, TD-SCDMA), long term evolution (long term evolution, LTE), BT, a GNSS, a WLAN, NFC, FM, an IR technology, and/or the like. The GNSS may include a global positioning system (global positioning system, GPS), a global navigation satellite system (global navigation satellite system, GLONASS), a BeiDou navigation satellite system (beidou navigation satellite system, BDS), a quasi-zenith satellite system (quasi-zenith satellite system, QZSS), and/or a satellite based augmentation system (satellite based augmentation systems, SBAS).

The mobile phone implements a display function by using the GPU, the display 194, the application processor, and the like. The GPU is a microprocessor for image processing, and is connected to the display 194 and the application processor. The GPU is configured to: perform mathematical and geometric computation, and render an image. The processor 110 may include one or more GPUs that execute program instructions to generate or change display information.

The display 194 is configured to display an image, a video, and the like. The display 194 includes a display panel. The display panel may be a liquid crystal display (liquid crystal display, LCD), an organic light-emitting diode (organic light-emitting diode, OLED), an active-matrix organic light emitting diode (active-matrix organic light emitting diode, AMOLED), a flexible light-emitting diode (flex light-emitting diode, FLED), a Miniled, a MicroLed, a MicrooLed, a quantum dot light emitting diode (quantum dot light emitting diodes, QLED), or the like. In some embodiments, the mobile phone may include one or N displays 194, where N is a positive integer greater than 1. For example, in this embodiment of this application, the mobile phone may play an advertisement on the display 194 for a user to watch.

The video codec is configured to compress or decompress a digital video. The mobile phone may support one or more video codecs. In this way, the mobile phone can play or record videos in a plurality of coding formats, for example, moving picture experts group (moving picture experts group, MPEG)1, MPEG2, MPEG3, and MPEG4.

The internal memory 121 may be configured to store computer-executable program code. The executable program code includes instructions. The processor 110 runs the instructions stored in the internal memory 121, to perform various function applications of the mobile phone and process data. The internal memory 121 may include a program storage area and a data storage area. The program storage area may store an operating system, an application required by at least one function (for example, a sound playing function and an image playing function), and the like. The data storage area may store data (for example, audio data or an address book) created when the mobile phone is used, and the like. In addition, the internal memory 121 may include a high-speed random access memory, or may include a nonvolatile memory, for example, at least one magnetic disk storage device, a flash memory, or a universal flash storage (universal flash storage, UFS).

The mobile phone may implement an audio function such as advertisement audio playing by using the audio module 170, the speaker 170A, the application processor, and the like.

The audio module 170 is configured to convert digital audio information into an analog audio signal output, and is also configured to convert an analog audio input into a digital audio signal. The audio module 170 may be further configured to code and decode audio signals. In some embodiments, the audio module 170 may be disposed in the processor 110, or some function modules of the audio module 170 are disposed in the processor 110. The speaker 170A, also referred to as a "horn", is configured to convert an audio electrical signal into a sound signal. The mobile phone may be used to listen to music or answer a hands-free call by using the speaker 170A. For example, in this embodiment of this application, the mobile phone may play audio data of an advertisement by using the speaker 170A.

In some embodiments, as shown in FIG. 3A, the mobile phone may further include an external memory interface 120, a universal serial bus (universal serial bus, USB) interface 130, a charging management module 140, a power management module 141, a battery 142, a receiver 170B, a microphone 170C, a headset interface 170D, a sensor module 180, a button 190, a motor 191, an indicator 192, a camera 193, a subscriber identity module (subscriber identification module, SIM) card interface 195, and the like. The sensor module 180 may include a pressure sensor 180A, a gyroscope sensor 180B, a barometric pressure sensor 180C, a magnetic sensor 180D, an acceleration sensor 180E, a range sensor 180F, an optical proximity sensor 180G, a fingerprint sensor 180H, a temperature sensor 180J, a touch sensor 180K, an ambient light sensor 180L, a bone conduction sensor 180M, and the like.

It may be understood that the structure shown in this embodiment does not constitute a specific limitation on the mobile phone. In some other embodiments, the mobile phone may include more or fewer components than those shown in the figure, or combine some components, or split some components, or may have different component arrangements. The components shown in the figure may be implemented by using hardware, software, or a combination of software and hardware.

Figure 3B:
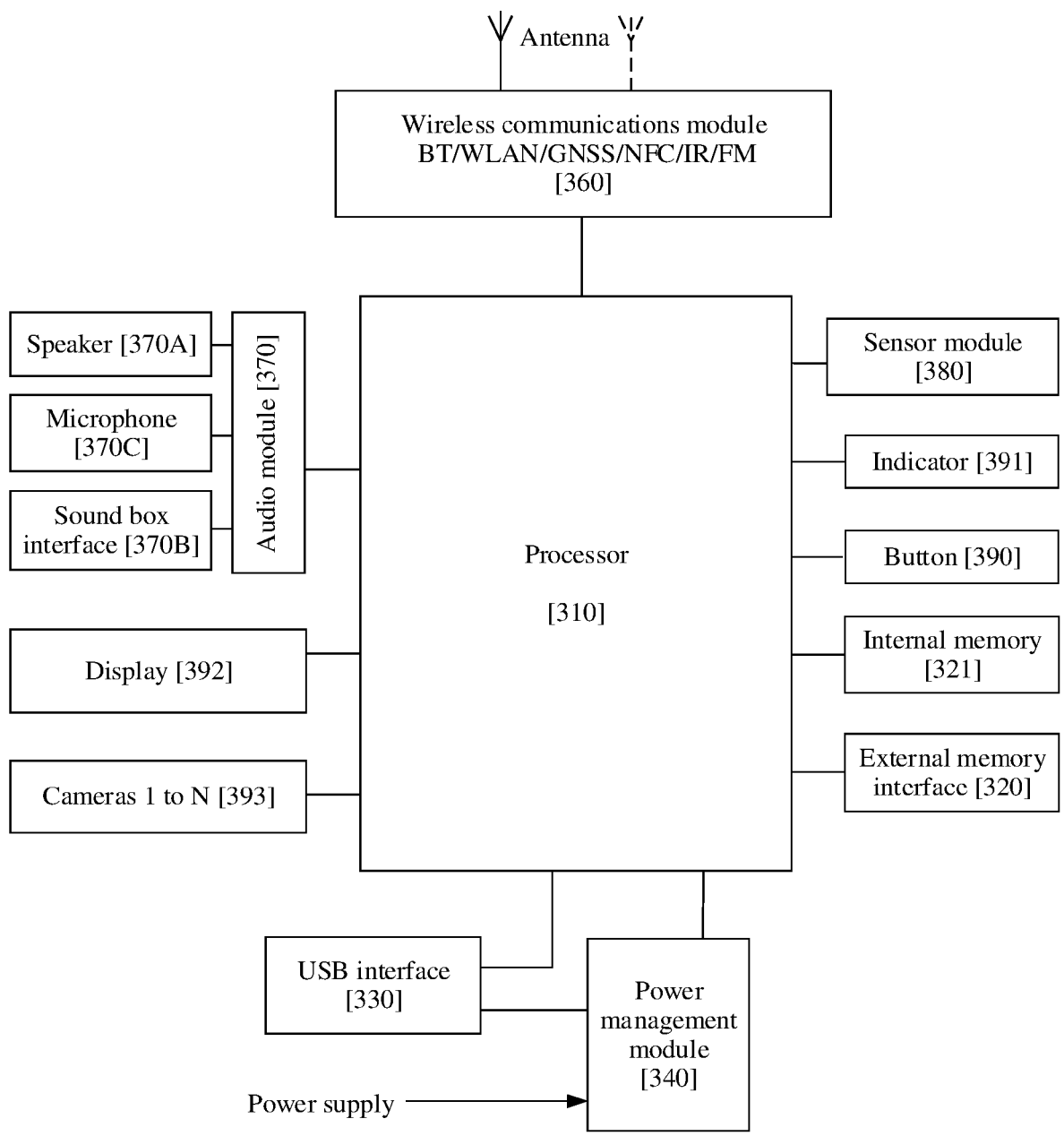
FIG. 3B is a schematic diagram of a structure of a smart TV according to an embodiment of this application.

In this embodiment, an example in which the trusted terminal 204 is a smart TV is used. FIG. 3B is a schematic diagram of a structure of a smart TV according to an embodiment of this application.

As shown in FIG. 3B, the smart TV may include a processor 310, an internal memory 321, an antenna, a wireless communications module 360, an audio module 370, a speaker 370A, a button 390, an indicator 391, a display 392, and the like.

The processor 310 may include one or more processing units. For example, the processor 310 may include an AP, a modem processor, a GPU, an ISP, a controller, a memory, a video codec, a DSP, a baseband processor, and/or an NPU. Different processing units may be independent components, or may be integrated into one or more processors. A memory may be further disposed in the processor 310, and is configured to store instructions and data.

A wireless communication function of the smart TV may be implemented by using the antenna, the wireless communications module 360, and the like. The wireless communications module 360 may provide a wireless communication solution that is applied to the smart TV and that includes a WLAN (for example, a Wi-Fi network), a BT, a GNSS, FM, NFC, IR, or the like.

The wireless communications module 360 may be one or more components integrating at least one communications processing module. The wireless communications module 360 receives an electromagnetic wave through the antenna, performs frequency modulation and filtering processing on the electromagnetic wave signal, and sends a processed signal to the processor 310. The wireless communications module 360 may further receive a to-be-sent signal from the processor 310, perform frequency modulation and amplification on the signal, and convert a processed signal into an electromagnetic wave for radiation through the antenna. In some embodiments, the antenna and the wireless communications module 360 in the smart TV are coupled, so that the smart TV can communicate with a network and another device by using a wireless communications technology. For example, in this embodiment of this application, the smart TV may communicate with the foregoing relay device by using the wireless communications module 360, for example, receive the unified identity from the relay device. Certainly, the smart TV may also communicate with another terminal such as the foregoing core terminal by using the wireless communications module 360.

The smart TV implements a display function by using the GPU, the display 392, the application processor, and the like. The GPU is a microprocessor for image processing, and is connected to the display 392 and the application processor. The GPU is configured to: perform mathematical and geometric computation, and render an image. The processor 310 may include one or more GPUs that execute program instructions to generate or change display information.

The display 392 is configured to display an image, a video, and the like. For example, in this embodiment of this application, the smart TV may display an advertisement by using the display 392. The display 392 includes a display panel. The display panel may be an LCD, an OLED, an AMOLED, an FLED, a Miniled, a MicroLed, a Micro-oLed, a QLED, or the like.

The video codec is configured to compress or decompress a digital video. The smart TV may support one or more video codecs. In this way, the smart TV may play or record videos in a plurality of coding formats, for example, MPEG1, MPEG2, MPEG3 and MPEG4.

The internal memory 321 may be configured to store computer-executable program code. The executable program code includes instructions. The processor 310 runs the instructions stored in the internal memory 321, to perform various function applications of the smart TV and process data. The internal memory 321 may include a program storage area and a data storage area. The program storage area may store an operating system, an application required by at least one function (for example, a sound playing function and an image playing function), and the like. The data storage area may store data (for example, audio data) created when the smart TV is used, and the like. In addition, the internal memory 321 may include a high-speed random access memory, or may include a nonvolatile memory, for example, at least one magnetic disk storage device, a flash memory, or a UFS.

The smart TV may implement an audio function such as advertisement audio playing by using the audio module 370, the speaker 370A, the application processor, and the like. The audio module 370 is configured to convert digital audio information into an analog audio signal output, and is also configured to convert an analog audio input into a digital audio signal. The audio module 370 may be further configured to code and decode audio signals. In some embodiments, the audio module 370 may be disposed in the processor 310, or some function modules of the audio module 370 are disposed in the processor 310. The speaker 370A, also referred to as a "horn", is configured to convert an audio electrical signal into a sound signal. The microphone 370C, also referred to as a "mike" or a "microphone", is configured to convert a sound signal into an electrical signal.

The button 390 includes a power button, a volume button, or the like. The button 390 may be a mechanical button, or may be a touch button. The smart TV may receive a key input, and generate a key signal input related to user settings and function control of the smart TV.

The indicator 391 may be an indicator light, and may be configured to indicate that the smart TV is in a power-on mode, a standby mode, a power-off mode, or the like. For example, if the indicator light is off, it may indicate that the smart TV is in the power-off mode; if the indicator light is green or blue, it may indicate that the smart TV is in the power-on mode; and if the indicator light is red, it may indicate that the smart TV is in the standby mode.

In some embodiments, as shown in FIG. 3B, the smart TV may further include an external memory interface 320, a USB interface 330, a power management module 340, a sound box interface 370B, a microphone 370C, a sensor module 380, 1 to N cameras 393 (N is an integer greater than 1), and the like. The sensor module 380 may include a range sensor, an optical proximity sensor, a fingerprint sensor, a temperature sensor, a touch sensor, an ambient light sensor, and the like. In some other embodiments, the smart TV may not include the camera, in other words, the camera 393 is not disposed in the smart TV. The smart TV may be externally connected to the camera 393 through an interface (for example, the USB interface 330). The external camera 393 may be fastened to the smart TV by using an external fastener (for example, a camera support with a clip). For example, the external camera 393 may be fastened to an edge such as an upper edge of the display 392 of the smart TV by using the external fastener.

It may be understood that the structure shown in this embodiment does not constitute a specific limitation on the smart TV. In some other embodiments, the smart TV may include more or fewer components than those shown in the figure, or combine some components, or split some components, or may have different component arrangements. The components shown in the figure may be implemented by using hardware, software, or a combination of software and hardware.

In addition, in this embodiment, the smart TV may be further connected to a network box such as a set-top box through an interface. In this way, the smart TV may implement interaction with the foregoing server by using the set-top box, for example, send an advertisement request to the server and receive an advertisement response from the server.

In some embodiments, the smart TV is provided with a remote control. The remote control is configured to control the smart TV. The remote control may include a plurality of buttons, such as a power button, a volume button, and a plurality of other selection buttons. The button on the remote control may be a mechanical button, or may be a touch button. The remote control may receive a key input, generate a key signal input related to user settings and function control of the smart TV, and send a corresponding control signal to the smart TV, so as to control the smart TV. For example, the remote control may send a control signal to the smart TV by using an infrared signal or the like. The remote control may further include a battery storage cavity that is configured to mount a battery and supply power to the remote control.

Figure 3C:
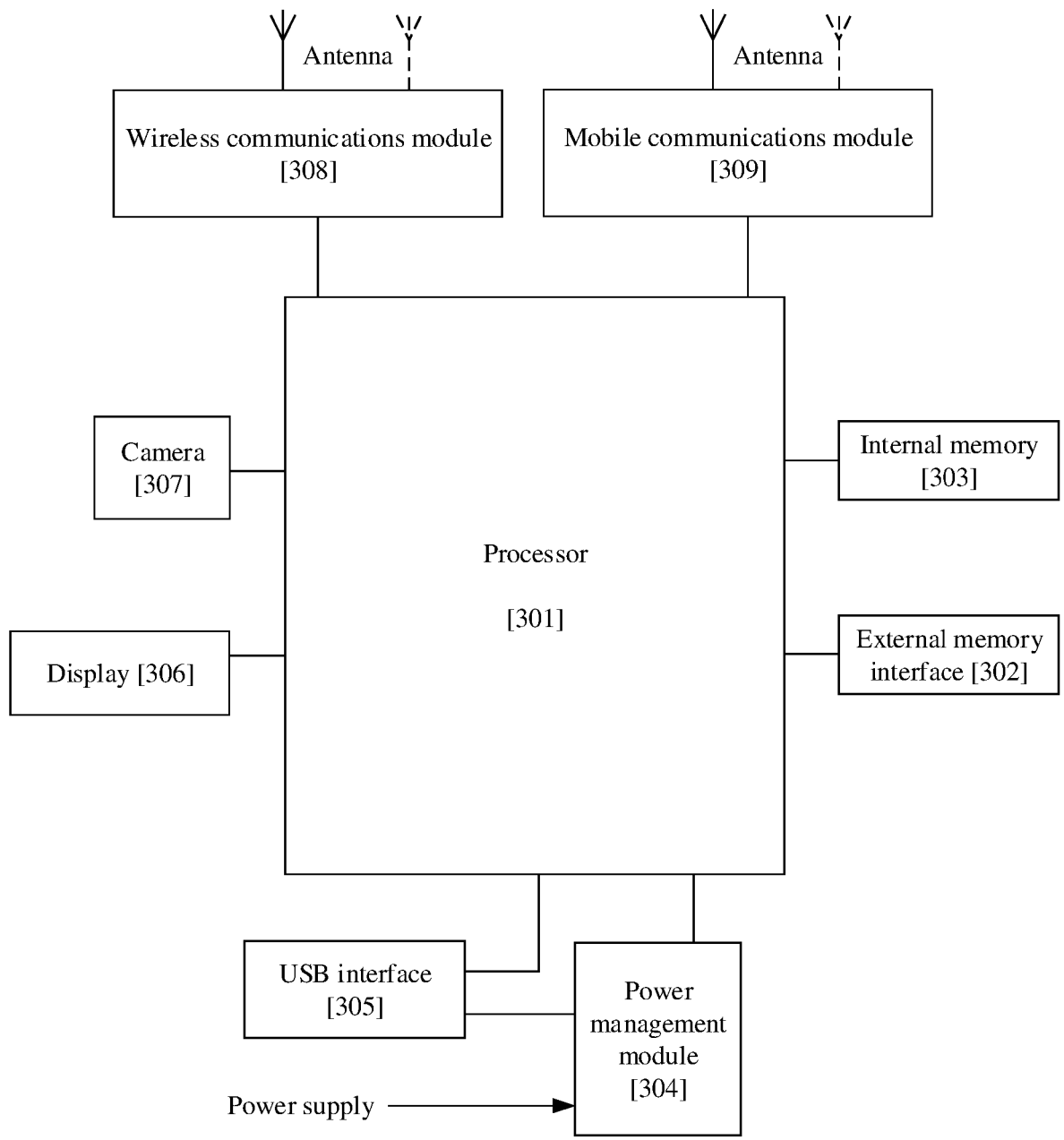
FIG. 3C is a schematic diagram of a structure of an electronic billboard according to an embodiment of this application.

In this embodiment, an example in which the advertising device 202 is an electronic billboard is used. FIG. 3C is a schematic diagram of a structure of an electronic billboard according to an embodiment of this application.

As shown in FIG. 3C, the electronic billboard may include a processor 301, an internal memory 303, a USB interface 305, a power management module 304, an antenna, a wireless communications module 308, a display 306, and the like.

The processor 301 may include one or more processing units. For example, the processor 301 may include an AP, a modem processor, a GPU, an ISP, a controller, a memory, a video codec, a DSP, a baseband processor, and/or an NPU. Different processing units may be independent components, or may be integrated into one or more processors. A memory may be further disposed in the processor 301, and is configured to store instructions and data.

The power management module 304 is configured to connect to a power supply. The power management module 304 may be further connected to the processor 301, the internal memory 303, the display 306, the wireless communications module 308, and the like. The power management module 304 receives an input of the power supply through the USB interface 305, and supplies power to the processor 301, the internal memory 303, the display 306, the wireless communications module 308, and the like. In some embodiments, the power management module 304 may alternatively be disposed in the processor 301.

A wireless communication function of the electronic billboard may be implemented by using the antenna, the wireless communications module 308, and the like. The wireless communications module 308 may provide a wireless communication solution that is applied to the electronic billboard and that includes a WLAN (for example, a Wi-Fi network), Bluetooth (BT), a GNSS, or the like.

The wireless communications module 308 may be one or more components integrating at least one communications processing module. The wireless communications module 308 receives an electromagnetic wave through the antenna, performs frequency modulation and filtering processing on the electromagnetic wave signal, and sends a processed signal to the processor 301. The wireless communications module 308 may further receive a to-be-sent signal from the processor 301, perform frequency modulation and amplification on the signal, and convert a processed signal into an electromagnetic wave for radiation through the antenna. In some embodiments, the antenna and the wireless communications module 308 in the electronic billboard are coupled, so that the electronic billboard can communicate with a network and another device by using a wireless communications technology. For example, the wireless communications module 308 in this embodiment of this application may be a Bluetooth module or a Wi-Fi module. The wireless communications module 308 is configured to broadcast a wireless signal in this embodiment of this application.

Optionally, as shown in FIG. 3C, the electronic billboard may further include a mobile communications module 309. The mobile communications module 309 may be configured to receive an advertisement resource from a server.

The electronic billboard implements a display function by using the GPU, the display 306, the application processor, and the like. The GPU is a microprocessor for image processing, and is connected to the display 306 and the application processor. The GPU is configured to: perform mathematical and geometric computation, and render an image. The processor 301 may include one or more GPUs that execute program instructions to generate or change display information.

The display 306 is configured to display an image, a video, and the like. The display 306 includes a display panel. The display panel may be an LCD, an OLED, an AMOLED, an FLED, a Miniled, a MicroLed, a Micro-oLed, a QLED, or the like. For example, in this embodiment of this application, the display 306 is configured to display an advertisement.

The video codec is configured to compress or decompress a digital video. The electronic billboard may support one or more video codecs. In this way, the electronic billboard may play or record videos in a plurality of coding formats, for example, MPEG1, MPEG2, MPEG3, and MPEG4.

The internal memory 303 may be configured to store computer-executable program code. The executable program code includes instructions. The processor 301 runs the instructions stored in the internal memory 303, to perform various function applications of the electronic billboard and process data. The internal memory 303 may include a program storage area and a data storage area. The program storage area may store an operating system, an application required by at least one function (for example, a sound playing function and an image playing function), and the like. The data storage area may store data (for example, an advertisement play record or a received advertisement resource) created when the electronic billboard is used, and the like. In addition, the internal memory 303 may include a high-speed random access memory, or may include a nonvolatile memory, for example, at least one magnetic disk storage device, a flash memory, or a UFS.

In some embodiments, as shown in FIG. 3C, the electronic billboard may further include an external memory interface 302, a camera 307, and the like.

It may be understood that the structure shown in this embodiment does not constitute a specific limitation on the electronic billboard. In some other embodiments, the electronic billboard may include more or fewer components than those shown in the figure, or combine some components, or split some components, or may have different component arrangements. The components shown in the figure may be implemented by using hardware, software, or a combination of software and hardware.

Figure 3D:
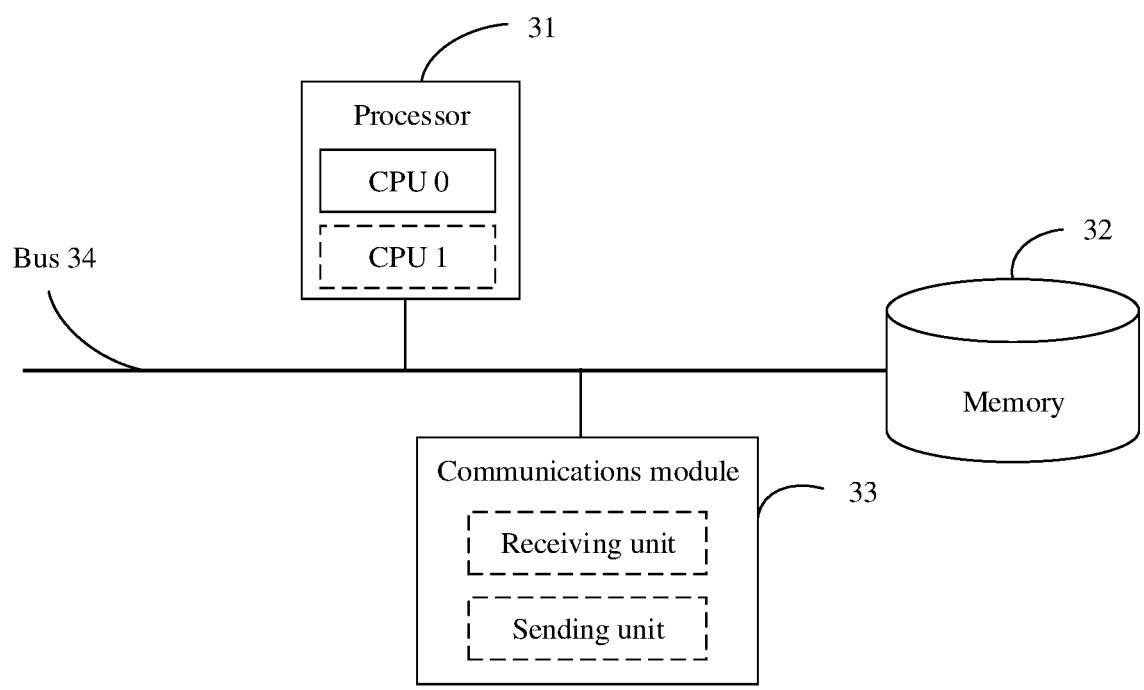
FIG. 3D is a schematic diagram of a structure of a server according to an embodiment of this application.

FIG. 3D is a schematic diagram of a structure of a server according to an embodiment of this application. As shown in FIG. 3D, the server may include one or more processors 31, a memory 32, and a communications module 33. The processor 31, the memory 32, and the communications module 33 may be connected through a bus 34.

The processor 31 is a control center of the server, and may be a general-purpose central processing unit (central processing unit, CPU), another general-purpose processor, or the like. The general-purpose processor may be a microprocessor, any conventional processor, or the like. In an example, the processor 31 may include one or more CPUs, for example, a CPU 0 and a CPU 1 that are shown in FIG. 3.

The memory 32 may be a ROM or another type of static storage device capable of storing static information and instructions, a random access memory (random access memory, RAM) or another type of dynamic storage device capable of storing information and instructions, an electrically erasable programmable read-only memory (electrically erasable programmable read-only memory, EEPROM), a magnetic disk storage medium or another magnetic storage device, or any other medium capable of carrying or storing expected program code in a form of an instruction or a data structure and capable of being accessed by a computer, but is not limited thereto. In a possible implementation, the memory 32 may be independent of the processor 31. The memory 32 may be connected to the processor 31 through the bus 34, and is configured to store instructions or program code. When invoking and executing the instructions or the program code stored in the memory 32, the processor 31 can implement a method provided in embodiments of this application. In another possible implementation, the memory 32 may alternatively be integrated with the processor 31.

The communications module 33 may also be referred to as a communications interface, and is configured to connect the server to another device (for example, the foregoing core terminal or the foregoing trusted terminal) through a communications network. The communications network may be an Ethernet, a radio access network (radio access network, RAN), a WLAN, or the like. The communications module 33 may include a receiving unit configured to receive data and a sending unit configured to send data.

The bus 34 may be an industry standard architecture (Industry Standard Architecture, ISA) bus, a peripheral component interconnect (Peripheral Component Interconnect, PCI) bus, an extended industry standard architecture (Extended Industry Standard Architecture, EISA) bus, or the like. The bus may be classified into an address bus, a data bus, a control bus, and the like. For ease of representation, only one thick line is used to represent the bus in FIG. 3D, but this does not mean that there is only one bus or only one type of bus.

It should be noted that the structure shown in FIG. 3D does not constitute a limitation on the server. In addition to the components shown in FIG. 3D, the server may include more or fewer components than those shown in the figure, or combine some components, or have different component arrangements.

All technical solutions in the following embodiments may be implemented in a device that has the foregoing hardware architecture.

Figures 1, 4A:
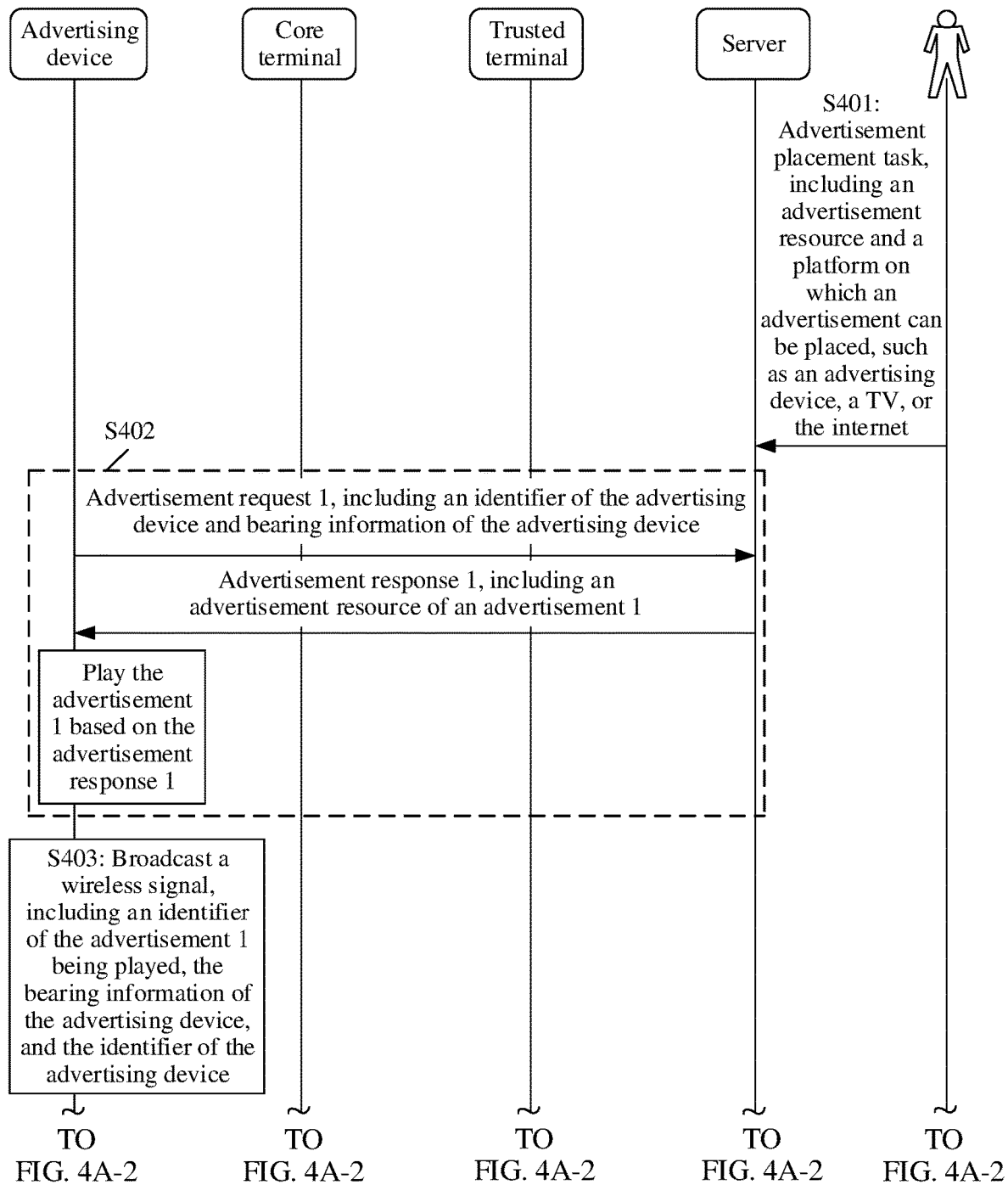
FIG. 4A is a schematic flowchart of an advertisement multi-screen collaboration method according to an embodiment of this application.
Figures 2, 4A:
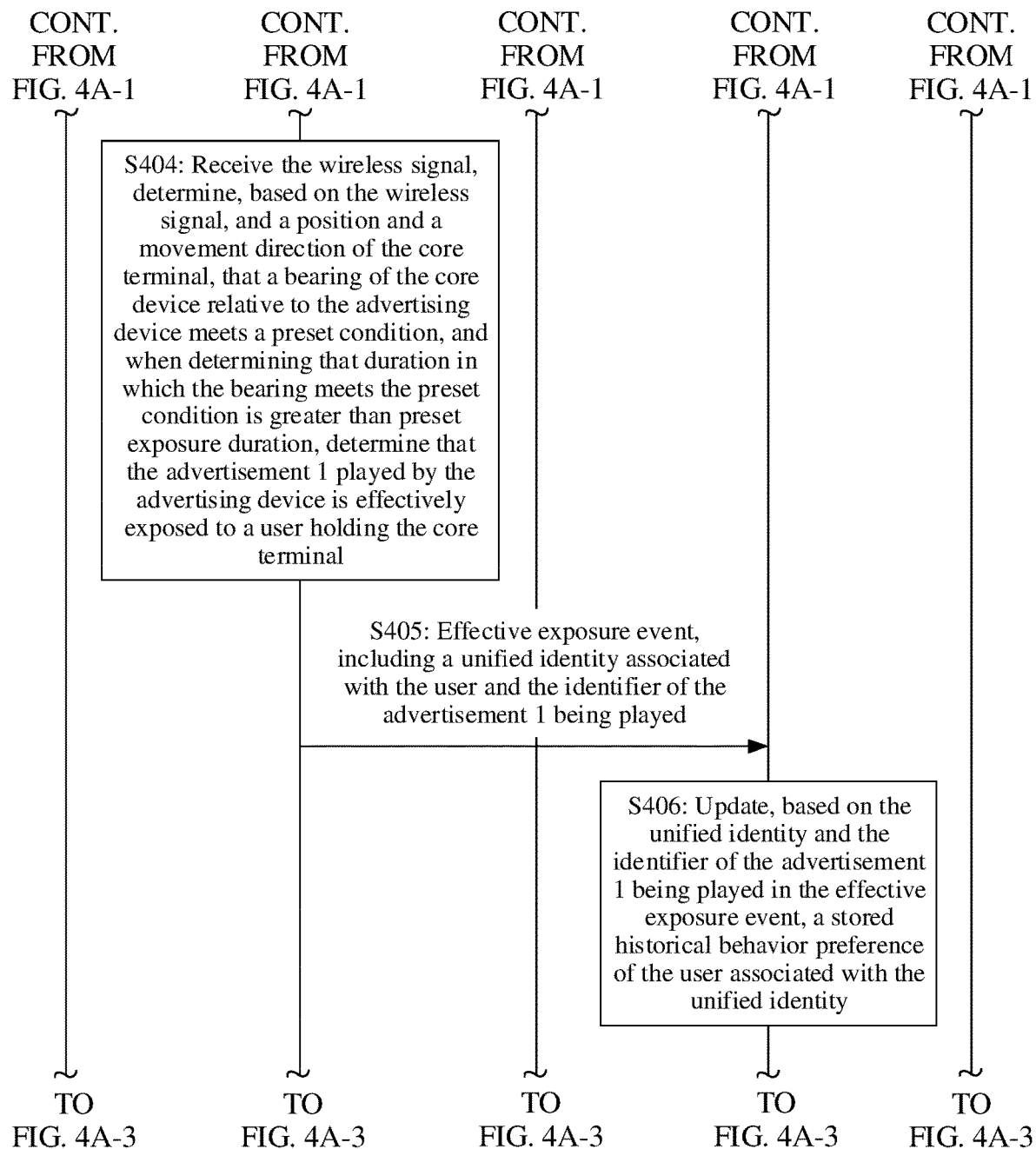
Figures 3, 4A:
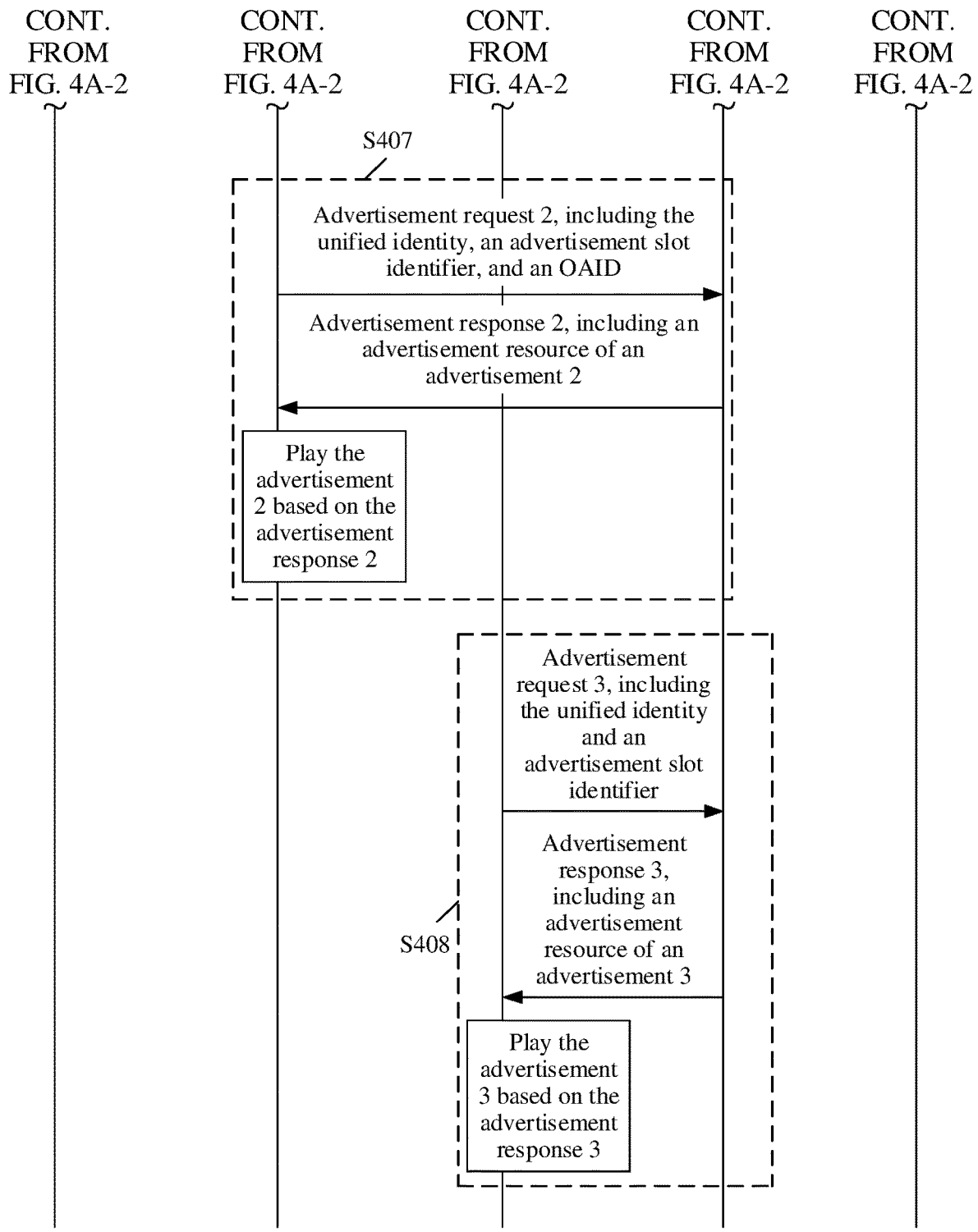

FIG. 4A is a schematic flowchart of an advertisement multi-screen collaboration method according to an embodiment of this application. In this embodiment, an advertising device (for example, an electronic billboard) and one or more terminals of a user may be associated by using a unified identity, which is referred to as a unified identity in this embodiment, so that the advertising device can implement cross-device advertisement multi-screen linkage with the personal device of the user. The method provided in this embodiment is described in detail below with reference to the advertising system shown in FIG. 2. As shown in FIG. 4A, the method may include the following steps.

S401: A server receives an advertisement placement task of a brand advertiser.

The server may be deployed on a network side to provide an advertisement resource for an advertisement requester (that is, a device having an advertisement play requirement). The server may further provide an advertising platform for the brand advertiser to perform advertisement placement. For example, an advertiser of a brand X may trigger an advertisement placement task by using the advertising platform provided by the server, and the advertisement placement task may include an advertisement resource of a car of the brand X. The advertisement placement task may further include a platform on which the advertisement resource of the car of the brand X can be placed, for example, an advertising device (for example, an electronic billboard), a television (television, TV), and the internet. In this embodiment, the advertisement resource may be advertisement content of an advertisement, or may be a link for downloading advertisement content. This is not specifically limited in this embodiment.

S402: The server receives an advertisement request 1 of an advertising device, and returns an advertisement response 1 to the advertising device, and the advertising device plays an advertisement 1 based on the advertisement response 1.

The advertisement request 1 may include an identifier of the advertising device. The advertisement request 1 may further include bearing information of the advertising device, and the bearing information is used to indicate a position (for example, longitude and latitude) and an orientation of the advertising device. The advertisement response 1 may include an advertisement resource provided by the server for the advertising device.

Figure 4B:
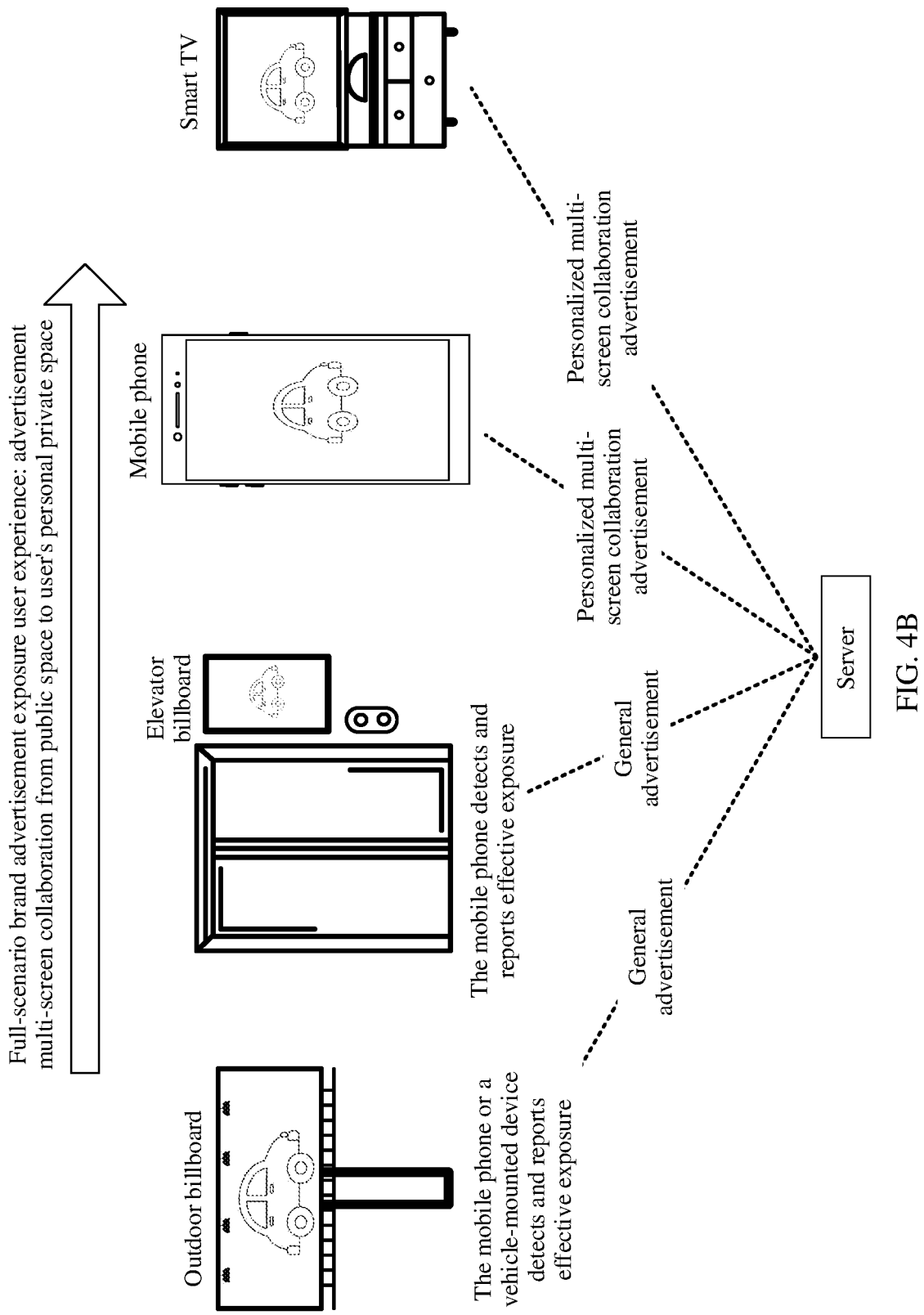
FIG. 4B is a schematic diagram of a cross-device multi-screen collaboration scenario according to an embodiment of this application.

For example, the advertisement requester may send an advertisement request to the server to obtain a corresponding advertisement resource and play the advertisement resource. For example, the advertisement requester is an advertising device, such as an electronic billboard. The electronic billboard may periodically send the advertisement request 1 to the server to request an advertisement resource. The advertisement request 1 may include an identifier of the electronic billboard. The advertisement request 1 may further include bearing information of the electronic billboard, to indicate a position and an orientation of the electronic billboard. After receiving the advertisement request 1 of the electronic billboard, the server may determine, based on an advertisement inventory schedule, an advertisement that can be scheduled to the electronic billboard, for example, the server determines that an advertisement of the car of the brand X in the example of S401 can be scheduled to the electronic billboard. Then, the server may send the advertisement response 1 to the electronic billboard. The advertisement response 1 includes the advertisement resource of the advertisement of the car of the brand X. After receiving the advertisement response 1, the electronic billboard may play the corresponding advertisement based on the advertisement resource carried in the advertisement response 1, for example, the advertisement 1. The advertisement 1 is an advertisement of the car of the brand X. For example, as shown in FIG. 4B, the server may place a general advertisement such as the advertisement of the car of the brand X based on an advertisement request sent by an electronic billboard disposed outdoors, that is, an outdoor billboard. For another example, as shown in FIG. 4B, the server may further place a general advertisement such as the advertisement of the car of the brand X based on an advertisement request sent by an electronic billboard disposed in an elevator, that is, an elevator billboard.

S403: The advertising device broadcasts a wireless signal.

The wireless signal may include an identifier of the advertisement 1 that is being played by the advertising device and the bearing information of the advertising device. The wireless signal may further include the identifier of the advertising device.

For example, when playing an advertisement, the advertising device may send a wireless signal to surroundings in a broadcast manner. The wireless signal may be a beacon (beacon) frame, for example, a Wi-Fi beacon frame in a Wi-Fi protocol or a Bluetooth beacon frame in a Bluetooth protocol. Still with reference to the example in S402, when playing the advertisement of the car of the brand X, the electronic billboard may broadcast a beacon frame. The beacon frame carries an identifier of the advertisement of the car of the brand X that is being played by the electronic billboard and the bearing information of the electronic billboard. The bearing information is used to indicate the position and the orientation of the electronic billboard. The beacon frame may further carry the identifier of the electronic billboard.

S404: A core terminal receives the wireless signal, determines, based on the wireless signal, and a position and a movement direction of the core terminal, that a bearing of the core device relative to the advertising device meets a preset condition, and when determining that duration in which the bearing meets the preset condition is greater than preset exposure duration, determines that the advertisement 1 played by the advertising device is effectively exposed to a user holding the core terminal.

As described in the embodiment shown in FIG. 2, the core terminal is a mobile device that is heavily dependent on by the user and that is a personal device of the user. For example, the core terminal may be a mobile phone, or a wearable device such as a band, a smartwatch, or smart glasses. For another example, the core terminal may be a vehicle-mounted device.

When the advertising device broadcasts the wireless signal, if a terminal (for example, the core terminal) approaches the advertising device, the core terminal may receive (or detect) the wireless signal that is broadcast by the advertising device. Then, the core terminal may determine, based on the received wireless signal, the position and the movement direction of the core terminal, and the preset exposure duration, whether the advertisement 1 currently played by the advertising device is effectively exposed to the user holding the core terminal, in other words, may determine whether the user pays attention to or watches the advertisement 1 currently played by the advertising device. When determining that the advertisement 1 currently played by the advertising device is effectively exposed to the user holding the core terminal, the core terminal performs S405. For example, with reference to FIG. 4B, the core terminal (for example, a mobile phone or a vehicle-mounted device) may detect whether an advertisement currently played by an outdoor billboard and/or an elevator billboard is effectively exposed to the user, and after determining that the advertisement is effectively exposed to the user, the core terminal performs S405.

For example, with reference to the example in S403, when approaching the electronic billboard with the core terminal (for example, a mobile phone 1), a user 1 may detect the beacon frame that is broadcast by the electronic billboard. The mobile phone 1 may obtain a position and a movement direction of the mobile phone 1. Then, the mobile phone 1 determines, based on the position and the orientation of the electronic billboard that are indicated by the bearing information carried in the beacon frame, the obtained position and movement direction of the mobile phone 1, and the preset exposure duration, whether the advertisement of the car of the brand X played by the electronic billboard is effectively exposed to the user 1 holding the mobile phone 1. If the advertisement of the car of the brand X that is played by the electronic billboard is effectively exposed to the user 1 holding the mobile phone 1, S405 is performed.

Figure 4C:
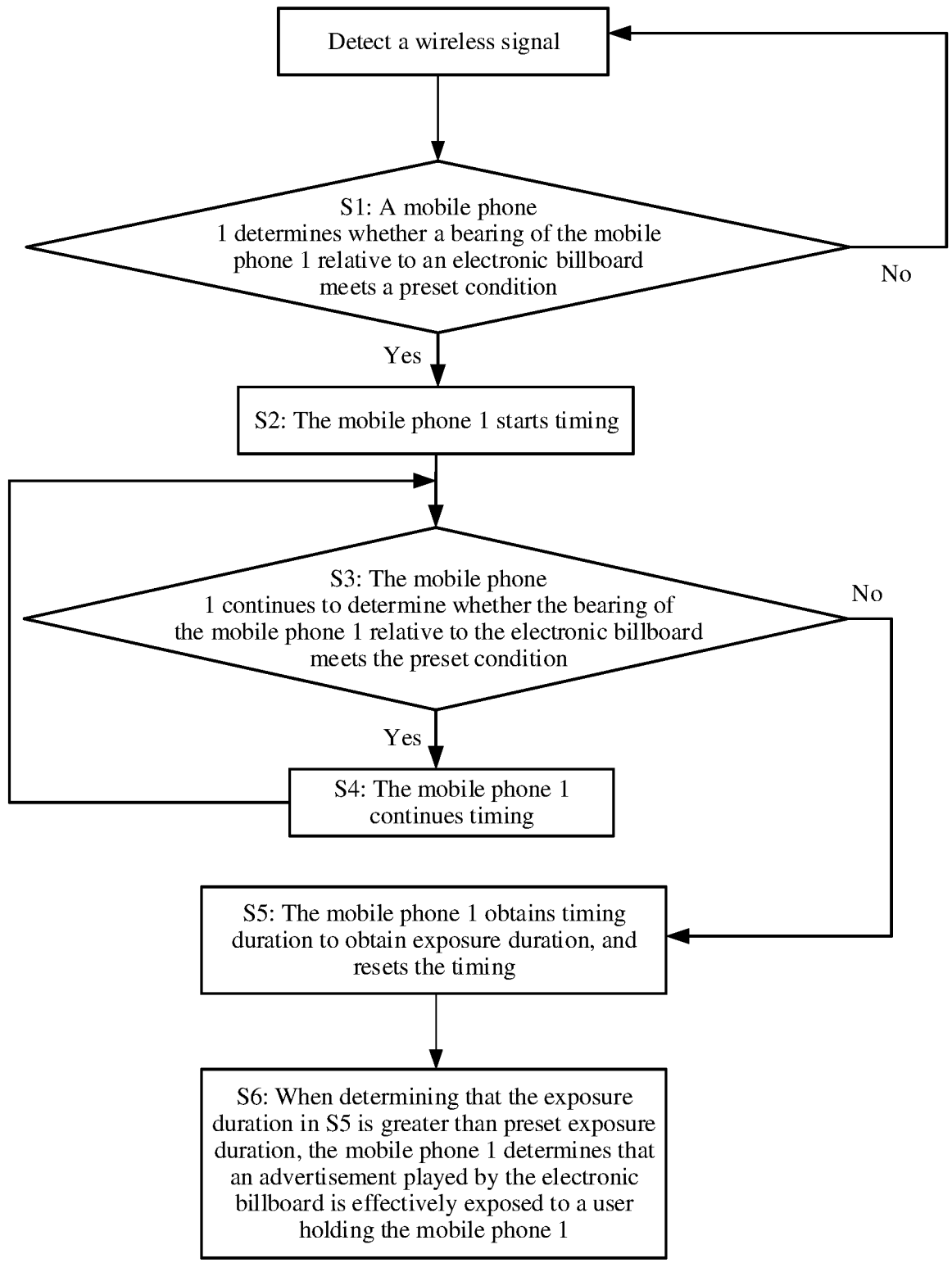
FIG. 4C is a schematic flowchart of determining effective exposure according to an embodiment of this application.

In an example, in this embodiment, as shown in FIG. 4C, that the mobile phone 1 determines, based on the position and the orientation of the electronic billboard that are indicated by the bearing information carried in the beacon frame, the obtained position and movement direction of the mobile phone 1, and the preset exposure duration, whether the advertisement played by the electronic billboard is effectively exposed to the user holding the mobile phone 1 may specifically include S1 to S6.

S1: The mobile phone 1 determines whether a bearing of the mobile phone 1 relative to the electronic billboard meets the preset condition.

That the bearing of the mobile phone 1 relative to the electronic billboard meets the preset condition may be specifically: a distance between the mobile phone 1 and the electronic billboard is within a preset distance range, the mobile phone 1 is located on a side of the orientation of the electronic billboard, and an included angle between the movement direction (or a movement track) of the mobile phone 1 and the orientation of the electronic billboard is within a preset included angle range.

After S1, if the bearing of the mobile phone 1 relative to the electronic billboard meets the preset condition, the mobile phone 1 may perform S2. If the bearing of the mobile phone 1 relative to the electronic billboard does not meet the preset condition, the mobile phone 1 may detect the wireless signal again.

S1 may include S1a, S1b, and S1c.

S1a: The mobile phone 1 determines, based on the position indicated by the bearing information carried in the beacon frame and the position of the mobile phone 1, whether the distance between the mobile phone 1 and the electronic billboard is within the preset distance range.

The beacon frame is a wireless signal that is from the electronic billboard and that is detected by the mobile phone 1. Specifically, the mobile phone 1 may collect the position of the mobile phone 1, and calculate a real-time distance between the position of the mobile phone 1 and the position of the electronic billboard based on the position of the mobile phone 1 and the position indicated by the bearing information in the beacon frame, in other words, calculate the real-time distance between the mobile phone 1 and the electronic billboard. Then, the mobile phone 1 may determine whether the real-time distance is within the preset distance range.

In this embodiment, it may be considered that, only within the preset distance range, the user can clearly watch the advertisement played by the electronic billboard. In other words, only when the mobile phone 1 is within the preset distance range, the user holding the mobile phone 1 may pay attention to the advertisement played by the electronic billboard. Therefore, if the distance between the mobile phone 1 and the electronic billboard is within the preset distance range, the advertisement played by the electronic billboard may be exposed to the user holding the mobile phone 1. In addition, it may be understood that, when the user holding the mobile phone 1 is located on the back of a display of the electronic billboard or the like, even if the distance between the mobile phone 1 and the electronic billboard is within the preset distance range, the user cannot watch the advertisement played by the electronic billboard. Therefore, after determining that the real-time distance is within the preset distance range in S1a, the mobile phone 1 may perform S1b.

If the distance between the mobile phone 1 and the electronic billboard is not within the preset distance range, the user of the mobile phone 1 may not clearly watch the advertisement played by the electronic billboard, and the electronic billboard does not generate exposure to the user holding the mobile phone 1. In this case, the mobile phone 1 may detect the wireless signal again.

S1b: The mobile phone 1 determines, based on the position and the orientation that are indicated by the bearing information carried in the beacon frame, and the position and the movement direction of the mobile phone 1, whether the mobile phone 1 is located on the side of the orientation of the electronic billboard.

Specifically, if the mobile phone 1 is located on the side of the orientation of the electronic billboard, it indicates that the user holding the mobile phone 1 is very likely to watch the advertisement played by the electronic billboard. In this case, the mobile phone 1 may perform S1c. Specifically, if the mobile phone 1 is located on another side of the orientation of the electronic billboard, it indicates that the user holding the mobile phone 1 cannot watch the advertisement played by the electronic billboard. In this case, the mobile phone 1 may detect the wireless signal again.

S1c: The mobile phone 1 determines whether the included angle between the movement direction of the mobile phone 1 and the orientation of the electronic billboard is within the preset included angle range.

It may be understood that, even if the distance between the mobile phone 1 and the electronic billboard is within the preset distance range, and the mobile phone 1 is located on the side of the orientation of the electronic billboard, when the included angle between the movement direction of the mobile phone 1 and the orientation of the electronic billboard is not within the preset included angle range, the user holding the mobile phone 1 may not necessarily watch the advertisement played by the electronic billboard. For example, (a) in FIG. 4D, (c) in FIG. 4D, (e) in FIG. 4D, (g) in FIG. 4D, and (i) in FIG. 4D each show a top view of the electronic billboard and a schematic diagram of the orientation of the electronic billboard and the movement direction of the mobile phone 1. A vector Z1 is used to indicate the orientation of the electronic billboard.

Figure 4D:
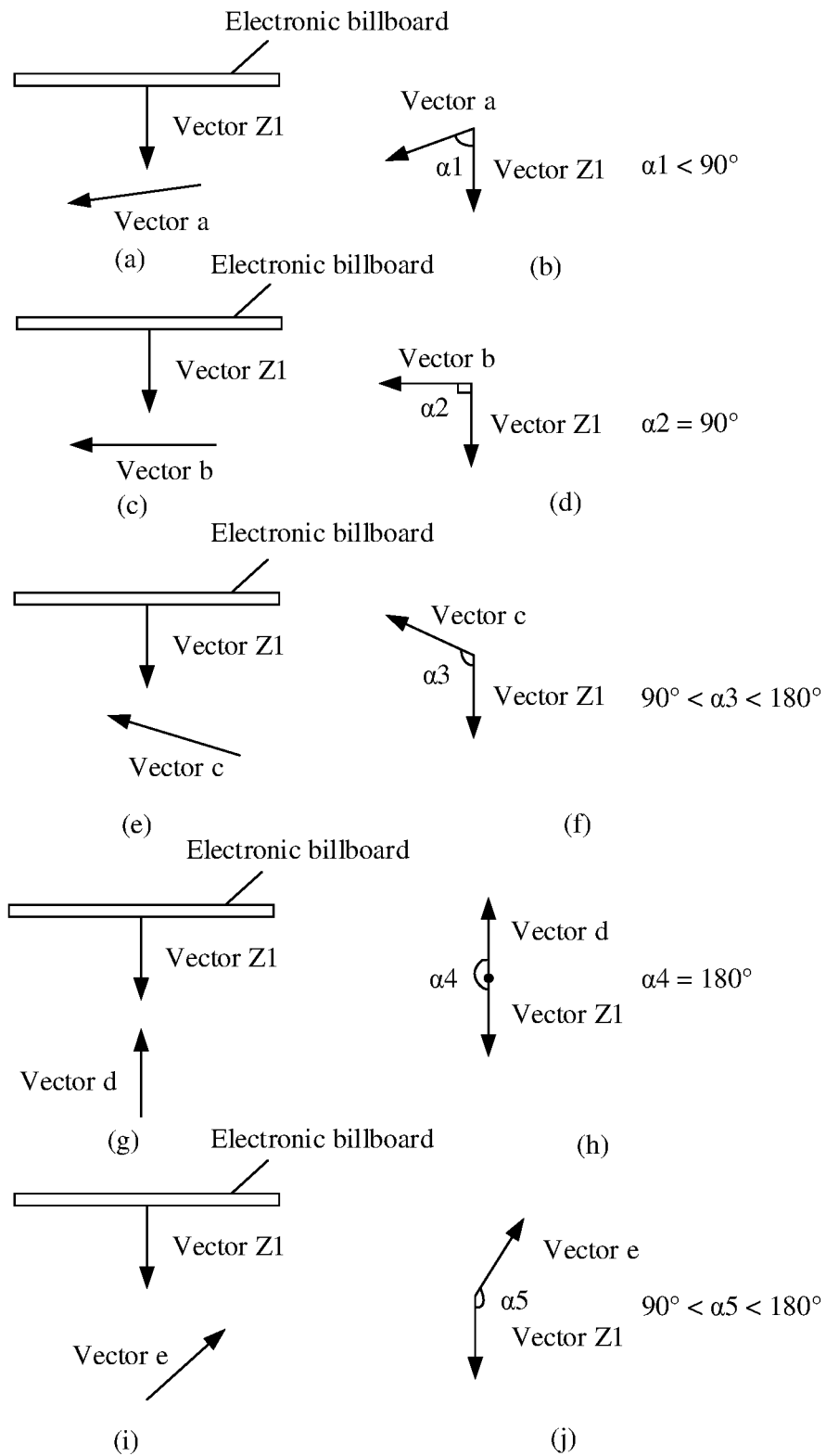
FIG. 4D is a schematic diagram of an orientation of an electronic billboard and a movement direction of a mobile phone according to an embodiment of this application.

When the movement direction of the mobile phone 1 is a direction shown by a vector a shown in (a) in FIG. 4D, the included angle between the movement direction of the mobile phone 1 and the orientation of the electronic billboard is $\alpha 1$ shown in (b) in FIG. 4D, that is, an included angle between the vector a and the vector Z1. Herein, $\alpha 1 < 90°$. Usually, when the movement direction of the mobile phone 1 is the direction shown by the vector a shown in (a) in FIG. 4D, an orientation of the face of the user (that is, the user 1) holding the mobile phone is also the direction shown by the vector a. In this case, it is difficult for the user 1 to clearly and completely watch the advertisement played by the electronic billboard. Therefore, when the included angle between the movement direction of the mobile phone 1 and the orientation of the electronic billboard is less than 90°, the advertisement played by the electronic billboard is not effectively exposed to the user 1.

When the movement direction of the mobile phone 1 is a direction shown by a vector b shown in (c) in FIG. 4D, the included angle between the movement direction of the mobile phone 1 and the orientation of the electronic billboard is $\alpha 2$ shown in (d) in FIG. 4D, that is, an included angle between the vector b and the vector Z1. Herein, $\alpha 2 = 90°$. Usually, when the movement direction of the mobile phone is the direction shown by the vector b shown in (c) in FIG. 4D, an orientation of the face of the user 1 is also the direction shown by the vector b. In this case, it is difficult for the user 1 to clearly and completely watch the advertisement played by the electronic billboard. Therefore, when the included angle between the movement direction of the mobile phone 1 and the orientation of the electronic billboard is equal to 90°, the advertisement played by the electronic billboard is not effectively exposed to the user 1.

When the movement direction of the mobile phone 1 is a direction shown by a vector c shown in (e) in FIG. 4D, the included angle between the movement direction of the mobile phone 1 and the orientation of the electronic billboard is $\alpha 3$ shown in (f) in FIG. 4D, that is, an included angle between the vector c and the vector Z1. Herein, $90° < \alpha 3 < 180°$. Usually, when the movement direction of the mobile phone 1 is the direction shown by the vector c shown in (e) in FIG. 4D, an orientation of the face of the user 1 is also the direction shown by the vector c. In this case, the user 1 can clearly and completely watch the advertisement played by the electronic billboard. Therefore, when the included angle between the movement direction of the mobile phone 1 and the orientation of the electronic billboard is greater than 90° and less than 180°, the advertisement played by the electronic billboard may be effectively exposed to the user 1.

When the movement direction of the mobile phone 1 is a direction shown by a vector d shown in (g) in FIG. 4D, the included angle between the movement direction of the mobile phone 1 and the orientation of the electronic billboard is $\alpha 4$ shown in (h) in FIG. 4D, that is, an included angle between the vector d and the vector Z1. Herein, $\alpha 4 = 180°$. Usually, when the movement direction of the mobile phone 1 is the direction shown by the vector d shown in (g) in FIG. 4D, an orientation of the face of the user 1 is also the direction shown by the vector d. In this case, the user 1 can clearly and completely watch the advertisement played by the electronic billboard. Therefore, when the included angle between the movement direction of the mobile phone 1 and the orientation of the electronic billboard is equal to 180°, the advertisement played by the electronic billboard may be effectively exposed to the user 1.

When the movement direction of the mobile phone 1 is a direction shown by a vector e shown in (i) in FIG. 4D, the included angle between the movement direction of the mobile phone 1 and the orientation of the electronic billboard is $\alpha 5$ shown in (j) in FIG. 4D, that is, an included angle between the vector e and the vector Z1. Herein, $90° < \alpha 5 < 180°$. Usually, when the movement direction of the mobile phone 1 is the direction shown by the vector e shown in (i) in FIG. 4D, an orientation of the face of the user 1 is also the direction shown by the vector e. In this case, the user 1 can clearly and completely watch the advertisement played by the electronic billboard. Therefore, when the included angle between the movement direction of the mobile phone 1 and the orientation of the electronic billboard is greater than 90° and less than 180°, the advertisement played by the electronic billboard may be effectively exposed to the user 1.

Therefore, after S1c, if the included angle between the movement direction of the mobile phone 1 and the orientation of the electronic billboard is within the preset included angle range, it indicates that the electronic billboard may generate exposure to the user holding the mobile phone 1. In this case, the mobile phone 1 may perform S2. If the included angle between the movement direction of the mobile phone 1 and the orientation of the electronic billboard is not within the preset included angle range, it indicates that the electronic billboard does not generate exposure to the user holding the mobile phone 1. In this case, the mobile phone 1 may detect the wireless signal again.

It should be noted that, in this embodiment of this application, when determining whether the bearing of the mobile phone 1 relative to the electronic billboard meets the preset condition, the mobile phone 1 may first determine whether the mobile phone 1 is located on the side of the orientation of the electronic billboard, or may first determine whether the distance between the mobile phone 1 and the electronic billboard is within the preset distance range, or may first determine whether the included angle between the movement direction of the mobile phone 1 and the orientation of the electronic billboard is within the preset included angle range. This is not limited in this embodiment of this application. In other words, a sequence of performing S1a, S1b, and S1c is not specifically limited in this embodiment. For example, in some embodiments, S1a, S1b, and S1c may be performed in a sequence of the foregoing examples. For another example, in some other embodiments, the mobile phone 1 may first perform S1b; after S1b, perform S1a if the mobile phone 1 is located on the side of the orientation of the electronic billboard; and after S1a, perform S1c if the distance between the mobile phone 1 and the electronic billboard is within the preset distance range.

S2: The mobile phone 1 starts timing.

The mobile phone 1 may include a timer. After S1, if the bearing of the mobile phone 1 relative to the electronic billboard meets the preset condition, the mobile phone 1 may start the timer. After the timer is started, the position and the movement direction of the mobile phone 1 may change, and the mobile phone 1 may continue to perform S3, to continue to determine whether the bearing of the mobile phone 1 relative to the electronic billboard meets the preset condition. In other words, after S2, the mobile phone 1 may perform S3.

S3: The mobile phone 1 continues to determine whether the bearing of the mobile phone 1 relative to the electronic billboard meets the preset condition.

It should be noted that, for specific implementation of S3, refer to the related descriptions in S1. Details are not described herein again in this embodiment of this application.

Specifically, after S3, if the bearing of the mobile phone 1 relative to the electronic billboard meets the preset condition, S4 is performed; or if the bearing of the mobile phone 1 relative to the electronic billboard does not meet the preset condition, S5 and S6 are performed.

S4: The mobile phone 1 continues timing, and performs S3.

It may be understood that, after S3, if the bearing of the mobile phone 1 relative to the electronic billboard meets the preset condition, it indicates that the user holding the mobile phone 1 is still paying attention to the advertisement played by the electronic billboard, in other words, the advertisement played by the electronic billboard is still exposed to the user holding the mobile phone 1. In this case, the timer may continue timing.

S5: The mobile phone 1 obtains timing duration to obtain exposure duration, and resets the timing.

It may be understood that, after S3, if the bearing of the mobile phone 1 relative to the electronic billboard does not meet the preset condition, it indicates that the user holding the mobile phone 1 does not pay attention to the advertisement played by the electronic billboard, in other words, the advertisement played by the electronic billboard is not exposed to the user holding the mobile phone 1. In this case, the mobile phone 1 may obtain the timing duration of the timer to obtain the exposure duration. In other words, the timing duration of the timer is the exposure duration.

S6: When determining that the exposure duration in S5 is greater than the preset exposure duration, the mobile phone 1 determines that the advertisement played by the electronic billboard is effectively exposed to the user holding the mobile phone 1.

When the mobile phone 1 determines that the exposure duration is greater than the preset exposure duration, it may be considered that the user continuously pays attention to the advertisement played by the electronic billboard, and therefore the mobile phone may determine that the advertisement played by the electronic billboard is effectively exposed to the user holding the mobile phone 1. Otherwise, the mobile phone 1 detects the wireless signal again. When the exposure duration in S5 is greater than the preset exposure duration, it may be considered that the advertisement played by the electronic billboard is effectively exposed to the user. Therefore, when the exposure duration is greater than the preset exposure duration, the exposure duration may also be used as effective exposure duration.

It should be noted that, in this embodiment, the preset exposure duration, the effective distance range, and the preset included angle range may be pre-configured in the core terminal (for example, the mobile phone 1), or may be added by the advertising device (for example, the electronic billboard) to the wireless signal and then delivered to the core terminal. This is not specifically limited in this embodiment.

S405: The core terminal sends an effective exposure event to the server, where the effective exposure event includes the unified identity associated with the user and the identifier of the advertisement 1 that is being played by the advertising device.

The effective exposure event is used to indicate that the advertisement 1 played by the advertising device is effectively exposed to the user holding the core terminal. The unified identity is generated by the core terminal, corresponds to the core terminal, and may be associated with the user using the core terminal, in other words, corresponds to the user of the core terminal. The effective exposure event may further include one or more of the following information: the identifier of the advertising device, the bearing information of the advertising device, the effective exposure duration, and the like. The effective exposure duration is duration in which the foregoing preset condition is met, that is, duration in which the user pays attention to the advertisement played by the advertising device. In addition, when the unified identity is different from an OAID of the core terminal, the effective exposure event may further include the OAID.

For example, with reference to the example in S404, when the mobile phone 1 determines that the advertisement of the car of the brand X that is played by the electronic billboard is effectively exposed to the user 1 holding the mobile phone 1, the mobile phone 1 may send an effective exposure event that carries the unified identity (for example, the unified identity 1) associated with the user 1 and the identifier of the advertisement of the car of the brand X to the server. For example, the unified identity 1 is different from the OAID of the mobile phone 1. The effective exposure event may further include the identifier of the electronic billboard, the bearing information used to indicate the position and the orientation of the electronic billboard, and the OAID of the mobile phone 1.

S406: The server updates, based on the unified identity carried in the effective exposure event and the identifier of the advertisement 1 that is being played by the advertising device and that is carried in the effective exposure event, a historical preference that is of the user associated with the unified identity and that is stored in the server.

The historical preference is used to represent an advertisement that the user is interested in. For example, the historical preference may include information about one or more advertisements that are effectively exposed to the user (that is, one or more advertisements that the user pays attention to). The information about the advertisement may include an identifier of the advertisement, and may further include effective exposure duration of the advertisement, and the like. The server stores historical preferences of different users. It should be noted that the identifier of the advertisement in this embodiment of this application means an identifier of advertisement content.

For example, in this embodiment of this application, historical preferences of different users may be distinguished by using different identifiers. The identifier may be the foregoing unified identity. Alternatively, when the unified identity is different from an identifier in the conventional technology, the identifier may include only the unified identity, or may include the unified identity and another identifier in the conventional technology, for example, the OAID of the core terminal. For example, the identifier includes only the unified identity. Historical preferences of different users are distinguished by using different unified identities, in other words, the server associate unified identities with users. For example, as shown in Table 1, the server stores a correspondence between different unified identities and different historical preferences of users.

TABLE 1

| Unified identity | Historical preference |
| --- | --- |
| Unified identity 1 | Historical preference of the user 1 |
| Unified identity 2 | Historical preference of a user 2 |
| ... | ... |
| Unified identity_n | Historical preference of a user n |

After receiving the effective exposure event, the server may update, based on the effective exposure event, a historical preference of a corresponding user that is stored in the server. For example, with reference to the example in S405, the mobile phone 1 sends the effective exposure event that carries the unified identity 1 and the identifier of the advertisement of the car of the brand X to the server. After receiving the effective exposure event, the server may update the historical preference of the user 1 corresponding to the unified identity 1, so that an updated historical preference indicates that the user 1 is interested in the advertisement of the car of the brand X (or that the user 1 pays attention to the advertisement of the car of the brand X). Certainly, when receiving the effective exposure event, if the server does not store a historical preference of a user corresponding to a unified identity in the effective exposure event, the server may automatically add (or generate) a record used to represent the historical preference of the user corresponding to the unified identity.

S407: The core terminal sends an advertisement request 2 to the server, receives an advertisement response 2 returned by the server, and plays an advertisement 2 based on the advertisement response 2.

The advertisement request 2 may include the unified identity and an advertisement slot identifier. When the unified identity is different from an OAID, the advertisement request 2 may further include the OAID. The advertisement response 2 may include an advertisement resource provided by the server for the core terminal, for example, an advertisement resource of the advertisement 2. The advertisement slot identifier may be used to indicate information such as a device requesting an advertisement resource, an application, and an advertisement slot position. The advertisement 2 has a same advertising campaign as the advertisement 1 played by the advertising device in S402. A first advertisement request in this application may be the advertisement request 2 in this embodiment. A first advertisement response in this application may be the advertisement response 2 in this embodiment. A second advertisement in this application may be the advertisement 2 in this embodiment. A first advertisement in this application may be the advertisement 1 in this embodiment.

Currently, a large proportion of commercial monetization models of many applications (such as a browser, a video application, and a shopping application) installed in a terminal (such as the core terminal) come from advertisements. Therefore, when the user uses the core terminal, for example, starts such an application of the core terminal, the core terminal may send the advertisement request 2 to the server. In this embodiment, with reference to Table 1 in S406, an example in which historical preferences of different users are distinguished by using different unified identities is used. The advertisement request 2 carries the advertisement slot identifier and the unified identity associated with the user holding the core terminal. After receiving the advertisement request 2, the server may determine, based on the unified identity included in the advertisement request 2, the historical preference of the user holding the core terminal. Then, the server may return a corresponding advertisement response to the core terminal based on the historical preference of the user. An advertisement corresponding to the advertisement resource carried in the advertisement response, for example, the advertisement 2, conforms to the historical preference of the user. For example, the advertisement 2 has a same advertising campaign as the advertisement 1 played by the advertising device in S402. After receiving the advertisement response 2, the core terminal may play the advertisement 2 based on the advertisement response 2. This implements cross-device advertisement multi-screen collaboration between the personal device (for example, the core terminal) of the user and the advertising device. It should be noted that, when the historical preference of the user that is stored in the server indicates that the user is interested in a plurality of advertisements, the server may perform click-through rate (click through rate, CTR) prediction and bidding ranking based on matching with a historical exposure situation of each advertisement and a placement targeting condition of the advertisement, so as to select one or more advertisements from the plurality of advertisements in which the user is interested and feed back the one or more advertisements to the core terminal.

For example, with reference to the example in S406, when the user 1 uses a browser of the mobile phone 1, the mobile phone 1 may send the advertisement request 2 to the server. The advertisement request 2 carries the unified identity 1 and the advertisement slot identifier (for example, a splash position of the browser). After receiving the advertisement request 2, the server may determine the historical preference of the user 1 based on Table 1 and the unified identity 1 carried in the advertisement request 2. For example, the historical preference of the user 1 indicates that the user 1 is interested in the advertisement of the car of the brand X. The server performs CTR prediction and bidding ranking based on matching between the historical preference of the user 1 and each of a historical advertisement exposure situation of the car of the brand X and a brand advertisement placement targeting condition, and decides whether to continue to expose a related advertisement of the car of the brand X in a splash advertisement slot of the browser of the mobile phone 1. If the server determines to continue to expose the related advertisement of the car of the brand X in the splash advertisement slot of the browser of the mobile phone 1, the server may return the advertisement response 2 to the mobile phone 1. The advertisement response 2 includes the related advertisement of the car of the brand X, for example, the advertisement resource of the advertisement 2. Then, the mobile phone 1 plays the advertisement 2 in the splash advertisement slot of the browser. Similarly, when the user 1 uses another application of the mobile phone 1 such as a video application or a shopping application, the mobile phone 1 also sends an advertisement request that carries the unified identity such as the unified identity 1 associated with the user 1 to the server. In this way, the server may also determine the historical preference of the user 1 based on the unified identity 1 carried in the advertisement request, so as to return the related advertisement of the car of the brand X. This can implement cross-application advertisement multi-screen collaboration on one device. In other words, with reference to FIG. 4B, the server may return a personalized multi-screen collaboration advertisement of the user 1, that is, the related advertisement of the car of the brand X, to the mobile phone 1 based on the unified identity 1 carried in the advertisement request sent by the mobile phone 1.

In addition, in this embodiment, if the user performs behavior such as click-to-skip, click-to-close, or click-to-open on an advertisement such as the advertisement 2 displayed by the core terminal, the core terminal may report a corresponding advertisement event to the server. The advertisement event carries the unified identity corresponding to the user holding the core terminal. The advertisement event may further include an identifier of the advertisement 2. After receiving the advertisement event, the server may determine the historical preference of the corresponding user based on the unified identity carried in the advertisement event, and perform corresponding updating. In this way, the server can store historical preferences of the user on a plurality of devices. The plurality of devices include the personal device (for example, the core terminal) of the user and the advertising device (for example, the electronic billboard).

For another device of the user, for example, a trusted terminal, to enable the device to implement advertisement multi-screen linkage with the core terminal and the advertising device, the method provided in this embodiment of this application may further include S408.

S408: The trusted terminal sends an advertisement request 3 to the server, receives an advertisement response 3 returned by the server, and plays an advertisement 3 based on the advertisement response 3.

As described in the embodiment shown in FIG. 2, the trusted terminal is a user-trusted device that can perform service interaction with the core terminal. In an example, the trusted terminal may be a smart home device such as a smart TV or a smart speaker, or the trusted terminal may be a vehicle-mounted device or the like. The advertisement request 3 may include the unified identity and an advertisement slot identifier. The advertisement slot identifier may be used to indicate information such as a device requesting an advertisement resource, an application, and an advertisement slot position. The advertisement response 2 may include an advertisement resource provided by the server for the trusted terminal, for example, an advertisement resource of the advertisement 3. The advertisement 3 has a same advertising campaign as the advertisement 2 played by the core terminal in S407 and the advertisement 1 played by the advertising device in S402. A second advertisement request in this application may be the advertisement request 3 in this embodiment. A second advertisement response in this application may be the advertisement response 3 in this embodiment. A third advertisement in this application may be the advertisement 3 in this embodiment.

It should be noted that the unified identity carried in the advertisement request 3 may be sent by the core terminal to the trusted terminal and stored by the trusted terminal. For example, the core terminal is a mobile phone, and the trusted terminal is a vehicle-mounted device. After entering a vehicle, the user may manually configure the mobile phone to establish a connection to the vehicle-mounted device. Alternatively, when the mobile phone has established a connection to the vehicle-mounted device, after the user enters the vehicle, and wireless functions (such as Bluetooth functions or Wi-Fi functions) of the mobile phone and the vehicle-mounted device are enabled, the mobile phone may automatically establish a connection to the vehicle-mounted device. In a process in which the mobile phone establishes a connection to the vehicle-mounted device or after the mobile phone successfully establishes a connection to the vehicle-mounted device, the mobile phone may send the unified identity generated by the mobile phone to the vehicle-mounted device, so that the vehicle-mounted device stores the unified identity.

For another example, the core terminal is a mobile phone, and the trusted terminal is a smart home device such as a smart TV or a smart speaker. The user manually configures the mobile phone and the smart home device to access a wireless network provided by a relay device (for example, a home gateway) at home. Alternatively, when the mobile phone has accessed the wireless network provided by the home gateway but has not accessed the wireless network currently, and the smart home device has accessed the wireless network provided by the home gateway currently, after the user returns home, if a wireless function of the mobile phone is enabled, the mobile phone may automatically access the wireless network provided by the home gateway. In a process in which the mobile phone accesses the wireless network provided by the home gateway or after the mobile phone successfully accesses the wireless network provided by the home gateway, the mobile phone may send the unified identity generated by the mobile phone to the home gateway. Then, the home gateway sends the unified identity to the smart home device, so that the smart home device stores the unified identity.

When the user uses the trusted terminal, for example, turns on the smart TV or turns on the vehicle-mounted device, the trusted terminal may send the advertisement request 3 to the server. In this embodiment, with reference to Table 1 in S406, an example in which historical preferences of different users are distinguished by using different unified identities is used. The advertisement request 3 carries the advertisement slot identifier and the unified identity that is stored by the trusted terminal. After receiving the advertisement request 3, the server may determine, based on the unified identity included in the advertisement request 3, the historical preference of the user corresponding to the unified identity. Then, the server may return a corresponding advertisement response to the trusted terminal based on the historical preference of the user. An advertisement corresponding to the advertisement resource carried in the advertisement response, for example, the advertisement 3, conforms to the historical preference of the user. For example, the advertisement 3 has a same advertising campaign as the advertisement 1 played by the advertising device in S402 and the advertisement 2 played by the core terminal in S407. After receiving the advertisement response 3, the trusted terminal may play the advertisement 3 based on the advertisement response 3. This implements cross-device advertisement multi-screen collaboration between the personal device (for example, the trusted terminal) of the user and the advertising device, and further implements cross-device advertisement multi-screen collaboration between the personal devices (for example, the core terminal and the trusted terminal) of the user.

For example, with reference to the example in S407, the trusted terminal is a smart TV. The mobile phone 1 has accessed the wireless network provided by the home gateway but has not accessed the wireless network currently (for example, the user 1 leaves home), and the smart TV has accessed the wireless network provided by the home gateway currently. After the user 1 returns home, when the wireless function of the mobile phone 1 is enabled, the mobile phone 1 automatically accesses the wireless network provided by the home gateway. In a process in which the mobile phone 1 accesses the wireless network provided by the home gateway or after the mobile phone successfully accesses the wireless network provided by the home gateway, the mobile phone 1 may send the unified identity 1 to the home gateway. The home gateway sends the unified identity 1 to the smart TV. After receiving the unified identity 1, the smart TV stores the unified identity 1. After the user 1 turns on the smart TV, the smart TV may send the advertisement request 3 to the server. The advertisement request 3 carries the unified identity 1 and the advertisement slot identifier (for example, a home page of the TV). After receiving the advertisement request 3, the server may determine the historical preference of the user 1 based on Table 1 and the unified identity 1 carried in the advertisement request 3. The historical preference of the user 1 indicates that the user 1 is interested in the advertisement of the car of the brand X. The server performs CTR prediction and bidding ranking based on matching between the historical preference of the user 1 and each of a historical advertisement exposure situation of the car of the brand X and a brand advertisement placement targeting condition, and decides whether to continue to expose a related advertisement of the car of the brand X on the home page of the smart TV. If the server determines to continue to expose the related advertisement of the car of the brand X on the home page of the smart TV, the server may return the advertisement response 3 to the smart TV. The advertisement response 3 includes the related advertisement of the car of the brand X, for example, the advertisement resource of the advertisement 3. Then, the smart TV plays the advertisement 3 on the home page. In other words, with reference to FIG. 4B, the server may return a personalized multi-screen collaboration advertisement of the user 1, that is, the related advertisement of the car of the brand X, to the smart TV based on the unified identity 1 carried in the advertisement request sent by the smart TV. It can be understood from FIG. 4B that full-scenario brand advertisement exposure user experience is implemented, that is, advertisement multi-screen collaboration from public space to user's personal private space is implemented.

In addition, in this embodiment, if the user performs behavior such as click-to-skip, click-to-close, or click-to-open on an advertisement such as the advertisement 3 displayed by the trusted terminal, the trusted terminal may report a corresponding advertisement event to the server. The advertisement event carries the unified identity stored by the trusted terminal. The advertisement event may further include an identifier of the advertisement 3. After receiving the advertisement event, the server may determine the historical preference of the corresponding user based on the unified identity carried in the advertisement event, and perform corresponding updating. In this way, the server can store historical preferences of the user on a plurality of devices.

In some embodiments of this application, to implement the foregoing functions, the core terminal includes corresponding hardware structures and/or software modules for performing the functions. In an example, the core terminal may include a nearby module, an awareness module, and an advertising module.

The nearby module may also be referred to as a nearby engine (nearby nearby engine), the awareness module may also be referred to as an awareness engine (awareness awareness engine), and the advertising module may also be referred to as an advertising engine (ads advertising engine). The core terminal may implement functions of the nearby engine, the awareness engine, and the advertising engine through a combination of software and hardware. For example, the core terminal may create a service process 1, and the service process 1 may invoke a wireless communications module (for example, a Bluetooth module or a Wi-Fi module) to implement the function of the nearby engine. For another example, the core terminal may create a service process 2, and the service process 2 may invoke a positioning module (for example, a GPS positioning module) to implement the function of the awareness engine. For another example, the core terminal may create a service process 3, and the service process 3 may invoke a processor and a communications module (for example, a wireless communications module or a mobile communications module) to implement the function of the advertising engine.

Figure 5A:
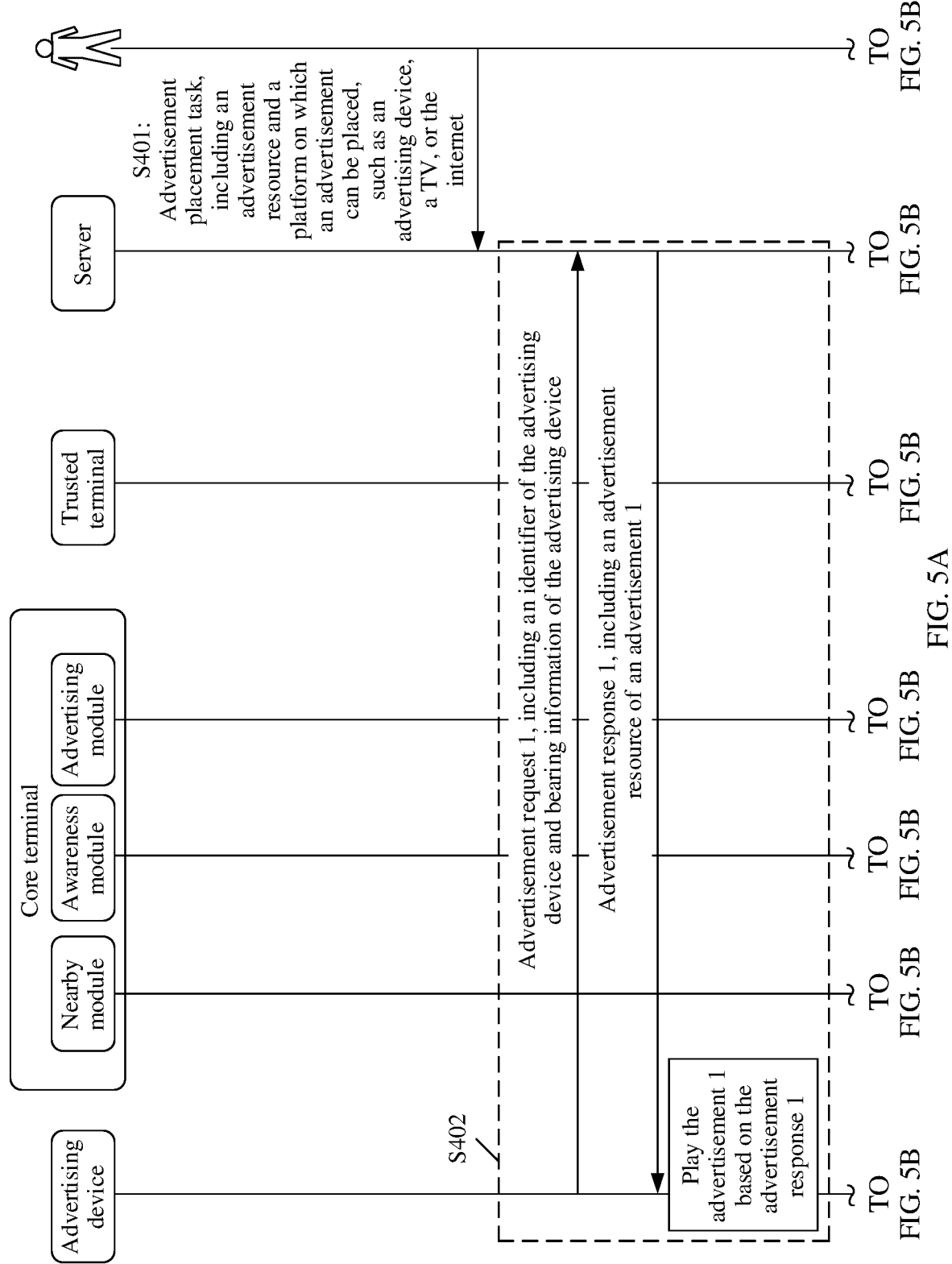
FIG. 5 is a schematic flowchart of another advertisement multi-screen collaboration method according to an embodiment of this application.
Figure 5D:
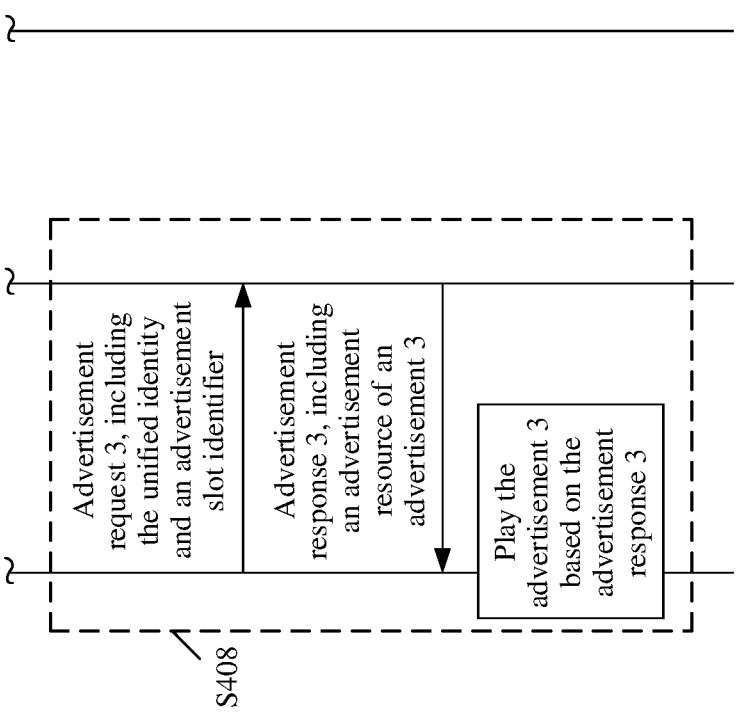
Figure 6B:
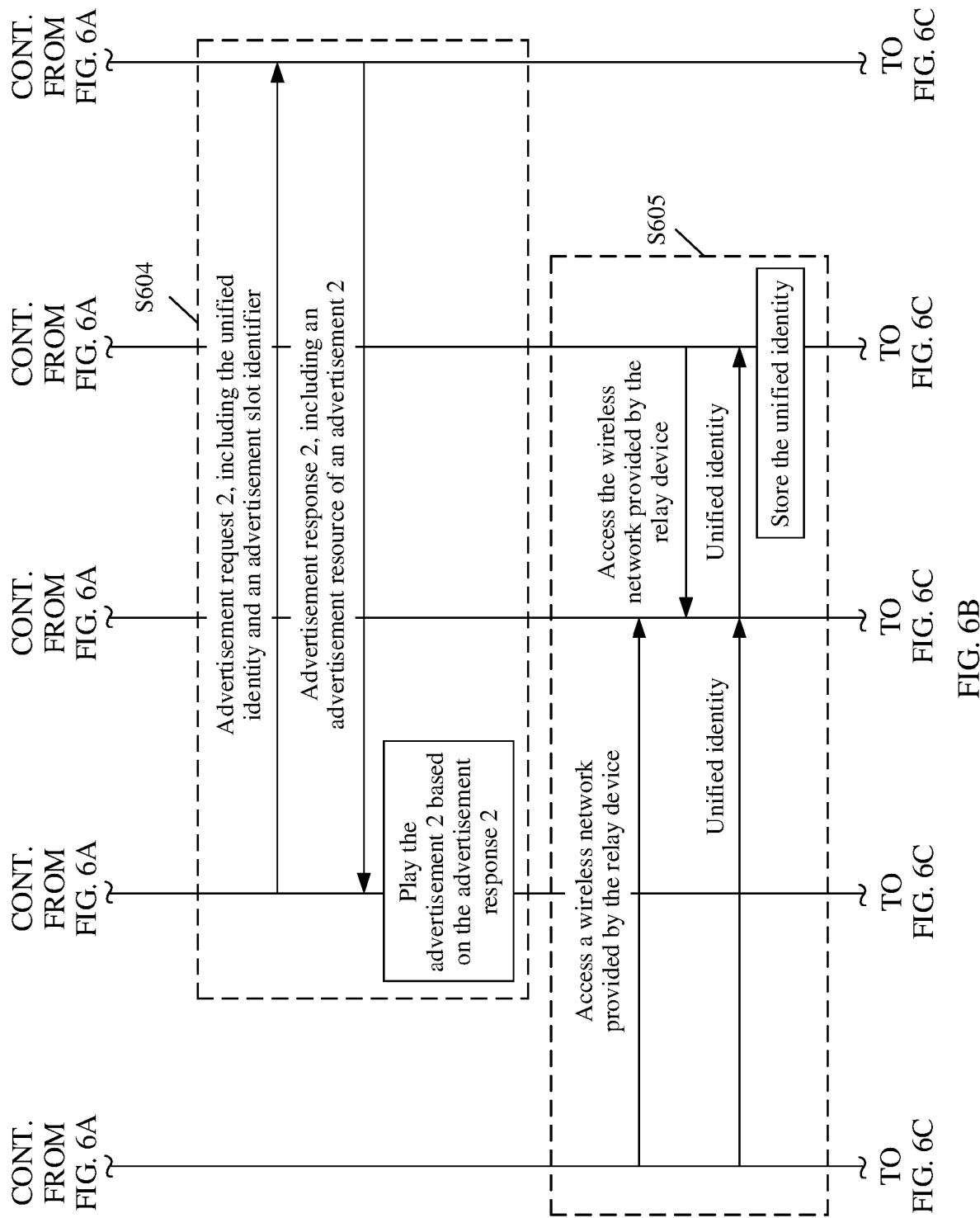
FIG. 6 is a schematic flowchart of still another advertisement multi-screen collaboration method according to an embodiment of this application.
Figure 6C:
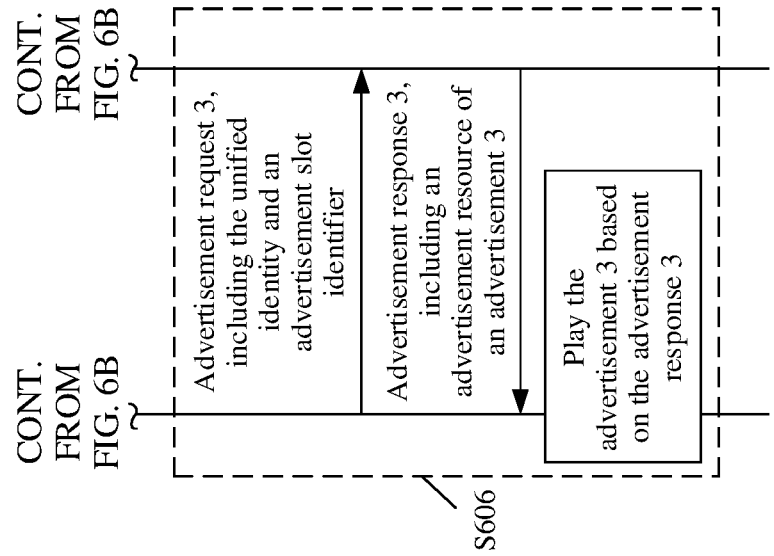
Figure 6C:
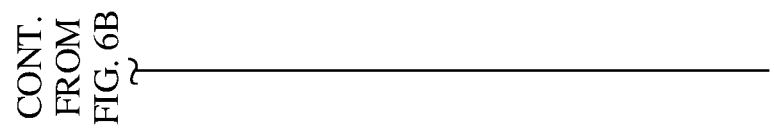
Figure 6C:
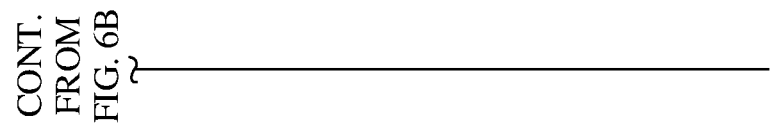
Figure 6C:
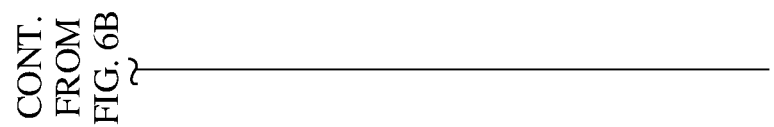

In this embodiment, the nearby module, the awareness module, and the advertising module may cooperate to implement S404, S405, and S407 in the foregoing method embodiment. For example, with reference to FIG. 4A, as shown in FIG. 5, S404 may specifically include: After the core terminal approaches the advertising device, the nearby module of the core terminal may detect the wireless signal that is broadcast by the advertising device. The nearby module reports the detected wireless signal to the advertising module of the core terminal. In addition, the advertising module subscribes to the position (for example, longitude and latitude) and the movement direction of the core terminal from the awareness module of the core terminal, and the awareness module detects the position and the movement direction of the core terminal in real time, and reports the position and the movement direction to the advertising module in real time. Then, the advertising module may determine, based on the wireless signal sent by the nearby module, the position and the movement direction of the core terminal that are reported by the awareness module, and the preset exposure duration, whether the advertisement 1 currently played by the advertising device is effectively exposed to the user holding the core terminal. When the advertising module determines that the advertisement 1 currently played by the advertising device is effectively exposed to the user holding the core terminal, S405 is performed, in other words, the advertising module reports the effective exposure event to the server. In addition, when the user uses an application of the core terminal, S407 may be performed. To be specific, the advertising module sends the advertisement request 2 to the server, receives the advertisement response 2 sent by the server, and plays the advertisement 2 based on the advertisement response 2. For specific descriptions of S404, S405, and S407, and specific descriptions of other steps in FIG. 5, refer to specific descriptions of corresponding steps in the embodiment shown in FIG. 4A. Details are not described herein again.

According to the foregoing technical solution, when playing an advertisement, the advertising device, for example, the electronic billboard, broadcasts a wireless signal, so that a surrounding personal device of the user, for example, the core terminal, can detect the wireless signal. In addition, after determining that the user pays attention to the advertisement played by the advertising device, the core terminal reports the effective exposure event that carries the unified identity associated with the user to the server, so that the server can be associated with the user based on the unified identity. In this way, when sending an advertisement request to the server, the core terminal adds the unified identity to the advertisement request, so that the server can return, to the core terminal based on the unified identity, an advertisement having a same advertising campaign as the advertisement played by the advertising device. In other words, the personal device of the user performs effective exposure detection on the advertisement played by the advertising device, and reports the effective exposure event that carries the unified identity to the server, so that the advertising device and the personal device of the user can be associated by using a same identifier, for example, the unified identity. Therefore, a public-oriented device such as the foregoing advertising device and the personal device of the user can implement cross-device advertisement multi-screen linkage, in other words, implement multi-screen collaboration between an advertisement played by the advertising device (which is referred to as an electronic advertisement) and an advertisement played by the personal device of the user (which is referred to as an internet advertisement or an online advertisement). This enhances exposure impact of a brand advertisement on the user.

In addition, for one device such as the core terminal or the trusted terminal, when different applications included in the device have advertisement display requirements, a same identifier, for example, the foregoing unified identity, is added to the server, so that the server returns corresponding advertisements. This implements cross-application advertisement multi-screen collaboration on one device.

FIG. 6 is a schematic flowchart of an advertisement multi-screen collaboration method according to an embodiment of this application. In this embodiment, a plurality of terminals of a user are associated by using a same identifier, for example, a unified identity, so that cross-device advertisement multi-screen linkage can be implemented without a need of using a same account to log in to applications on the personal devices of the user. The following describes in detail the method provided in this embodiment. As shown in FIG. 6, the method may include the following steps.

S601: A core terminal generates and stores a unified identity associated with a user.

As described in the embodiment shown in FIG. 2, the core terminal is a mobile device that is heavily dependent on by the user and that is a personal device of the user. For example, the core terminal may be a mobile phone, or a wearable device such as a band, a smartwatch, or smart glasses. The unified identity is generated by the core terminal, corresponds to the user of the core terminal, and may be associated with the user using the core terminal.

It should be noted that, in this embodiment, for descriptions of the unified identity, refer to specific descriptions of corresponding content in the embodiment shown in FIG. 2. Details are not described herein again.

S602: The core terminal sends an advertisement request 1 to a server, receives an advertisement response 1 returned by the server, and plays an advertisement 1 based on the advertisement response 1.

The advertisement request 1 may include the unified identity and an advertisement slot identifier. The advertisement slot identifier may be used to indicate information such as a device requesting an advertisement resource, an application, and an advertisement slot position. When the unified identity is different from an OAID, the advertisement request 1 may further include the OAID. The advertisement response 1 may include an advertisement resource provided by the server for the core terminal, for example, an advertisement resource of the advertisement 1.

Currently, a large proportion of commercial monetization models of many applications (such as a browser, a video application, and a shopping application) installed in a terminal (such as the core terminal) come from advertisements. Therefore, when the user uses the core terminal, for example, starts such an application of the core terminal, the core terminal may send the advertisement request 1 to the server.

In this embodiment, the server stores historical preferences of different users. The historical preference is used to represent an advertisement that the user is interested in. For example, the historical preference may include information about one or more advertisements that are effectively exposed to the user (that is, one or more advertisements that the user pays attention to). The information about the advertisement may include an identifier of the advertisement. For example, historical preferences of different users may be distinguished by using different identifiers. The identifier may be the foregoing unified identity. Alternatively, when the unified identity is different from an identifier in the conventional technology, the identifier may include only the unified identity, or may include the unified identity and another identifier in the conventional technology, for example, the OAID of the core terminal. The server may provide a personalized advertisement service of the user for the core terminal based on the historical preference of the user.

For example, historical preferences of different users are distinguished by using different unified identities, in other words, the server associate unified identities with users. For example, the server stores a correspondence between different unified identities and different historical preferences of users. With reference to the example, the advertisement request 1 may carry the advertisement slot identifier and the unified identity associated with the user holding the core terminal. After receiving the advertisement request 1, the server may determine, based on the unified identity included in the advertisement request 1, the historical preference of the user holding the core terminal. Then, the server may return the corresponding advertisement response 1 to the core terminal based on the historical preference of the user. An advertisement corresponding to the advertisement resource carried in the advertisement response 1, for example, the advertisement 1, conforms to the historical preference of the user. After receiving the advertisement response 1, the core terminal may play the advertisement 1 based on the advertisement response 1.

For example, the core terminal is a mobile phone 1 of a user 1. When the user 1 uses a browser of the mobile phone 1, the mobile phone 1 may send the advertisement request 1 to the server. The advertisement request 1 carries a unified identity 1 generated by the mobile phone 1 and an advertisement slot identifier (for example, a splash position of the browser). After receiving the advertisement request 1, the server may determine a historical preference of the user 1 based on the unified identity 1 carried in the advertisement request 1. For example, the historical preference of the user 1 indicates that the user 1 is interested in an advertisement of a mobile phone of a brand Y. The server performs CTR prediction and bidding ranking based on matching between the historical preference of the user 1 and each of a historical advertisement exposure situation of the mobile phone of the brand Y and a brand advertisement placement targeting condition, and decides whether to continue to expose a related advertisement of the mobile phone of the brand Y in a splash advertisement slot of the browser of the mobile phone 1. If the server determines to continue to expose the related advertisement of the mobile phone of the brand Y in the splash advertisement slot of the browser of the mobile phone 1, the server may return the advertisement response 1 to the mobile phone 1. The advertisement response 1 includes the related advertisement of the mobile phone of the brand Y, for example, the advertisement resource of the advertisement 1. Then, the mobile phone 1 plays the advertisement 1 in the splash advertisement slot of the browser. Similarly, when the user 1 uses another application of the mobile phone 1 such as a video application or a shopping application, the mobile phone 1 also sends an advertisement request that carries the unified identity such as the unified identity 1 associated with the user 1 to the server. In this way, the server may also determine the historical preference of the user 1 based on the unified identity 1 carried in the advertisement request, so as to return the related advertisement of the mobile phone of the brand Y. This can implement cross-application advertisement multi-screen collaboration on one device.

Certainly, when receiving the advertisement request 1, if the server does not store a historical preference of a user corresponding to a unified identity in the advertisement request 1, the server may automatically add (or generate) a record used to represent the historical preference of the user corresponding to the unified identity, and update the historical preference of the user based on an advertisement event subsequently returned by a device associated with the unified identity. In this case, CTR prediction and bidding ranking may be performed based on matching with a historical advertisement exposure situation and a brand advertisement placement targeting condition, so as to determine an advertisement returned to the core terminal.

In addition, in this embodiment, if the user performs behavior such as click-to-skip, click-to-close, or click-to-open on an advertisement such as the advertisement 1 displayed by the core terminal, the core terminal may report a corresponding advertisement event to the server. The advertisement event carries the unified identity. The advertisement event may further include an identifier of the advertisement 1. After receiving the advertisement event, the server may determine the historical preference of the corresponding user based on the unified identity carried in the advertisement event, and perform corresponding updating.

For another device of the user, for example, a trusted terminal, to enable the device to implement advertisement multi-screen linkage with the core terminal, the core terminal may send the unified identity generated by the core terminal to the trusted terminal that establishes a connection to the core terminal, so that the trusted terminal stores the unified identity. Then, when requesting an advertisement from the server, the trusted terminal also adds the unified identity. This implements advertisement multi-screen linkage with the core terminal. As described in the embodiment shown in FIG. 2, the trusted terminal is a user-trusted device that can perform service interaction with the core terminal. In an example, the trusted terminal may be a smart home device such as a smart TV or a smart speaker, or the trusted terminal may be a vehicle-mounted device or the like. It should be noted that the trusted terminal automatically deletes the stored unified identity after disconnecting from the core terminal.

In some embodiments, for example, the trusted terminal is a device that can directly establish a connection to the core terminal, for example, a vehicle-mounted device. The method provided in this embodiment of this application may further include S603 and S604.

S603: The core terminal establishes a direct connection to the vehicle-mounted device, the core terminal sends the unified identity to the vehicle-mounted device, and the vehicle-mounted device stores the unified identity.

For example, the core terminal establishes a connection to the vehicle-mounted device by using a Bluetooth protocol, and the core terminal is the mobile phone 1. As described in S601, in some embodiments, if no Bluetooth connection is established between the mobile phone 1 and the vehicle-mounted device, the user may manually configure the mobile phone 1 to establish a Bluetooth connection to the vehicle-mounted device. In some other embodiments, if the mobile phone 1 has established a Bluetooth connection to the vehicle-mounted device but is disconnected from the vehicle-mounted device, when a distance between the mobile phone 1 and the vehicle-mounted device is less than a predetermined distance, for example, when the user enters a vehicle with the mobile phone 1, the mobile phone 1 may automatically establish a Bluetooth connection to the vehicle-mounted device when Bluetooth functions of the mobile phone 1 and the vehicle-mounted device are enabled.

The mobile phone 1 may send the unified identity generated by the mobile phone 1 such as the unified identity 1 to the vehicle-mounted device, so that the vehicle-mounted device stores the unified identity. In a process of establishing a Bluetooth connection to the vehicle-mounted device, the mobile phone 1 may add the unified identity 1 to signaling exchanged with the vehicle-mounted device when the Bluetooth connection is established, and then transmit the signaling to the vehicle-mounted device. Alternatively, after successfully establishing the Bluetooth connection to the vehicle-mounted device, the mobile phone 1 may send the unified identity 1 to the vehicle-mounted device through the established Bluetooth connection.

S604: The vehicle-mounted device sends an advertisement request 2 to the server, receives an advertisement response 2 returned by the server, and plays an advertisement 2 based on the advertisement response 2.

The advertisement request 2 may include the unified identity that is stored by the vehicle-mounted device and an advertisement slot identifier. The advertisement slot identifier may be used to indicate information such as a device requesting an advertisement resource, an application, and an advertisement slot position. The advertisement response 2 may include an advertisement resource provided by the server for the vehicle-mounted device, for example, an advertisement resource of the advertisement 2.

When the user starts the vehicle-mounted device, the vehicle-mounted device may send the advertisement request 2 to the server. In this embodiment, with reference to the example in S602, an example in which historical preferences of different users are distinguished by using different unified identities is used. The advertisement request 2 carries the advertisement slot identifier and the unified identity that is stored by the vehicle-mounted device. After receiving the advertisement request 2, the server may determine, based on the unified identity included in the advertisement request 2, the historical preference of the user corresponding to the unified identity. Then, the server may return a corresponding advertisement response to the vehicle-mounted device based on the historical preference of the user. An advertisement corresponding to the advertisement resource carried in the advertisement response, for example, the advertisement 2, conforms to the historical preference of the user. For example, the advertisement 2 has a same advertising campaign as the advertisement 1 returned to the core terminal in S602. After receiving the advertisement response 2, the vehicle-mounted device may play the advertisement 2 based on the advertisement response 2.

For example, with reference to the example in S602, the mobile phone 1 has established a Bluetooth connection to the vehicle-mounted device, but the current Bluetooth connection is disconnected (for example, the user 1 leaves the vehicle). After the user 1 enters the vehicle, if the Bluetooth functions of the mobile phone 1 and the vehicle-mounted device are enabled, the mobile phone 1 automatically establishes the Bluetooth connection to the vehicle-mounted device. In a process in which the mobile phone 1 establishes the Bluetooth connection to the vehicle-mounted device or after the mobile phone 1 successfully establishes the Bluetooth connection, the mobile phone 1 sends the unified identity 1 to the vehicle-mounted device. After receiving the unified identity 1, the vehicle-mounted device stores the unified identity 1. When the user 1 starts the vehicle-mounted device, the vehicle-mounted device may send the advertisement request 2 to the server. The advertisement request 2 carries the unified identity 1 and the advertisement slot identifier (for example, a home page of the vehicle-mounted device). After receiving the advertisement request 2, the server may determine a historical preference of the user 1 based on the unified identity 1 carried in the advertisement request 2. For example, the historical preference of the user 1 indicates that the user 1 is interested in the advertisement of the mobile phone of the brand Y. The server performs CTR prediction and bidding ranking based on matching between the historical preference of the user 1 (including information about an advertisement that the user pays attention to on another device such as the mobile phone 1) and each of a historical advertisement exposure situation of the mobile phone of the brand Y and a brand advertisement placement targeting condition, and decides whether to continue to expose a related advertisement of the mobile phone of the brand Y in a corresponding advertisement slot of the vehicle-mounted device. If the server determines to continue to expose the related advertisement of the mobile phone of the brand Y in the corresponding advertisement slot of the vehicle-mounted device, the server may return the advertisement response 2 to the vehicle-mounted device. The advertisement response 2 includes the related advertisement of the mobile phone of the brand Y, for example, the advertisement resource of the advertisement 2. Then, the vehicle-mounted device plays the advertisement 2 on the home page.

In addition, in this embodiment, if the user performs behavior such as click-to-skip, click-to-close, or click-to-open on an advertisement such as the advertisement 2 displayed by the vehicle-mounted device, the vehicle-mounted device may report a corresponding advertisement event to the server. The advertisement event carries the unified identity stored by the vehicle-mounted device. The advertisement event may further include an identifier of the advertisement 2. After receiving the advertisement event, the server may determine the historical preference of the corresponding user based on the unified identity carried in the advertisement event, and perform corresponding updating. In this way, the server can store historical preferences of the user on a plurality of devices.

In some other embodiments, for example, the trusted terminal is a device, for example, a smart TV, that needs to establish a connection to the core terminal through a relay device (for example, a home gateway). The method provided in this embodiment of this application may further include S605 and S606.

S605: The core terminal and the smart TV access a wireless network provided by the relay device, the core terminal sends the unified identity to the smart TV, and the smart TV stores the unified identity.

For example, the relay device is a Wi-Fi router, the core terminal and the smart TV access a Wi-Fi network provided by the Wi-Fi router, and the core terminal is the mobile phone 1. As described in S601, in some embodiments, if the mobile phone 1 or the smart TV has not accessed the Wi-Fi network provided by the relay device, the user may manually configure the mobile phone 1 or the smart TV to access the Wi-Fi network provided by the Wi-Fi router. In some other embodiments, if the mobile phone 1 or the smart TV has accessed the Wi-Fi network provided by the relay device but is disconnected from the Wi-Fi network, when the mobile phone 1 or the smart TV enters a radiation range of the Wi-Fi router, and a Wi-Fi function is enabled, the mobile phone 1 or the smart TV may automatically access the Wi-Fi network provided by the Wi-Fi router.

A specific implementation in which the core terminal (for example, the mobile phone 1) sends the unified identity to the smart TV may be as follows: In a process of accessing the Wi-Fi network provided by the Wi-Fi router or after successfully accessing the Wi-Fi network, the mobile phone 1 may send the unified identity generated by the mobile phone 1 such as the unified identity 1 to the Wi-Fi router, so that the Wi-Fi router stores the unified identity. If the smart TV has accessed the Wi-Fi network provided by the Wi-Fi router, after receiving the unified identity 1, the Wi-Fi router may send the unified identity 1 to the smart TV. If the smart TV currently does not access the Wi-Fi network provided by the Wi-Fi router, the Wi-Fi router sends the unified identity 1 to the smart TV after receiving the unified identity 1 and accessing the Wi-Fi network provided by the Wi-Fi router.

S606: The smart TV sends an advertisement request 3 to the server, receives an advertisement response 3 returned by the server, and plays an advertisement 3 based on the advertisement response 3.

The advertisement request 3 may include the unified identity that is stored by the smart TV and an advertisement slot identifier. The advertisement slot identifier may be used to indicate information such as a device requesting an advertisement resource, an application, and an advertisement slot position. The advertisement response 3 may include an advertisement resource provided by the server for the vehicle-mounted device, for example, an advertisement resource of the advertisement 3.

When the user turns on the smart TV, the smart TV may send the advertisement request 3 to the server. In this embodiment, with reference to the example in S602, an example in which historical preferences of different users are distinguished by using different unified identities is used. The advertisement request 3 carries the advertisement slot identifier and the unified identity that is stored by the smart TV. After receiving the advertisement request 3, the server may determine, based on the unified identity included in the advertisement request 3, the historical preference of the user corresponding to the unified identity. Then, the server may return a corresponding advertisement response to the smart TV based on the historical preference of the user. An advertisement corresponding to the advertisement resource carried in the advertisement response, for example, the advertisement 3, conforms to the historical preference of the user. For example, the advertisement 3 has a same advertising campaign as the advertisement 1 returned to the core terminal in S602 and the advertisement 2 returned to the vehicle-mounted device in S604. After receiving the advertisement response 3, the smart TV may play the advertisement 3 based on the advertisement response 3.

For example, with reference to the example in S602, both the mobile phone 1 and the smart TV have accessed the Wi-Fi network provided by the Wi-Fi router at user's home, and the mobile phone 1 has currently disconnected from the Wi-Fi network provided by the Wi-Fi router (for example, the user 1 leaves home), but the smart TV is still connected to the Wi-Fi network provided by the Wi-Fi router. After the user 1 returns home, if the Wi-Fi function of the mobile phone 1 is enabled, the mobile phone 1 may automatically access the Wi-Fi network provided by the Wi-Fi router. In a process in which the mobile phone 1 automatically accesses the Wi-Fi network provided by the Wi-Fi router or after the mobile phone 1 successfully accesses the Wi-Fi network, the mobile phone 1 sends the unified identity 1 to the Wi-Fi router. After receiving the unified identity 1, the Wi-Fi router sends the unified identity 1 to the smart TV. After receiving the unified identity 1, the smart TV stores the unified identity 1. After the user 1 turns on the smart TV, the smart TV may send the advertisement request 3 to the server. The advertisement request 3 carries the unified identity 1 and the advertisement slot identifier (for example, a home page of the TV). After receiving the advertisement request 3, the server may determine a historical preference of the user 1 based on the unified identity 1 carried in the advertisement request 3. For example, the historical preference of the user 1 indicates that the user 1 is interested in the advertisement of the mobile phone of the brand Y. The server performs CTR prediction and bidding ranking based on matching between the historical preference of the user 1 (including information about an advertisement that the user pays attention to on another device such as the mobile phone 1 or the vehicle-mounted device) and each of a historical advertisement exposure situation of the mobile phone of the brand Y and a brand advertisement placement targeting condition, and decides whether to continue to expose a related advertisement of the mobile phone of the brand Y in a corresponding advertisement slot of the smart TV. If the server determines to continue to expose the related advertisement of the mobile phone of the brand Y in the corresponding advertisement slot of the smart TV, the server may return the advertisement response 3 to the smart TV. The advertisement response 3 includes the related advertisement of the mobile phone of the brand Y, for example, the advertisement resource of the advertisement 3. Then, the smart TV plays the advertisement 3 on the home page.

In addition, in this embodiment, if the user performs behavior such as click-to-skip, click-to-close, or click-to-open on an advertisement such as the advertisement 3 displayed by the smart TV, the smart TV may report a corresponding advertisement event to the server. The advertisement event carries the unified identity stored by the smart TV. The advertisement event may further include an identifier of the advertisement 3. After receiving the advertisement event, the server may determine the historical preference of the corresponding user based on the unified identity carried in the advertisement event, and perform corresponding updating. In this way, the server can store historical preferences of the user on a plurality of devices.

It should be noted that the embodiment shown in FIG. 6 is described by using an example of implementing advertisement multi-screen collaboration between a plurality of terminals. In some other embodiments, the embodiment shown in FIG. 6 may be further applied to multi-screen collaboration of other services such as videos, music, e-books, and news, to provide service continuity user experience. In other words, a service for which multi-screen collaboration is implemented is not specifically limited in this embodiment shown in FIG. 6 of this application. The service may be an advertisement, or may be another service such as a video, music, an e-book, or news.

According to the foregoing technical solution, a plurality of terminals of the user are associated with each other by using the unified identity associated with the user. In other words, when requesting advertisements from the server, the plurality of terminals add the same unified identity associated with the user, so that the server can be associated with the user based on the unified identity, and return advertisements having a same advertising campaign to these devices. In this way, cross-device advertisement multi-screen linkage centered on the user (the user associated with the unified identity) can be implemented without a need of using a same account to log in to personal devices of the user.

In addition, for one device such as the core terminal or the trusted terminal, when different applications included in the device have advertisement display requirements, a same identifier, that is, the foregoing unified identity, is added to the server, so that the server returns corresponding advertisements. This implements cross-application advertisement multi-screen collaboration on one device.

Some other embodiments of this application further provide a computer-readable storage medium. The computer-readable storage medium may include computer instructions. When the computer instructions are run on a terminal, for example, the foregoing core terminal, the core terminal is enabled to perform the corresponding steps in the advertisement multi-screen collaboration method in the embodiment shown in FIG. 4A, FIG. 5, or FIG. 6.

Some other embodiments of this application further provide a computer-readable storage medium. The computer-readable storage medium may include computer instructions. When the computer instructions are run on a terminal, for example, the foregoing trusted terminal, the trusted terminal is enabled to perform the corresponding steps in the advertisement multi-screen collaboration method in the embodiment shown in FIG. 4A, FIG. 5, or FIG. 6.

Some other embodiments of this application further provide a computer-readable storage medium. The computer-readable storage medium may include computer instructions. When the computer instructions are run on a server, the server is enabled to perform the corresponding steps in the advertisement multi-screen collaboration method in the embodiment shown in FIG. 4A, FIG. 5, or FIG. 6.

Some other embodiments of this application further provide a computer-readable storage medium. The computer-readable storage medium may include computer instructions. When the computer instructions are run on an advertising device, the advertising device is enabled to perform the corresponding steps in the advertisement multi-screen collaboration method in the embodiment shown in FIG. 4A, FIG. 5, or FIG. 6.

Some other embodiments of this application further provide an apparatus. The apparatus has functions of implementing behavior of the core terminal in the method shown in FIG. 4A, FIG. 5, or FIG. 6. The functions may be implemented by hardware, or may be implemented by hardware executing corresponding software. The hardware or software includes one or more modules corresponding to the foregoing functions, for example, a receiving unit or module, a sending unit or module, a determining unit or module, and a generation unit or module.

Some other embodiments of this application further provide an apparatus. The apparatus has functions of implementing behavior of the trusted terminal in the method shown in FIG. 4A, FIG. 5, or FIG. 6. The functions may be implemented by hardware, or may be implemented by hardware executing corresponding software. The hardware or software includes one or more modules corresponding to the foregoing functions, for example, a receiving unit or module and a sending unit or module.

Some other embodiments of this application further provide an apparatus. The apparatus has functions of implementing behavior of the server in the method shown in FIG. 4A, FIG. 5, or FIG. 6. The functions may be implemented by hardware, or may be implemented by hardware executing corresponding software. The hardware or software includes one or more modules corresponding to the foregoing functions, for example, a receiving unit or module, an update unit or module, and a sending unit or module.

Based on the foregoing descriptions of the implementations, persons skilled in the art may clearly understand that for the purpose of convenient and brief descriptions, division into the foregoing function modules is merely used as an example for descriptions. During actual application, the foregoing functions can be allocated to different function modules for implementation according to a requirement, in other words, an inner structure of an apparatus is divided into different function modules to implement all or a part of the functions described above.

In several embodiments provided in this application, it should be understood that the disclosed apparatus and method may be implemented in other manners. For example, the described apparatus embodiments are merely examples. For example, the division into modules or units is merely logical function division and may be other division during actual implementation. For example, a plurality of units or components may be combined or integrated into another apparatus, or some features may be ignored or not performed. In addition, the displayed or discussed mutual couplings or direct couplings or communication connections may be implemented through some interfaces. The indirect couplings or communication connections between the apparatuses or units may be implemented in electrical, mechanical, or another form.

The units described as separate parts may or may not be physically separate, and parts displayed as units may be one or more physical units, in other words, may be located in one place, or may be distributed on different places. Some or all of the units may be selected according to actual requirements to achieve the objectives of the solutions of embodiments.

In addition, function units in embodiments of this application may be integrated into one processing unit, or each of the units may exist alone physically, or two or more units are integrated into one unit. The integrated unit may be implemented in a form of hardware, or may be implemented in a form of a software function unit.

When the integrated unit is implemented in the form of a software function unit and sold or used as an independent product, the integrated unit may be stored in a readable storage medium. Based on such an understanding, the technical solutions of this application essentially, or the part contributing to the prior art, or all or some of the technical solutions may be implemented in the form of a software product. The software product is stored in a storage medium and includes several instructions for instructing a device (which may be a single-chip microcomputer, a chip or the like) or a processor (processor) to perform all or some of the steps of the methods described in embodiments of this application. The foregoing storage medium includes any medium that can store program code, such as a USB flash drive, a removable hard disk, a read-only memory (Read-Only Memory, ROM), a random access memory (Random Access Memory, RAM), a magnetic disk, or an optical disc.

The foregoing descriptions are only specific implementations of this application, but are not intended to limit the protection scope of this application. Any variation or replacement within the technical scope disclosed in this application shall fall within the protection scope of this application. Therefore, the protection scope of this application shall be subject to the protection scope of the claims.

What is claimed is:

1. An advertisement multi-screen collaboration method, wherein the method comprises
    playing, by an advertising device, a first advertisement;
    broadcasting, by the advertising device, a wireless signal, wherein the wireless signal comprises an identifier of the first advertisement and bearing information of the advertising device, and wherein the bearing information indicates a position and an orientation of the advertising device;
    receiving, by a first terminal, the wireless signal;
    determining, by the first terminal, based on the bearing information in the wireless signal, based on a position and a movement direction of the first terminal, and based on a preset exposure duration, that the first advertisement played by the advertising device is effectively exposed to a user of the first terminal;
    sending, by the first terminal, an effective exposure event to a server, wherein the effective exposure event comprises a unified identity and the identifier of the first advertisement, and wherein the unified identity corresponds to the user of the first terminal;
    receiving, by the server, the effective exposure event, and updating, based on the effective exposure event, a historical preference of the user corresponding to the unified identity, wherein the updated historical preference indicates that the user is interested in the first advertisement;
    sending, by the first terminal, a first advertisement request to the server, wherein the first advertisement request comprises the unified identity and a first advertisement slot identifier, and wherein the first advertisement request requests an advertisement resource;
    receiving, by the server, the first advertisement request;
    obtaining, by the server, the updated historical preference corresponding to the unified identity; and
    sending, by the server, a first advertisement response to the first terminal based on the updated historical preference; and
    receiving, by the first terminal, the first advertisement response, wherein the first advertisement response comprises an advertisement resource of a second advertisement, and wherein the second advertisement and the first advertisement have a same advertising campaign.

2. The method according to claim 1, wherein the unified identity is pre-configured in the first terminal.

3. The method according to claim 1, wherein before the sending, by the first terminal, the effective exposure event to the server, the method further comprises:
    generating, by the first terminal, the unified identity.

4. The method according to claim 1, wherein the method further comprises:

sending, by the first terminal, the unified identity to a second terminal;
receiving, by the second terminal, the unified identity;
sending, by the second terminal, a second advertisement request to the server, wherein the second advertisement request comprises the unified identity and a second advertisement slot identifier, and wherein the second advertisement request requests an advertisement resource;
receiving, by the server, the second advertisement request;
obtaining, by the server, the updated historical preference corresponding to the unified identity; and
sending, by the server, a second advertisement response to the second terminal based on the updated historical preference; and
receiving, by the second terminal, the second advertisement response, wherein the second advertisement response comprises an advertisement resource of a third advertisement, and wherein the third advertisement and the first advertisement have a same advertising campaign.

5. The method according to claim 4, wherein the sending, by the first terminal, the unified identity to the second terminal comprises:
sending, by the first terminal, the unified identity to the second terminal through a relay device.

6. An advertisement multi-screen collaboration method, wherein the method comprises:
receiving, by a first terminal, a wireless signal that is broadcast by an advertising device, wherein the wireless signal comprises an identifier of a first advertisement that is being played by the advertising device and bearing information of the advertising device, and wherein the bearing information indicates a position and an orientation of the advertising device;
determining, by the first terminal, based on the bearing information in the wireless signal, based on a position and a movement direction of the first terminal, and based on a preset exposure duration, that the first advertisement played by the advertising device is effectively exposed to a user of the first terminal;
sending, by the first terminal, an effective exposure event to a server, wherein the effective exposure event comprises a unified identity and the identifier of the first advertisement, and wherein the unified identity corresponds to the user of the first terminal;
sending, by the first terminal, a first advertisement request to the server, wherein the first advertisement request comprises the unified identity and a first advertisement slot identifier, and wherein the first advertisement request requests an advertisement resource; and
receiving, by the first terminal, a first advertisement response from the server, wherein the first advertisement response comprises an advertisement resource of a second advertisement, and wherein the second advertisement and the first advertisement have a same advertising campaign.

7. The method according to claim 6, wherein the unified identity is pre-configured in the first terminal.

8. The method according to claim 6, wherein before the sending, by the first terminal, the effective exposure event to the server, the method further comprises:
generating, by the first terminal, the unified identity.

9. The method according to claim 6, wherein the method further comprises:

sending, by the first terminal, the unified identity to a second terminal, so that the second terminal obtains, from the server by using the unified identity, a third advertisement having a same advertising campaign as the first advertisement.

10. The method according to claim 9, wherein the sending, by the first terminal, the unified identity to the second terminal comprises:
sending, by the first terminal, the unified identity to the second terminal through a relay device.

11. The method according to claim 6, wherein the determining, by the first terminal based on the bearing information in the wireless signal, based on the position and the movement direction of the first terminal, and based on the preset exposure duration, that the first advertisement played by the advertising device is effectively exposed to the user of the first terminal comprises:
determining, by the first terminal based on the bearing information, and the position and the movement direction of the first terminal, that a bearing of the first terminal relative to the advertising device meets a preset condition;
determining, by the first terminal, a duration in which the first advertisement played by the advertising device is exposed to the user of the first terminal; and
determining, by the first terminal, based on determining that the exposure duration is greater than the preset exposure duration, that the first advertisement played by the advertising device is effectively exposed to the user of the first terminal;
wherein that a bearing of the first terminal relative to the advertising device meets a preset condition comprises:
a distance between the first terminal and the advertising device is within a preset distance range;
the first terminal is located on a side of the orientation of the advertising device; and
an included angle between the movement direction of the first terminal and the orientation of the advertising device is within a preset included angle range.

12. An advertising system, wherein the advertising system comprises:
an advertising device;
a first terminal; and
a server;
wherein the advertising device is configured to:
play a first advertisement, and
broadcast a wireless signal, wherein the wireless signal comprises an identifier of the first advertisement that is being played by the advertising device and bearing information of the advertising device, and wherein the bearing information indicates a position and an orientation of the advertising device;
wherein the first terminal is configured to:
receive the wireless signal; and
determine, based on the bearing information in the wireless signal, based on a position and a movement direction of the first terminal, and based on a preset exposure duration, that the first advertisement played by the advertising device is effectively exposed to a user of the first terminal; and
send an effective exposure event to the server, wherein the effective exposure event comprises a unified identity and the identifier of the first advertisement, and wherein the unified identity corresponds to the user of the first terminal;
wherein the server is configured to:
receive the effective exposure event; and update, based on the effective exposure event, a historical preference of the user corresponding to the unified identity, wherein the updated historical preference indicates that the user is interested in the first advertisement;

wherein the first terminal is further configured to send a first advertisement request to the server, wherein the first advertisement request comprises the unified identity and a first advertisement slot identifier, and wherein the first advertisement request requests an advertisement resource;

wherein the server is further configured to:
receive the first advertisement request,
obtain the updated historical preference corresponding to the unified identity, and
send a first advertisement response to the first terminal based on the updated historical preference; and wherein the first terminal is further configured to:
receive the first advertisement response, wherein the first advertisement response comprises an advertisement resource of a second advertisement, and wherein the second advertisement and the first advertisement have a same advertising campaign.

13. The advertising system according to claim 12, wherein the advertising system further comprises a second terminal;
wherein the first terminal is further configured to send the unified identity to the second terminal;
wherein the second terminal is configured to:
receive the unified identity, and
send a second advertisement request to the server, wherein the second advertisement request comprises the unified identity and a second advertisement slot identifier, and wherein the second advertisement request requests an advertisement resource;

wherein the server is further configured to:
receive the second advertisement request;
obtain the updated historical preference corresponding to the unified identity; and
send a second advertisement response to the second terminal based on the updated historical preference; and wherein the second terminal is further configured to:
receive the second advertisement response, wherein the second advertisement response comprises an advertisement resource of a third advertisement, and the third advertisement and the first advertisement have a same advertising campaign.

14. The advertising system according to claim 13, wherein the advertising system further comprises a relay device; and
wherein the first terminal is configured to send the unified identity to the second terminal through the relay device.

* * * * *

UNITED STATES PATENT AND TRADEMARK OFFICE
CERTIFICATE OF CORRECTION

| | | |
|---|---|---|
| PATENT NO. | : 12,236,452 B2 | Page 1 of 1 |
| APPLICATION NO. | : 17/794207 | |
| DATED | : February 25, 2025 | |
| INVENTOR(S) | : Lan Mo | |

It is certified that error appears in the above-identified patent and that said Letters Patent is hereby corrected as shown below:

On the Title Page

Item (30), in Column 1, under "Foreign Application Priority Data", Line 1, delete "202010072820.0" and insert -- 202010072820 --.

Signed and Sealed this
First Day of April, 2025

Coke Morgan Stewart
*Acting Director of the United States Patent and Trademark Office*